(12) United States Patent
Arnetoli

(10) Patent No.: US 10,327,381 B2
(45) Date of Patent: Jun. 25, 2019

(54) LINE-TYPE TRIMMER HEAD WITH MANUAL REPLACEMENT OF THE LINE WITHOUT OPENING

(71) Applicant: ARNETOLI MOTOR S.R.L., Reggello (FI) (IT)

(72) Inventor: Fabrizio Arnetoli, Reggello (IT)

(73) Assignee: ARNETOLI MOTOR S.R.L., Reggello (FI) (IT)

( * ) Notice: Subject to any disclaimer, the term of this patent is extended or adjusted under 35 U.S.C. 154(b) by 153 days.

(21) Appl. No.: 15/515,373

(22) PCT Filed: Jan. 20, 2016

(86) PCT No.: PCT/EP2016/051159
§ 371 (c)(1),
(2) Date: Mar. 29, 2017

(87) PCT Pub. No.: WO2016/120140
PCT Pub. Date: Aug. 4, 2016

(65) Prior Publication Data
US 2017/0215338 A1    Aug. 3, 2017

(30) Foreign Application Priority Data

Jan. 30, 2015    (IT) .................. FI2015A0016

(51) Int. Cl.
*A01D 34/416*    (2006.01)

(52) U.S. Cl.
CPC ..... *A01D 34/4163* (2013.01); *A01D 34/4166* (2013.01); *A01D 34/4161* (2013.01); *A01D 34/4162* (2013.01); *A01D 34/4165* (2013.01)

(58) Field of Classification Search
CPC .......... A01D 34/4163; A01D 34/4166; A01D 34/4161; A01D 34/4162; A01D 34/4165
See application file for complete search history.

(56) References Cited

U.S. PATENT DOCUMENTS

| 5,765,287 | A | * | 6/1998 | Griffini | ............ | A01D 34/4163 |
| | | | | | | 242/125.1 |
| 8,266,805 | B1 | * | 9/2012 | Alliss | ................ | A01D 34/4163 |
| | | | | | | 30/276 |
| 8,567,074 | B2 | | 10/2013 | Arnetoli | | |
| 9,516,807 | B2 | * | 12/2016 | Alliss | ................ | A01D 34/4161 |

(Continued)

FOREIGN PATENT DOCUMENTS

| EP | 1 894 459 A1 | 3/2008 |
| WO | 2013/138752 A1 | 9/2013 |

*Primary Examiner* — Hwei-Siu C Payer
(74) *Attorney, Agent, or Firm* — McGlew and Tuttle, P.C.

(57) ABSTRACT

A line(F)-type trimmer head (1) is described, configured to rotate around a rotation axis (A-A) and comprising a housing (3) composed of at least one first housing portion (5) and one second housing portion (7), which can be torsionally and axially coupled to one another and which form a volume for a stock of cutting line (F). The second housing portion comprises at least one first passage (31), transverse with respect to the rotation axis of the trimmer head, with a first end and a second end configured and arranged so as to be positioned in correspondence of the two exit holes (9) for the cutting line, so that a cutting line can be inserted through one exit hole and extracted from the other exit hole, passing along the first transverse passage.

21 Claims, 56 Drawing Sheets

(56) References Cited

U.S. PATENT DOCUMENTS

| | | | | |
|---|---|---|---|---|
| 9,924,631 B2* | 3/2018 | Alliss | ............... | A01D 34/4161 |
| 2002/0189107 A1* | 12/2002 | Arnetoli | ............... | A01D 34/416 |
| | | | | 30/276 |
| 2011/0239468 A1 | 10/2011 | Conlon | | |
| 2011/0302793 A1* | 12/2011 | Alliss | ............... | A01D 34/4165 |
| | | | | 30/347 |
| 2015/0327436 A1* | 11/2015 | Skinner | ............... | A01D 34/4163 |
| | | | | 30/276 |
| 2016/0081268 A1* | 3/2016 | Lang | ............... | A01D 34/4166 |
| | | | | 30/276 |
| 2017/0215338 A1* | 8/2017 | Arnetoli | ............... | A01D 34/4166 |
| 2018/0020615 A1* | 1/2018 | Alliss | ............... | A01D 34/4163 |
| | | | | 30/276 |

* cited by examiner

LINE-TYPE TRIMMER HEAD WITH MANUAL REPLACEMENT OF THE LINE WITHOUT OPENING

FIELD OF THE INVENTION

The embodiments disclosed herein relate trimmer heads and especially to line-type trimmer heads.

BACKGROUND TO THE INVENTION

Usually so-called trimmer heads are used to cut vegetation, for example grass, hedges or the like; these heads are applied to the drive shaft of a bush cutter actuated by an electric motor, an internal combustion engine or other actuating member, for example a hydraulic or mechanical arm actuated by means of a farm machine such as a tractor or the like. The fast rotation of the trimmer head drives into rotation cutting members, with which the head is provided and which act on the vegetation and cut it.

In some prior art heads, cut is performed by means of a so-called cutting line, usually made of plastic, for example polyamide (nylon), and housed in a housing of the head that forms an inner space to stock the cutting line. One or more ends of the line project from the trimmer head and, when the head rotates at high speed around the rotation axis thereof, driven by the drive shaft of the bush cutter, they are tensioned due to the effect of the centrifugal force. Thus, the cutting line, tensioned by the centrifugal force, acts on the vegetation and cuts it.

There is the need to provide a trimmer head of this type, which has a simple structure, is easy to use and allows loading or replacing a stock of cutting line in the head housing by means of simple and fast operations.

SUMMARY OF THE INVENTION

To limit or overcome the drawbacks of the prior art, a line-type trimmer head is described, configured to rotate around a rotation axis and comprising a housing composed of at least a first housing portion and a second housing portion, which can be torsionally and axially coupled to one another and which form a volume for a stock of cutting line; wherein: the first housing portion and the second housing portion can be torsionally released from each other so as to rotate with respect to each other; the first housing portion comprises at least two exit holes for a cutting line; the second housing portion forms a winding spool to wind a stock of cutting line; and the second housing portion comprises at least a first passage, transverse with respect to the rotation axis of the trimmer head, with a first end and a second end configured and arranged so as to be positioned in correspondence of the two exit holes for the cutting line, so that a cutting line can be inserted through one exit hole and extracted from the other exit hole, passing along the first transverse passage. The spool is integral with the second housing portion, so that, when the first housing portion and the second housing portion rotate with respect to each other, the cutting line, fastened to the spool and passing through the exit holes provided in the first housing portion, can be wound around, or unwound from, the spool.

In some embodiments, the first housing portion and the second housing portion can move with respect to each other in a direction parallel to the rotation axis of the trimmer head. The reciprocal axial motion allows one portion to be moved away from the other, so that the two portions can be torsionally released and can rotate with respect to each other.

As the spool is integral with the second housing portion, during the reciprocal axial movement it moves away from the first housing portion, integrally with the second housing portion.

The first housing portion and the second housing portion may have axial constraining members, i.e. axial coupling members.

The first housing portion and the second housing portion may have torsional constraining members, i.e. torsional coupling members.

The torsional constraining members, i.e. the torsional coupling members, may be configured to allow the reciprocal release of the first housing portion with respect to the second housing portion, so as to allow the reciprocal rotation of said housing portions. The torsional constraining or coupling members may be released by moving the two portions axially away from each other.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The invention will be better understood by following the description and the accompanying drawing, which shows non-limiting practical embodiments of the invention. More in particular, in the drawing.

Figure 19:
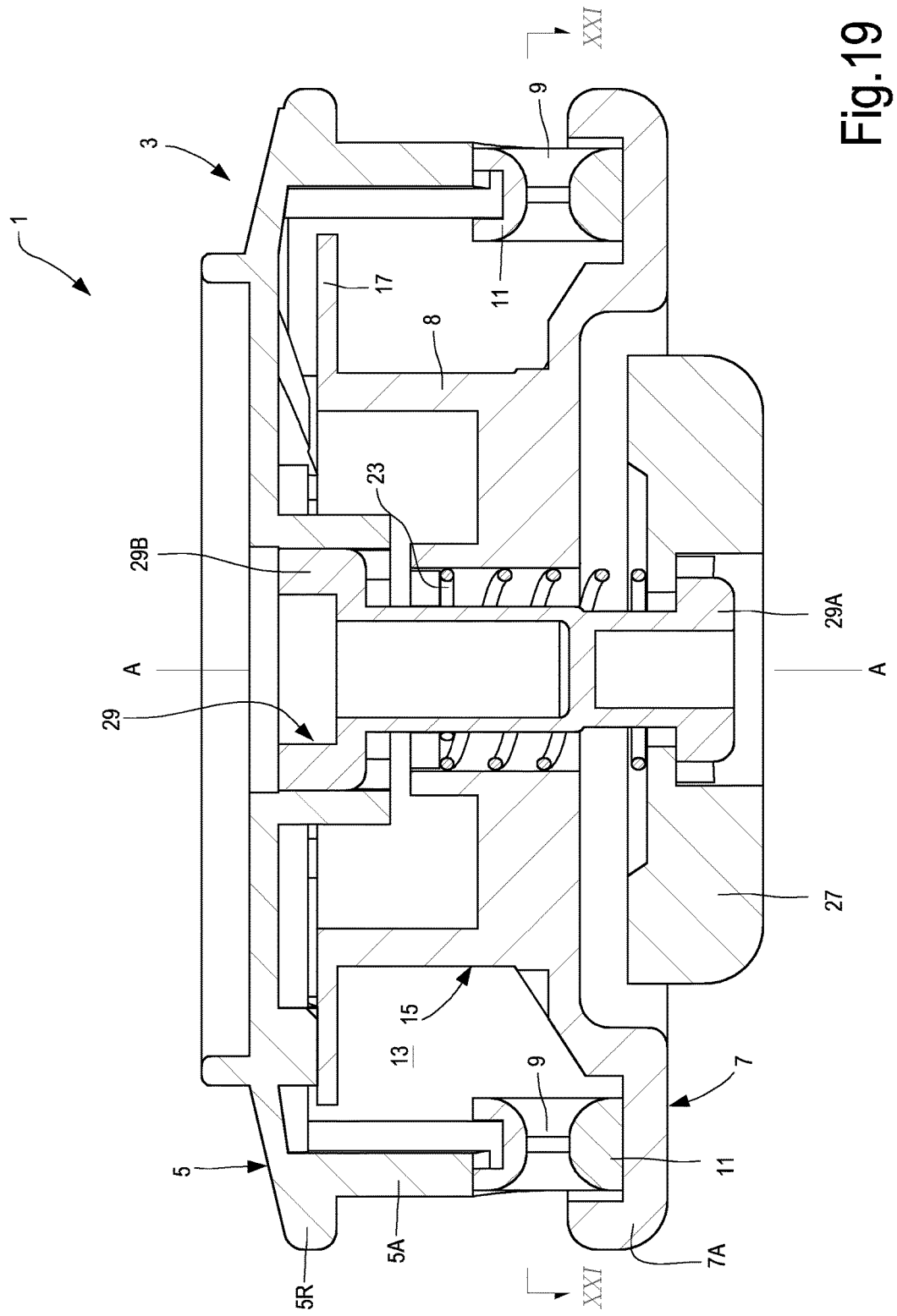
FIG. 19 shows an axial cross section of a further embodiment of a trimmer head.
Figure 20:
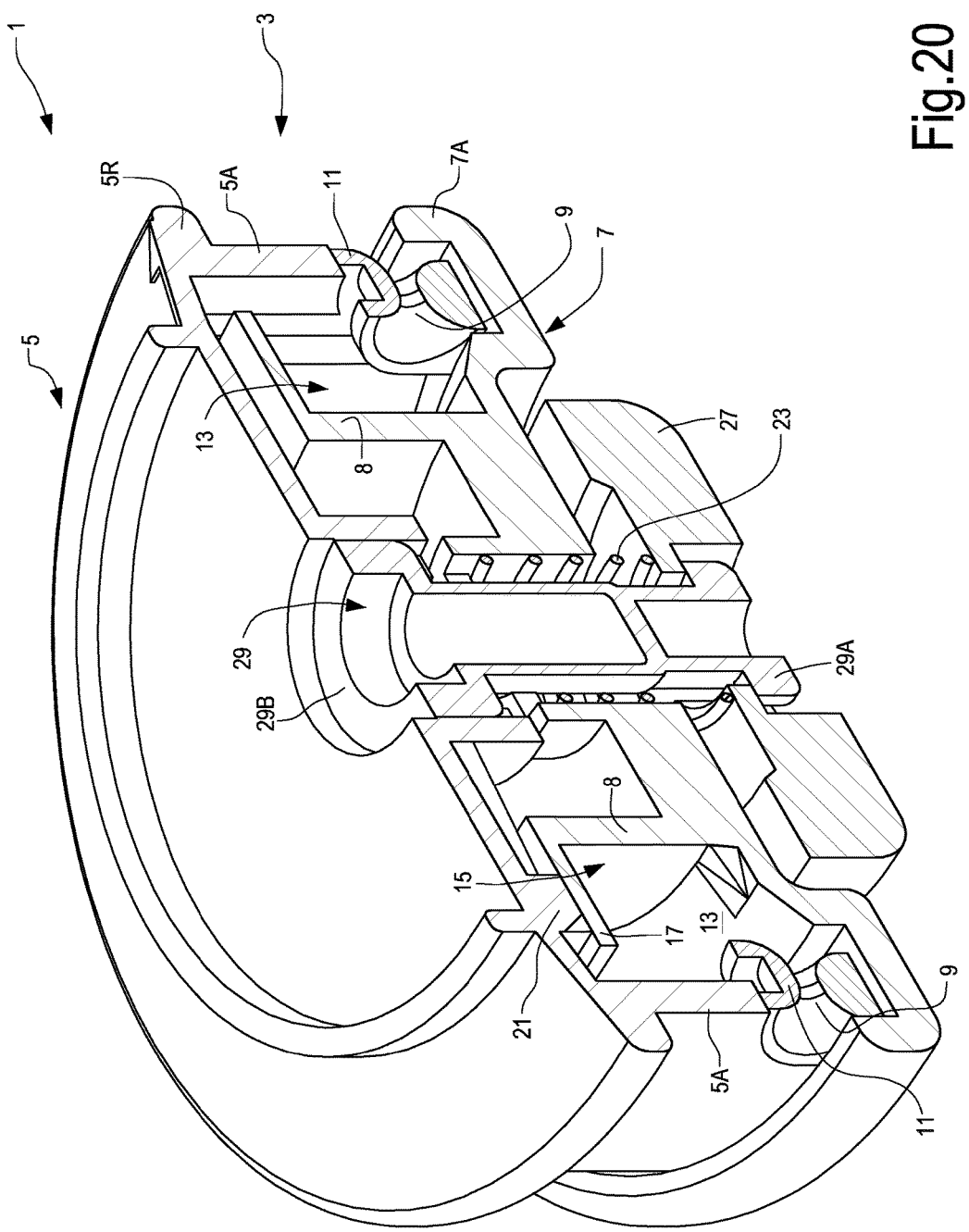
FIG. 20 is a cross-cut axonometric view of the head of FIG. 19.
Figure 21:
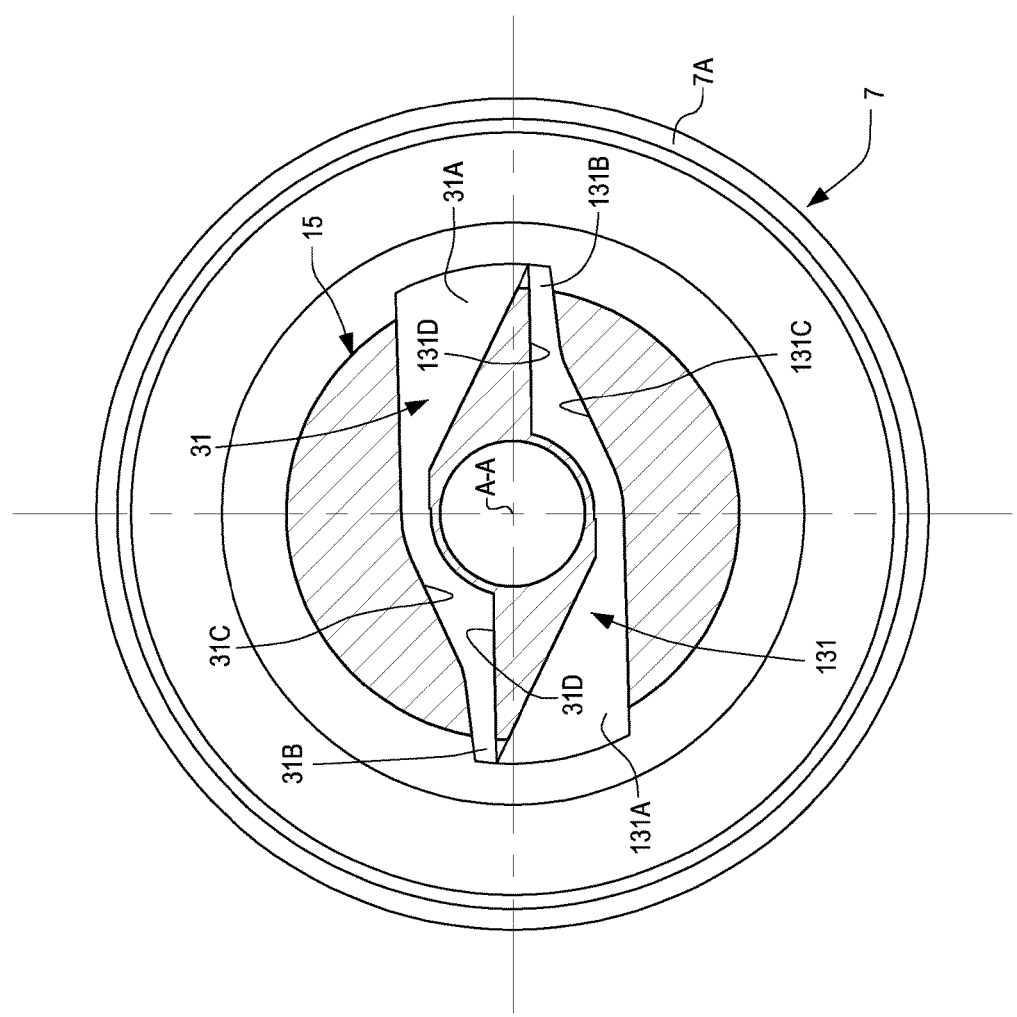
FIG. 21 shows a cross section according to XXI-XXI of FIG. 19.
Figure 22:
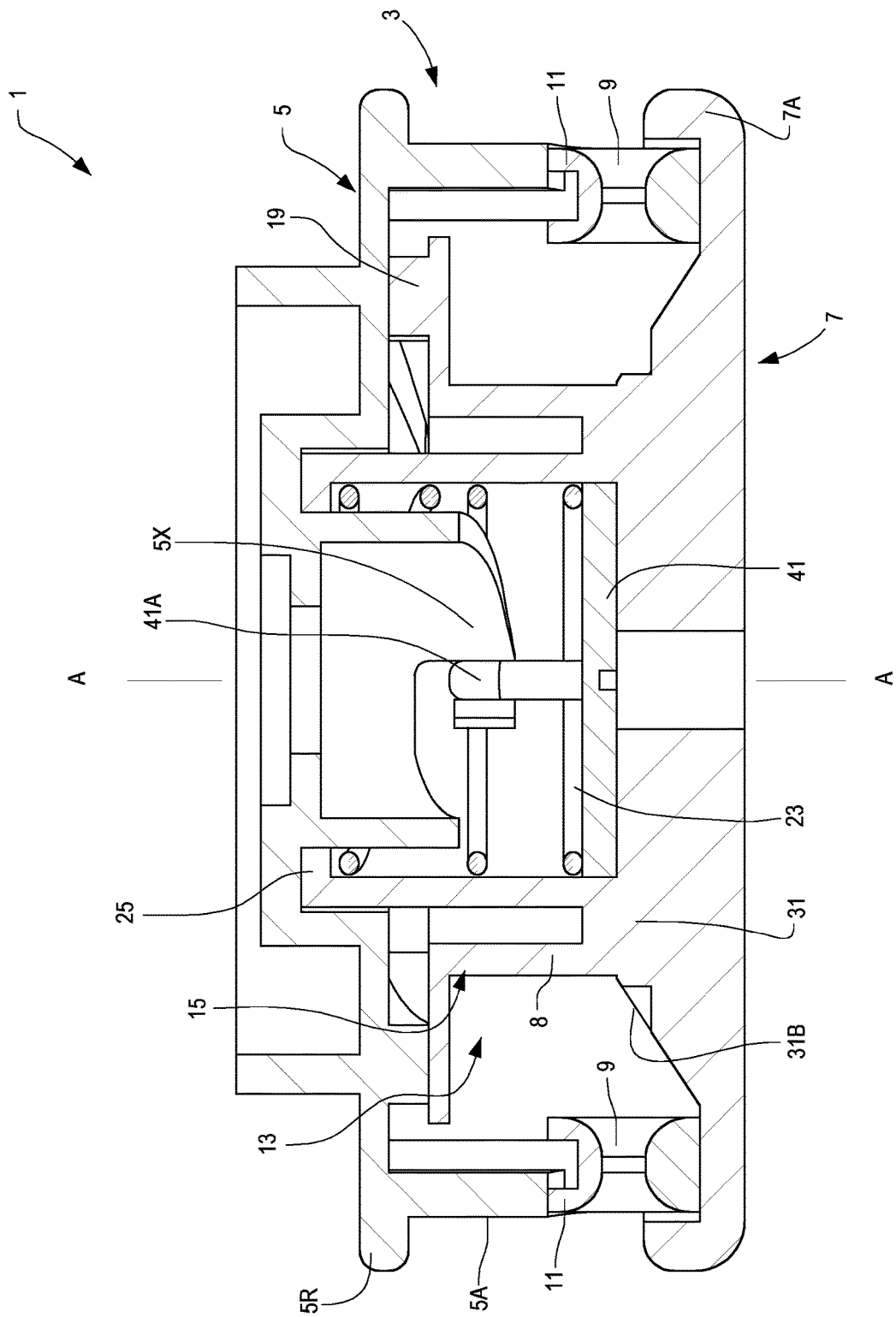
Figure 23:
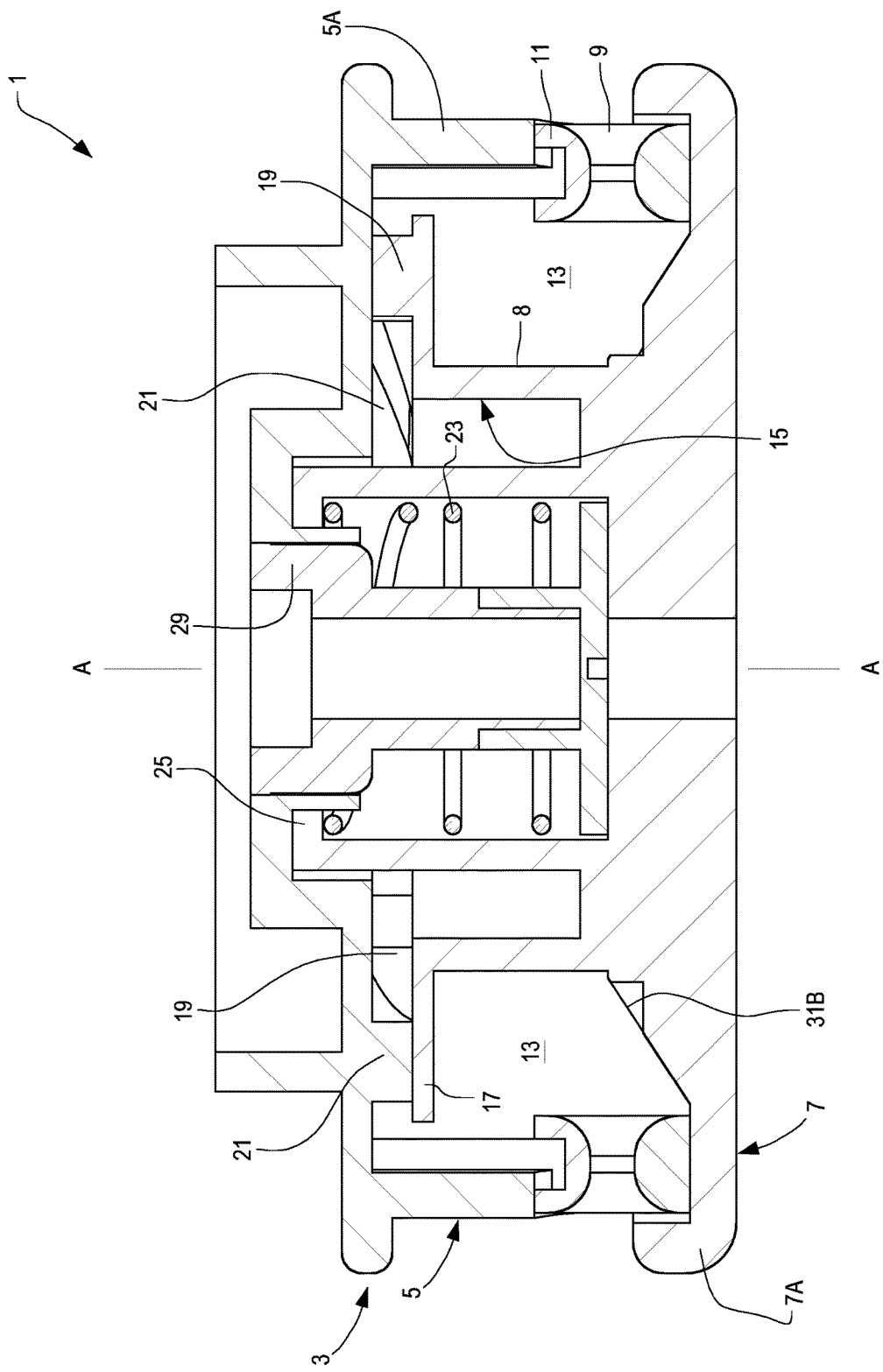
Figure 27:
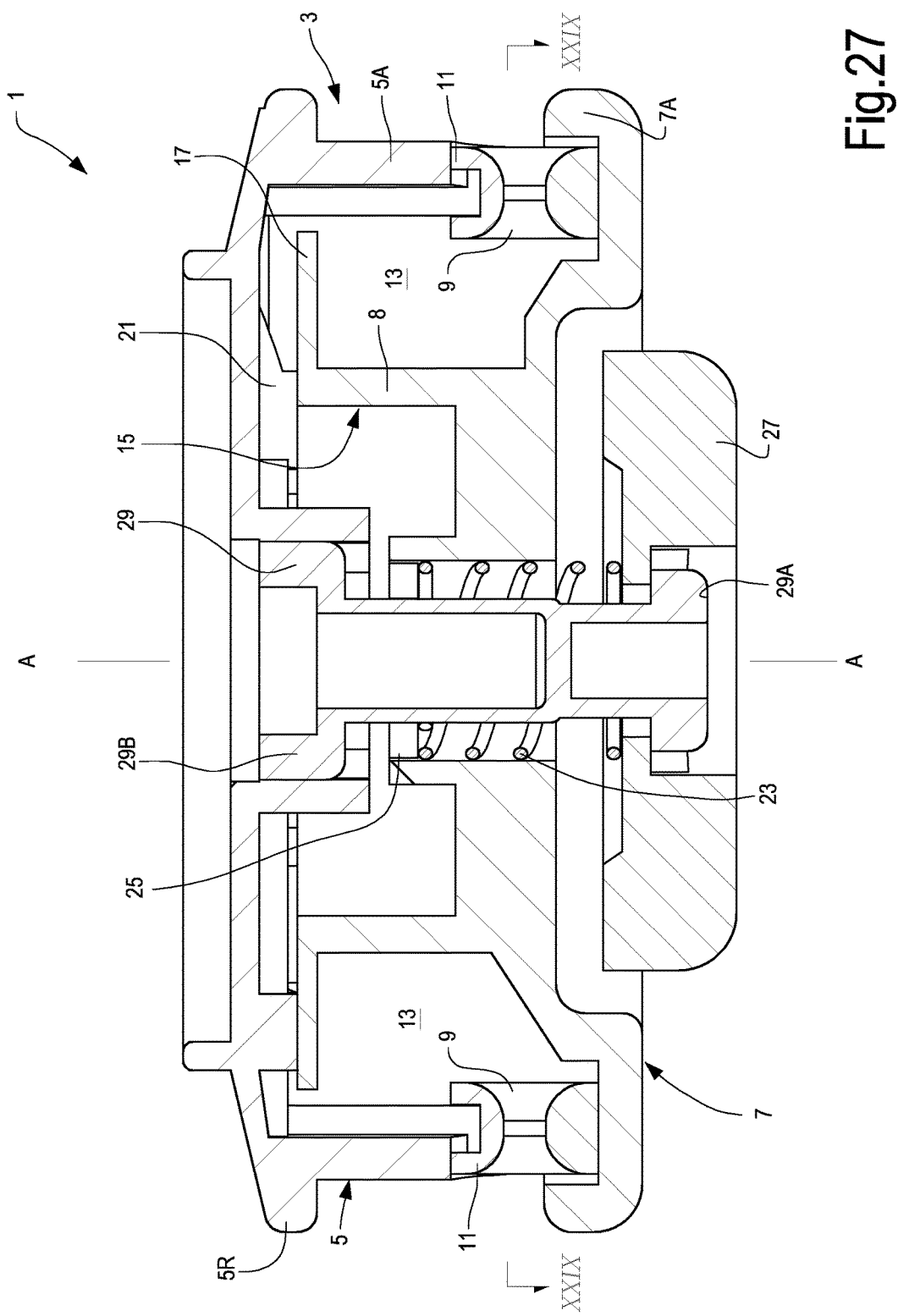
Figure 28:
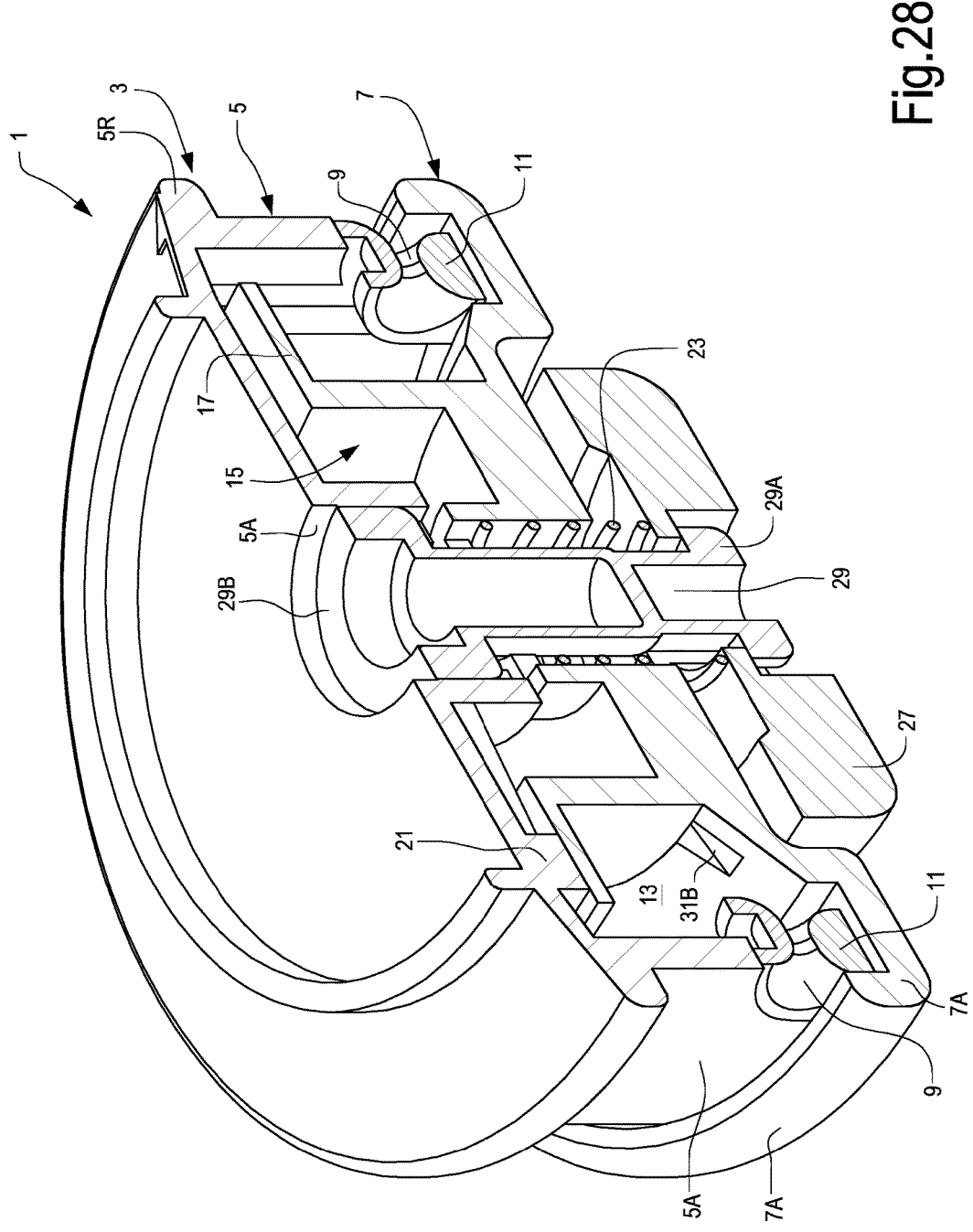
Figure 29:
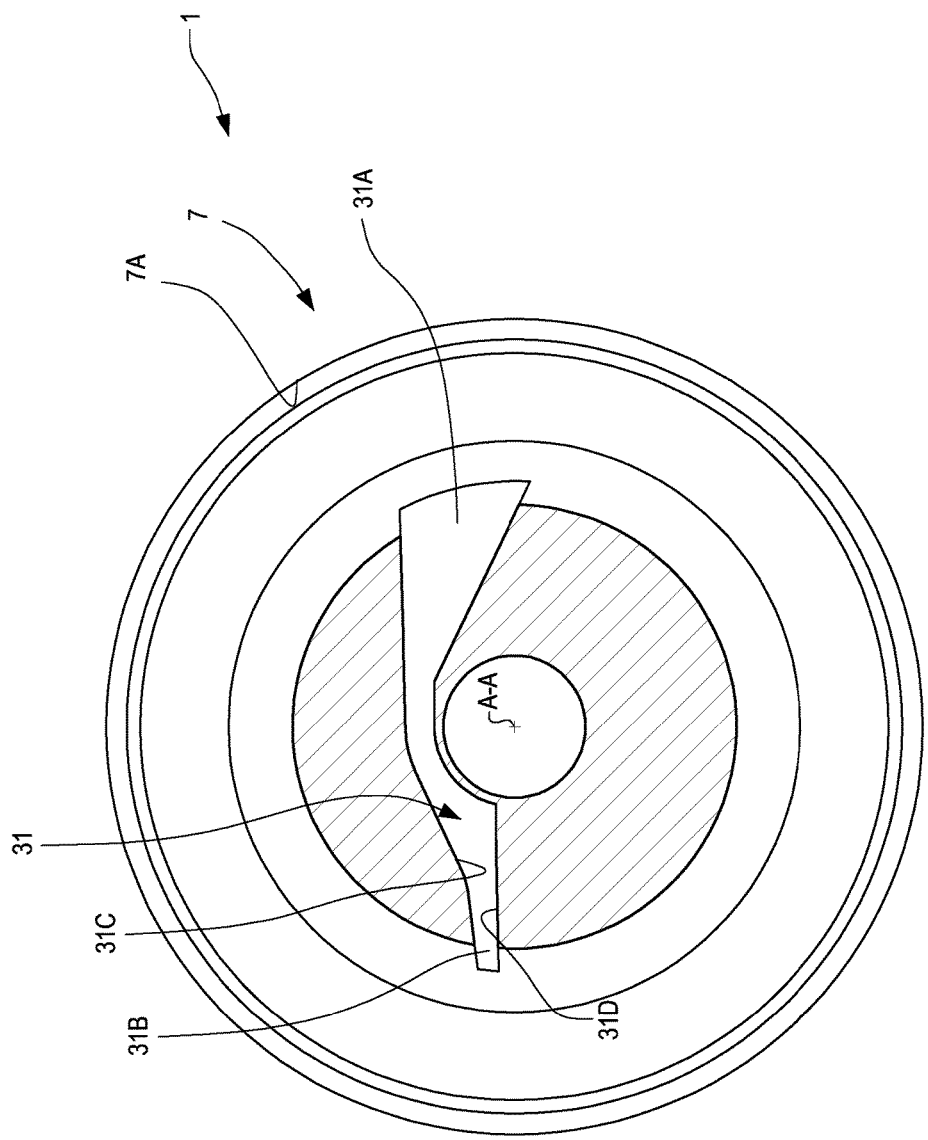
Figure 30:
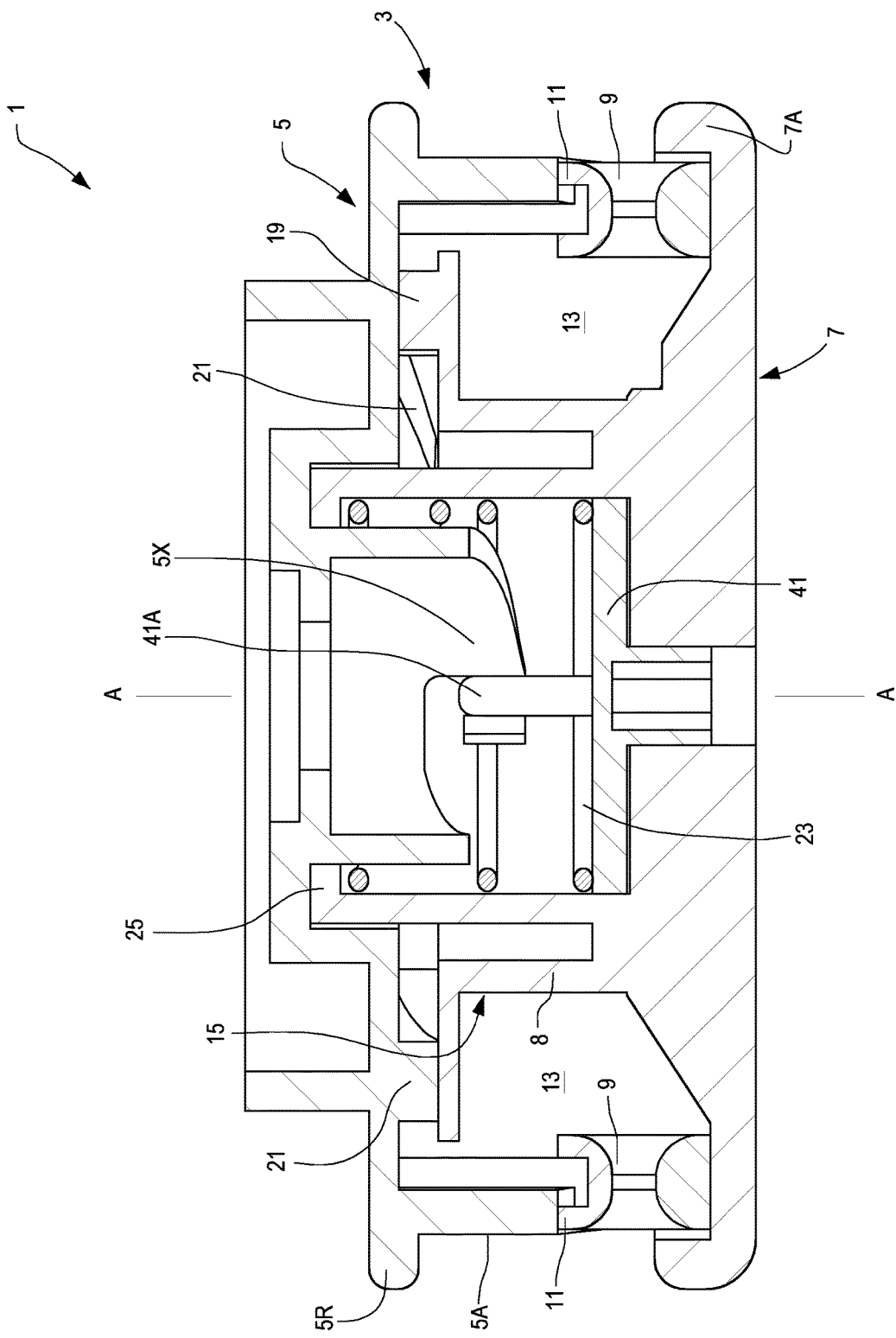
Figure 31:
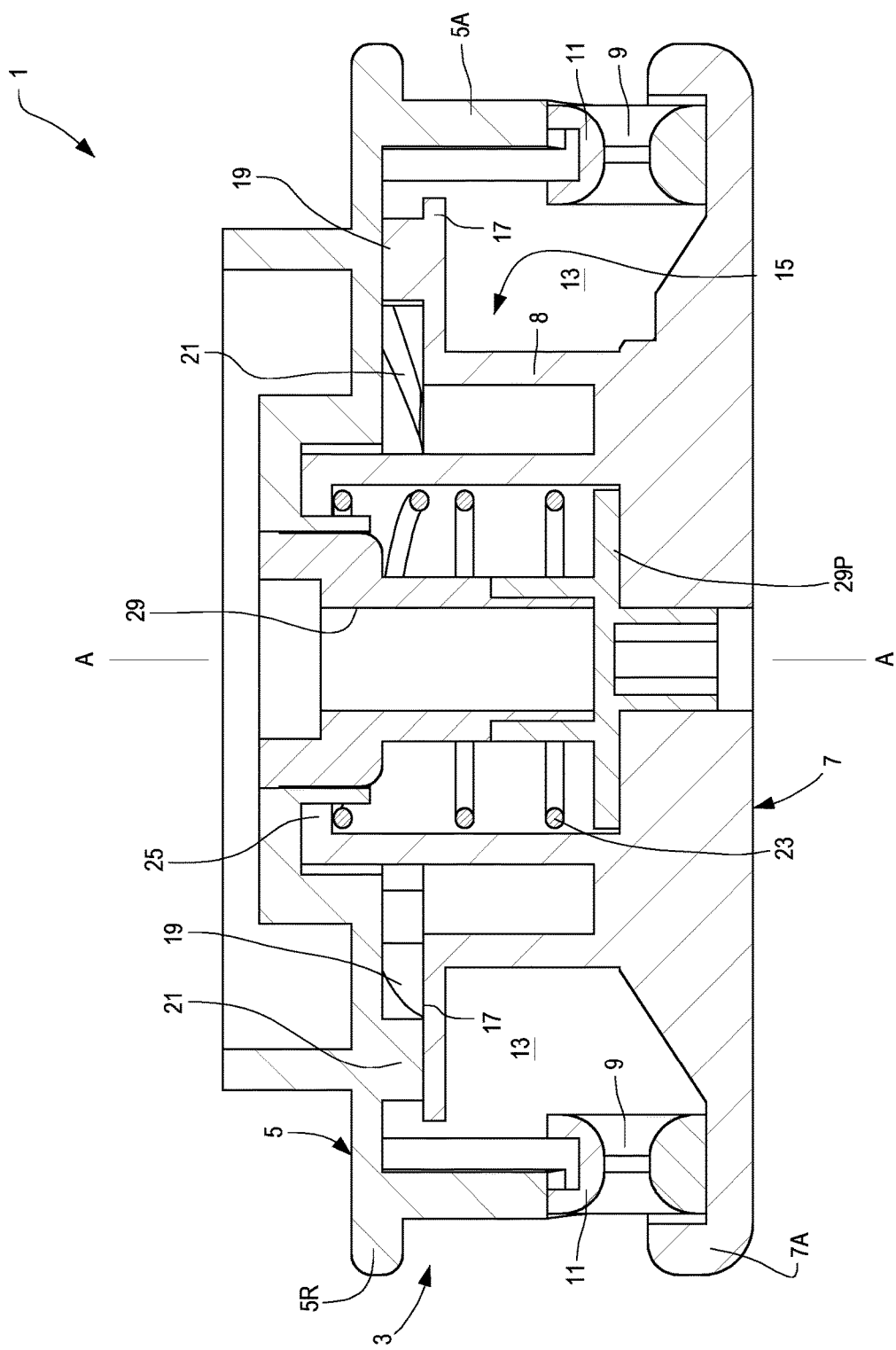
Figure 32:
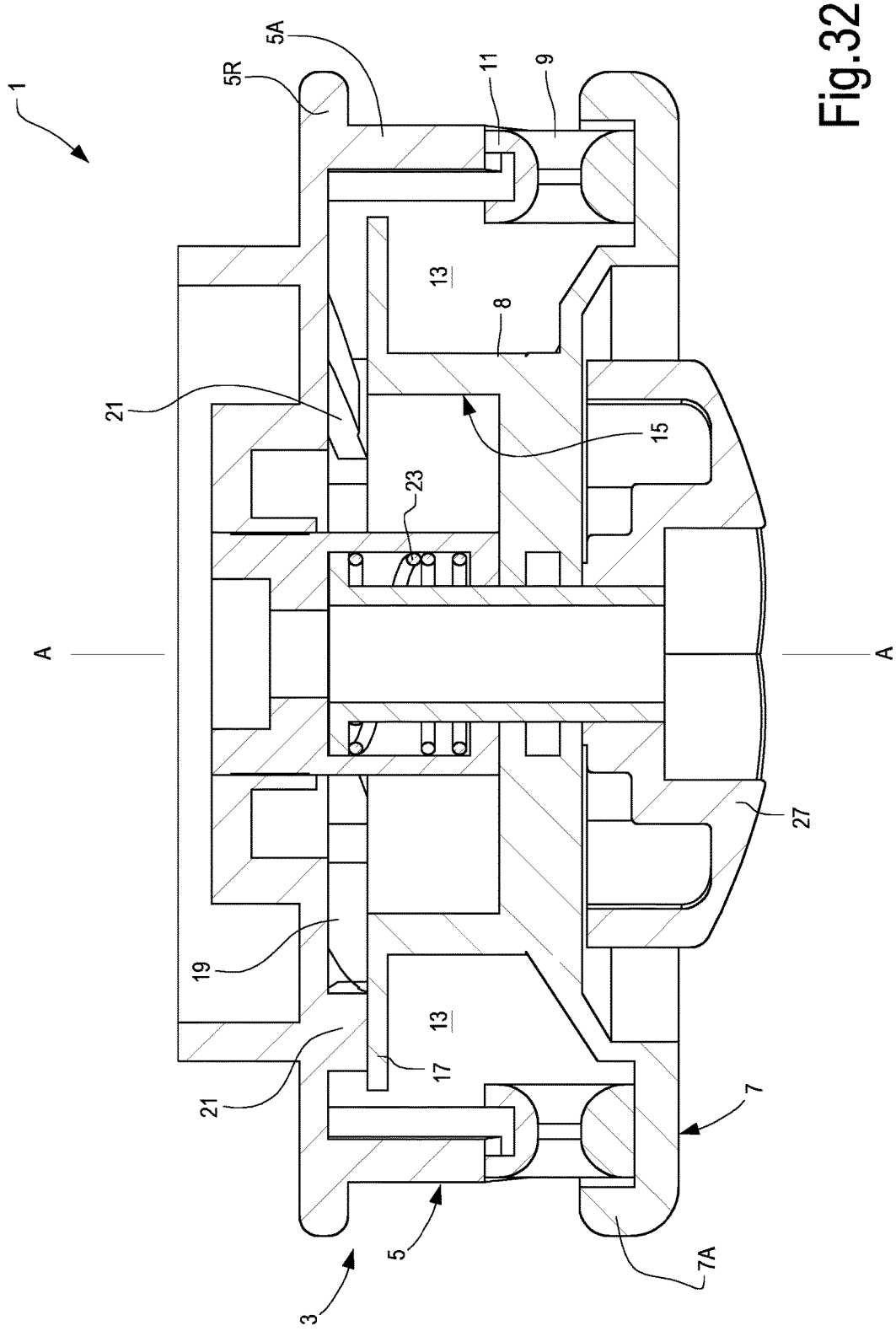
Figure 33:
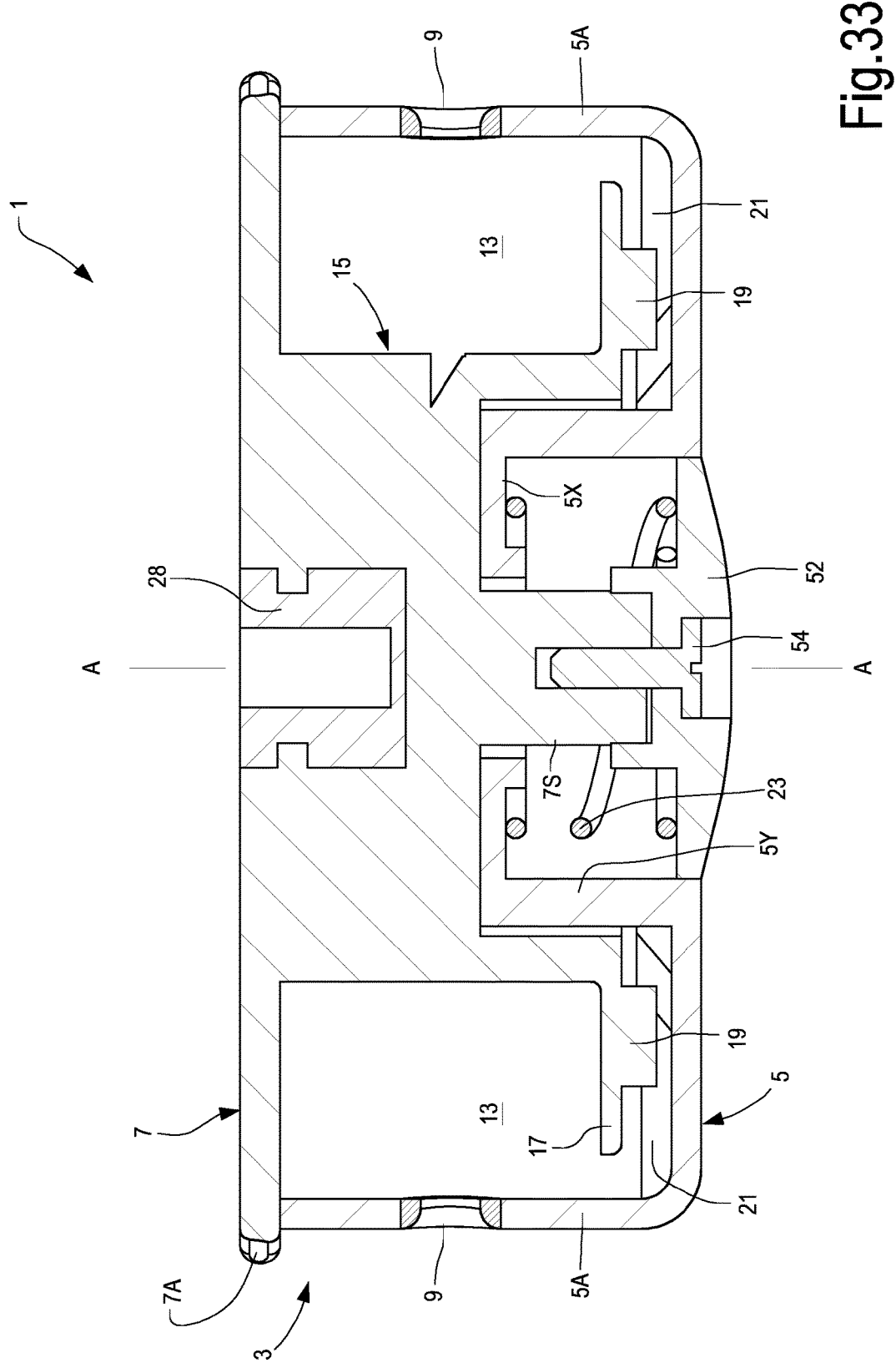
Figure 34:
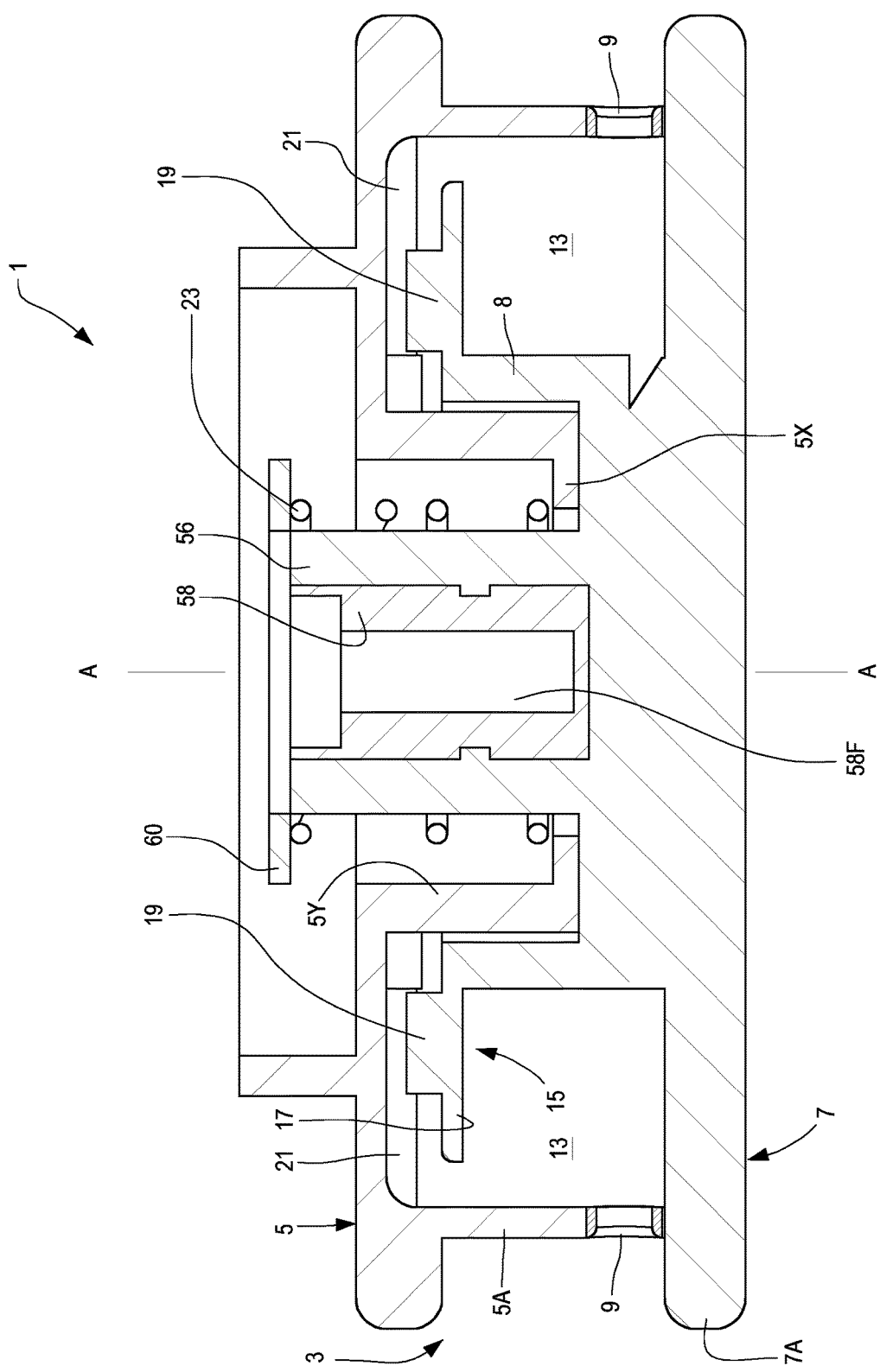
Figure 35:
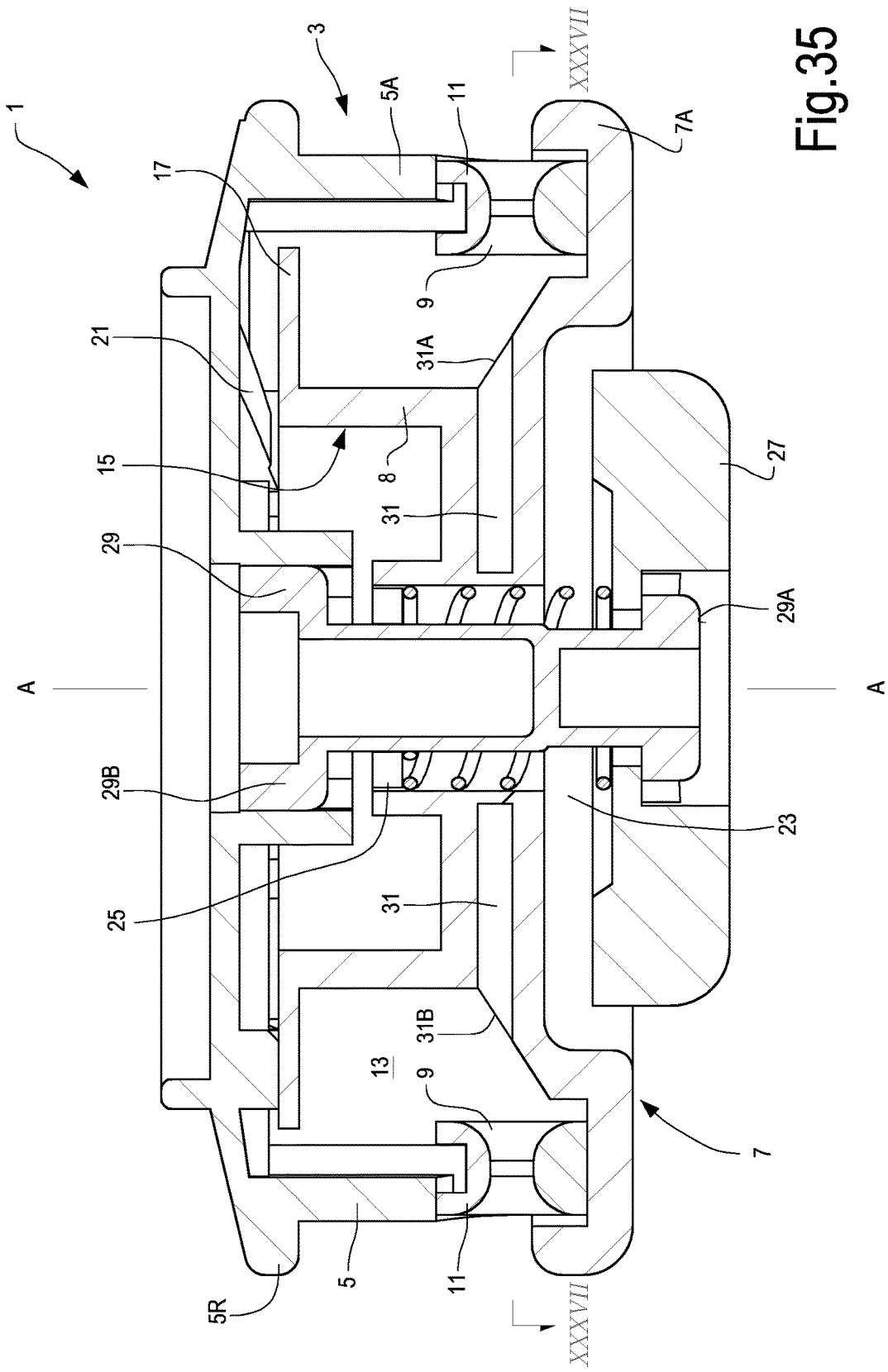
Figure 36:
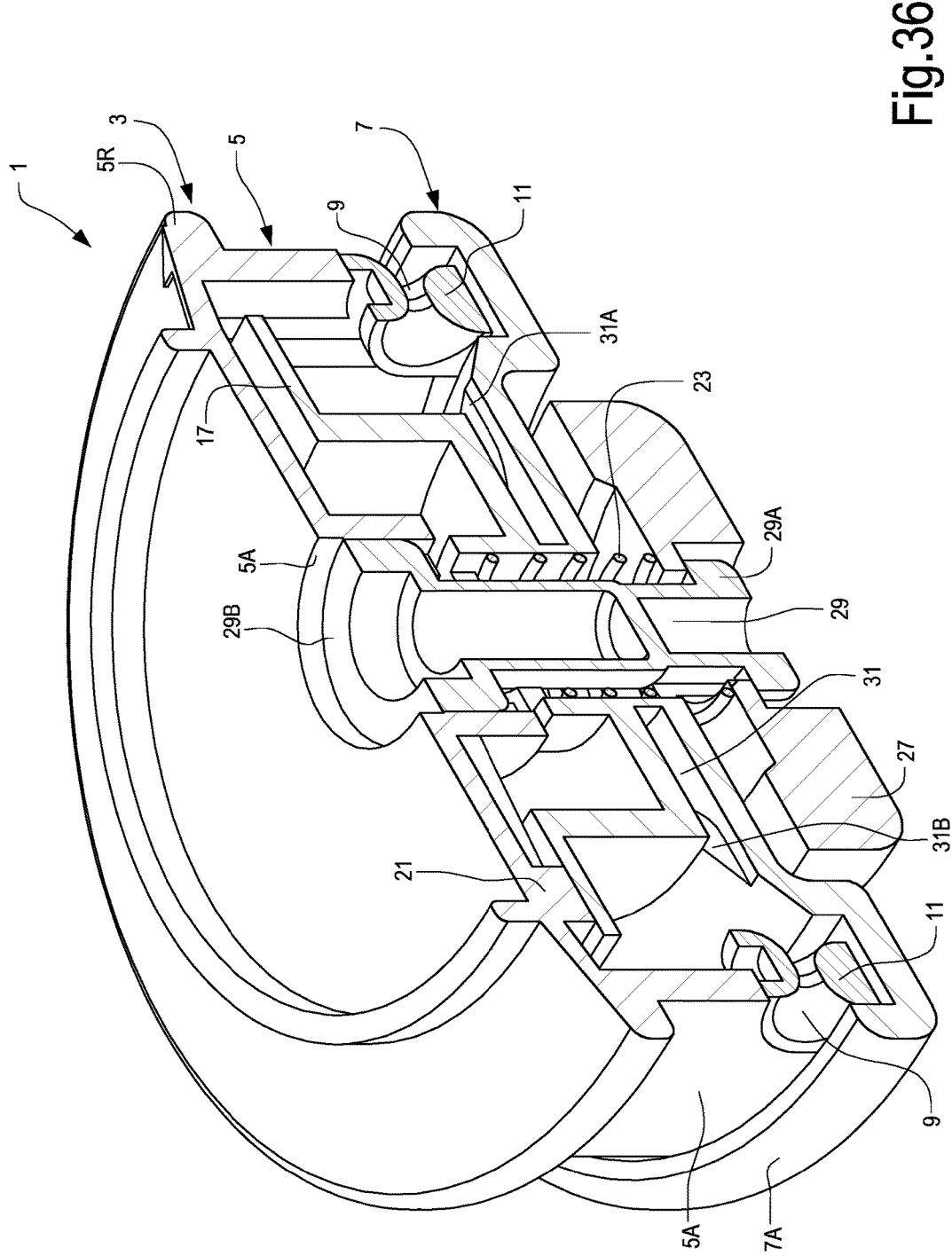
Figure 37:
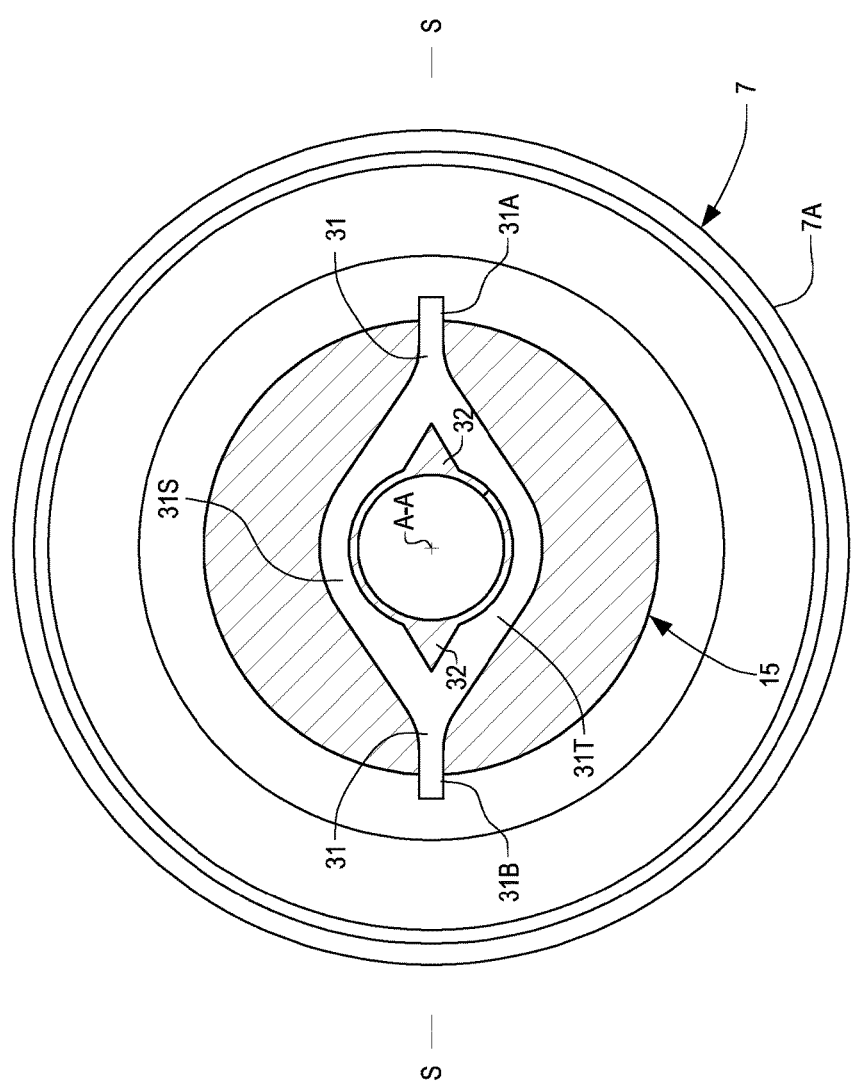
Figure 38:
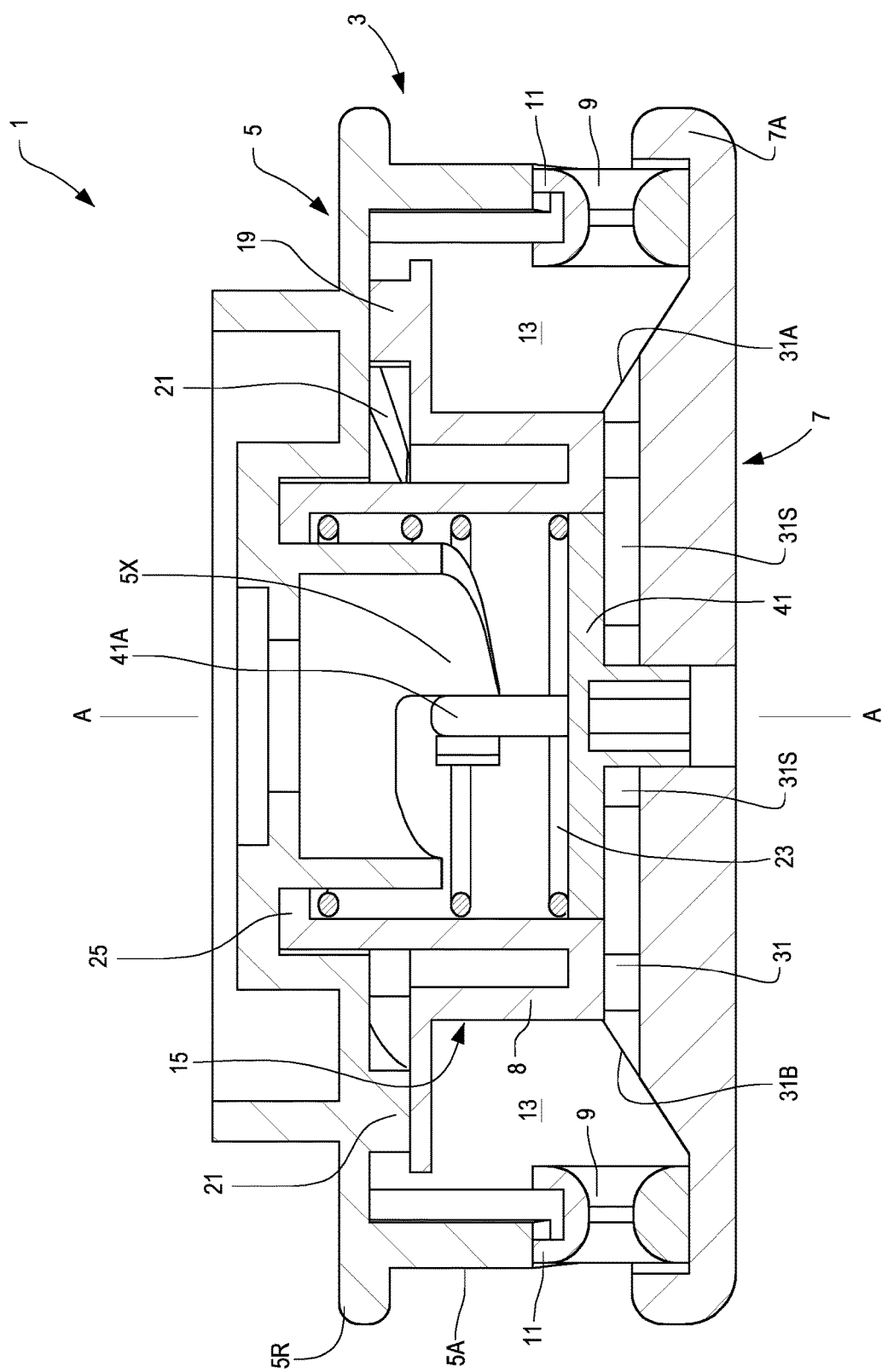
Figure 39:
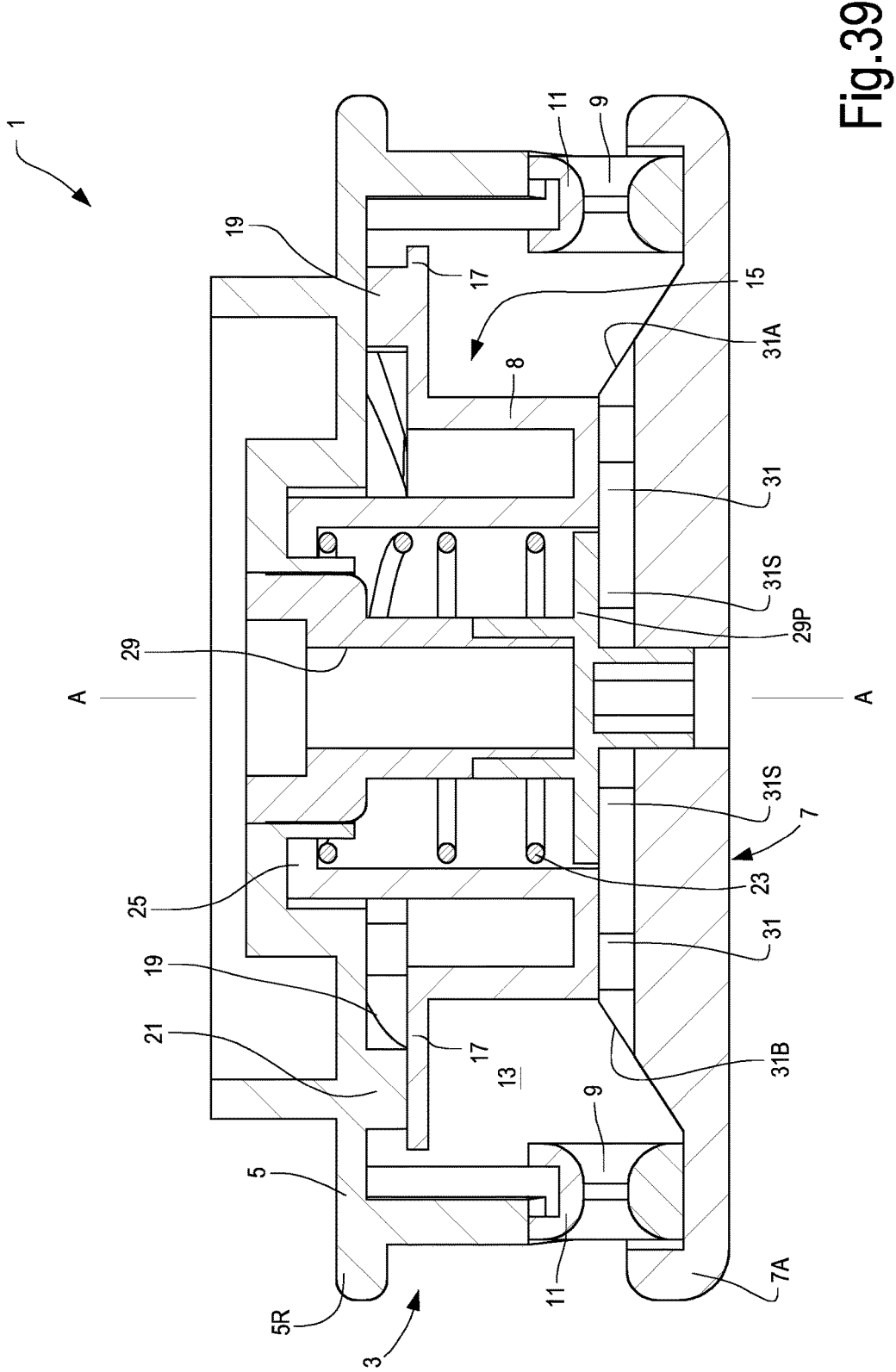
Figure 40:
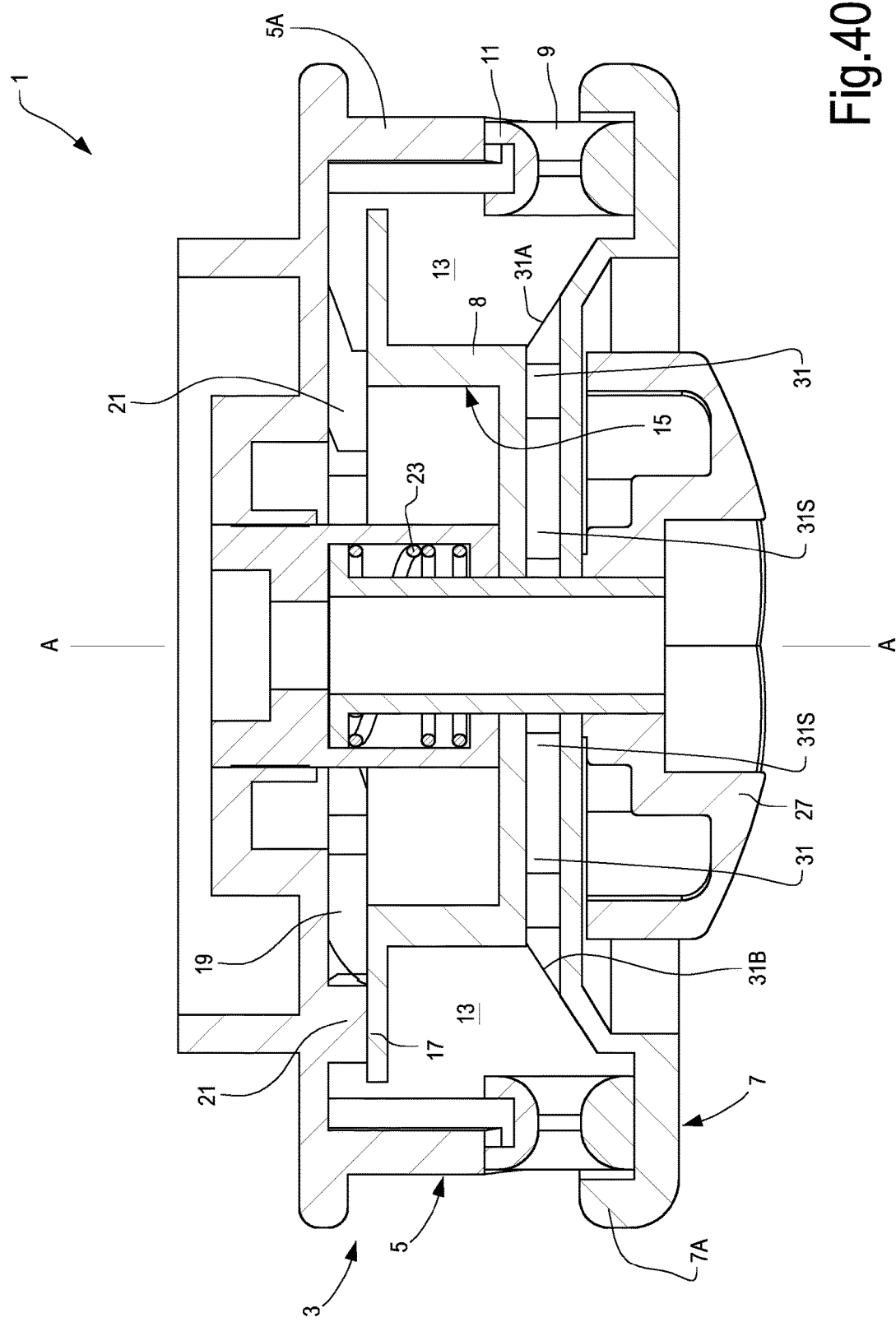
Figure 41:
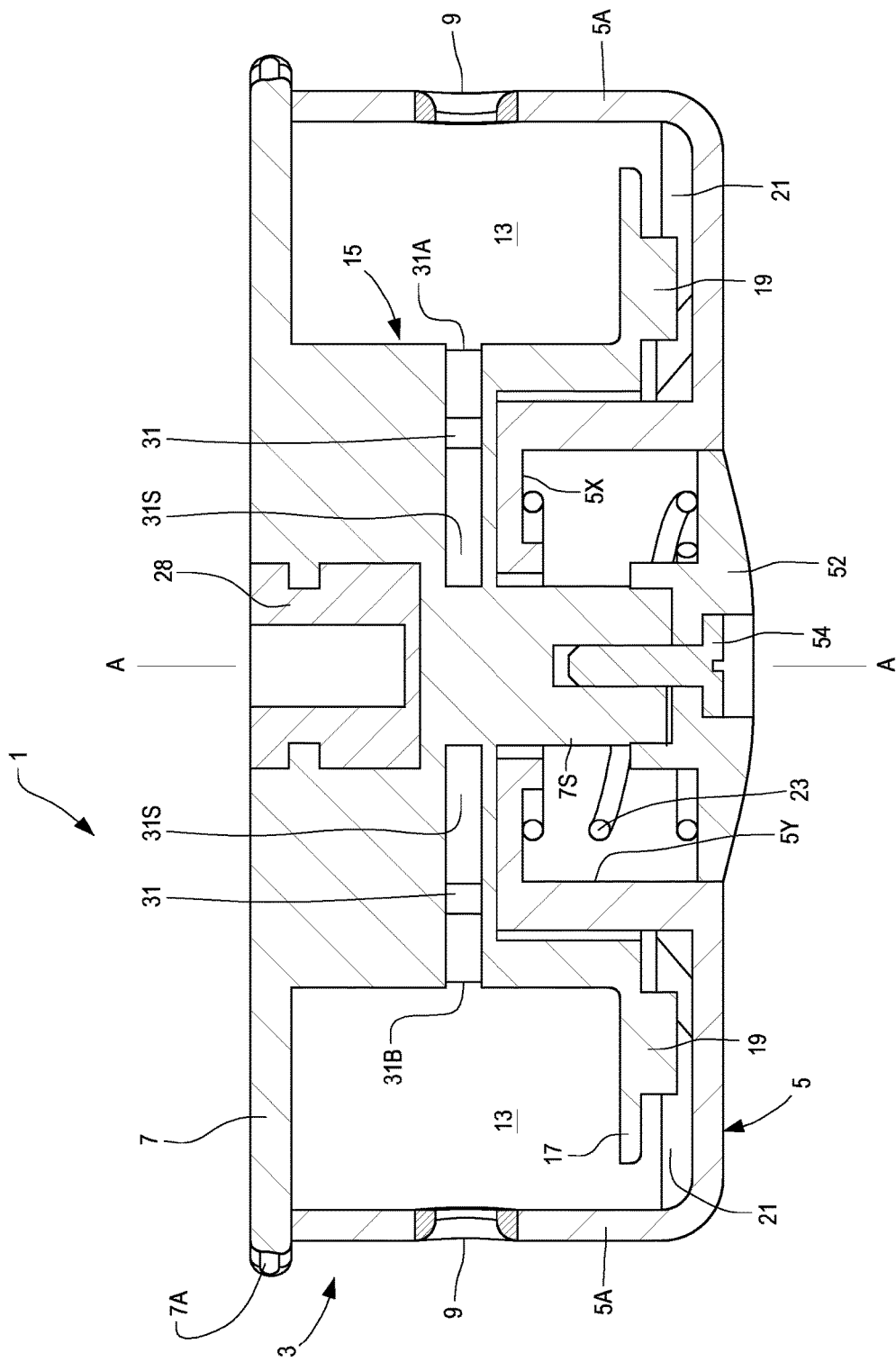
Figure 42:
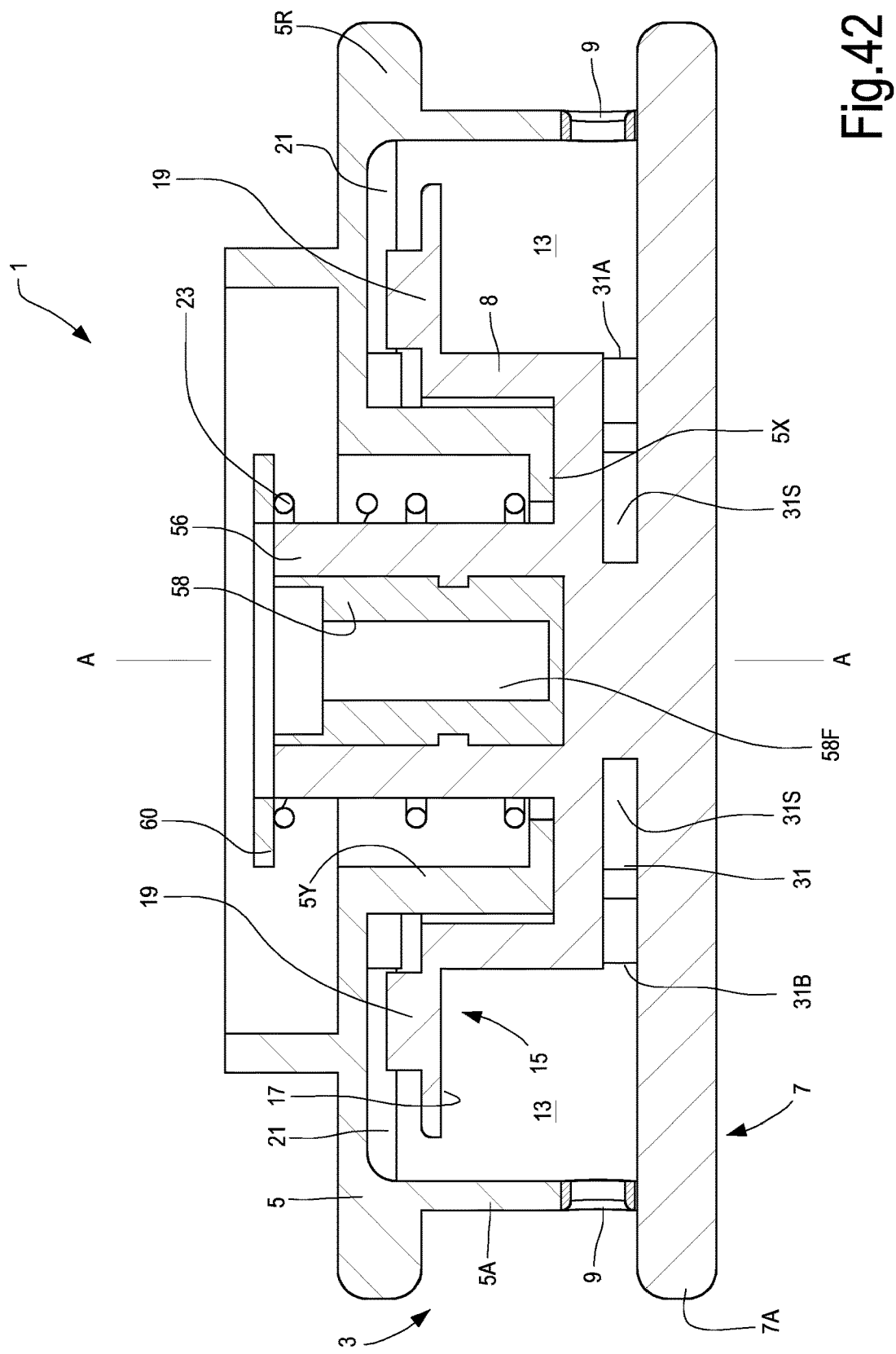
Figure 43:
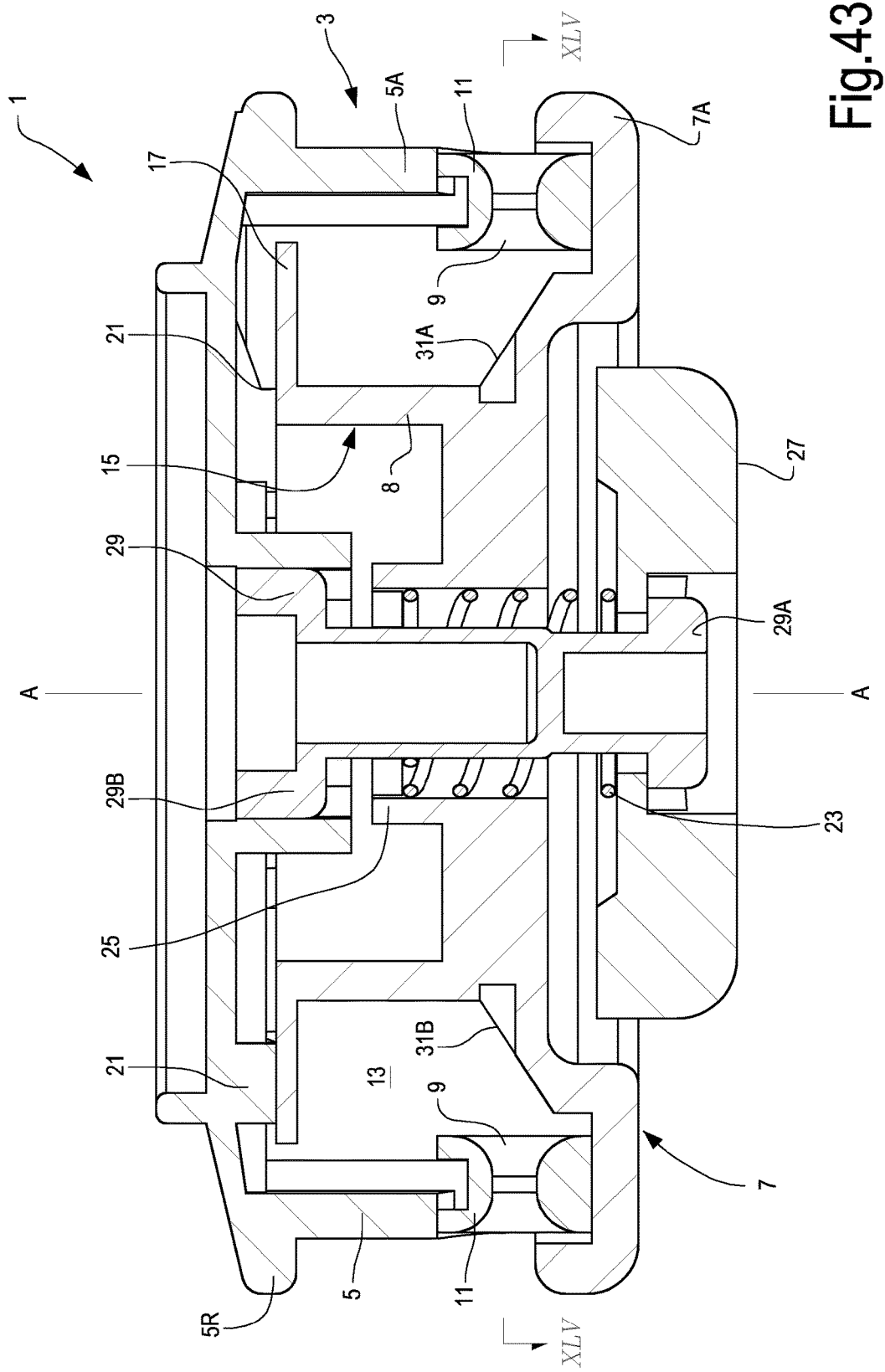
Figure 44:
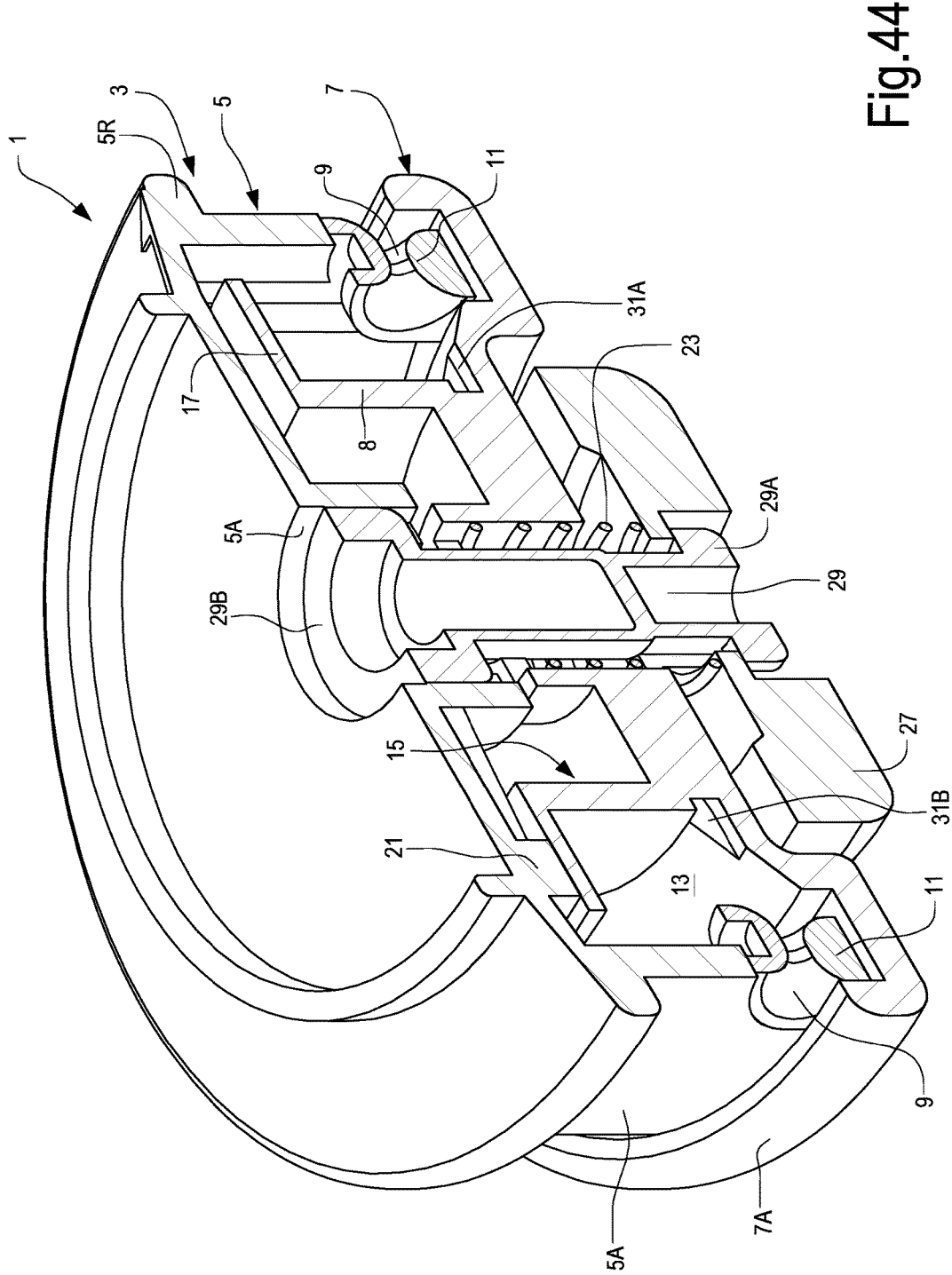
Figure 45:
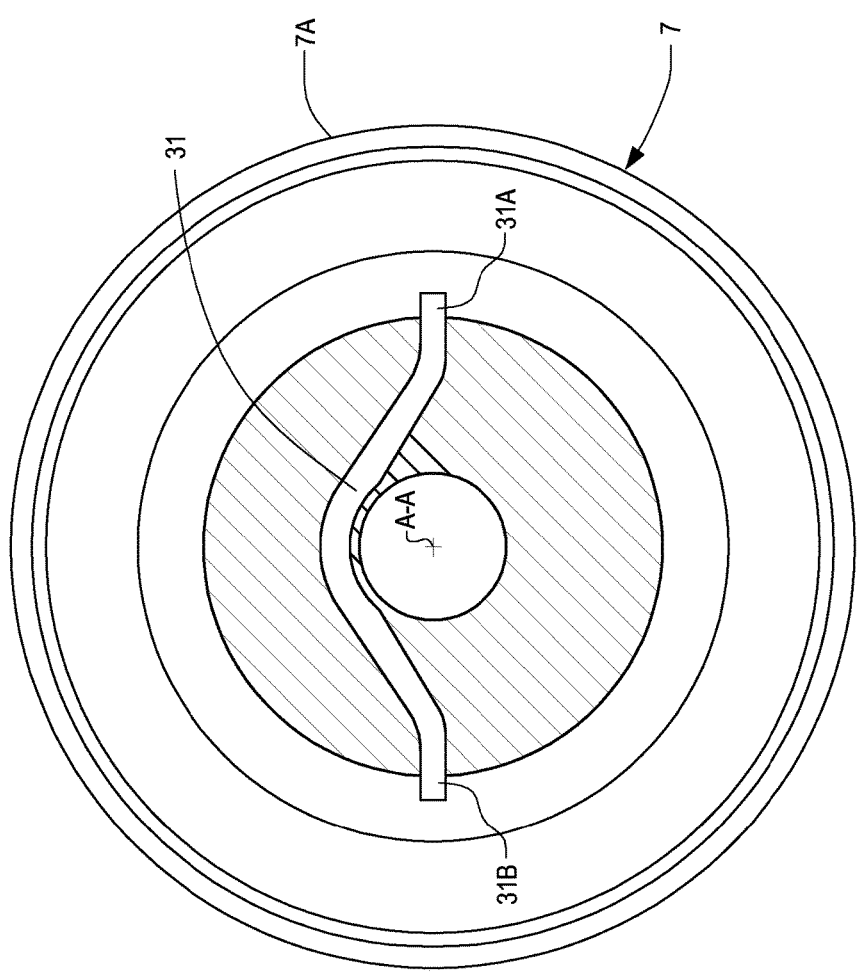
Figure 46:
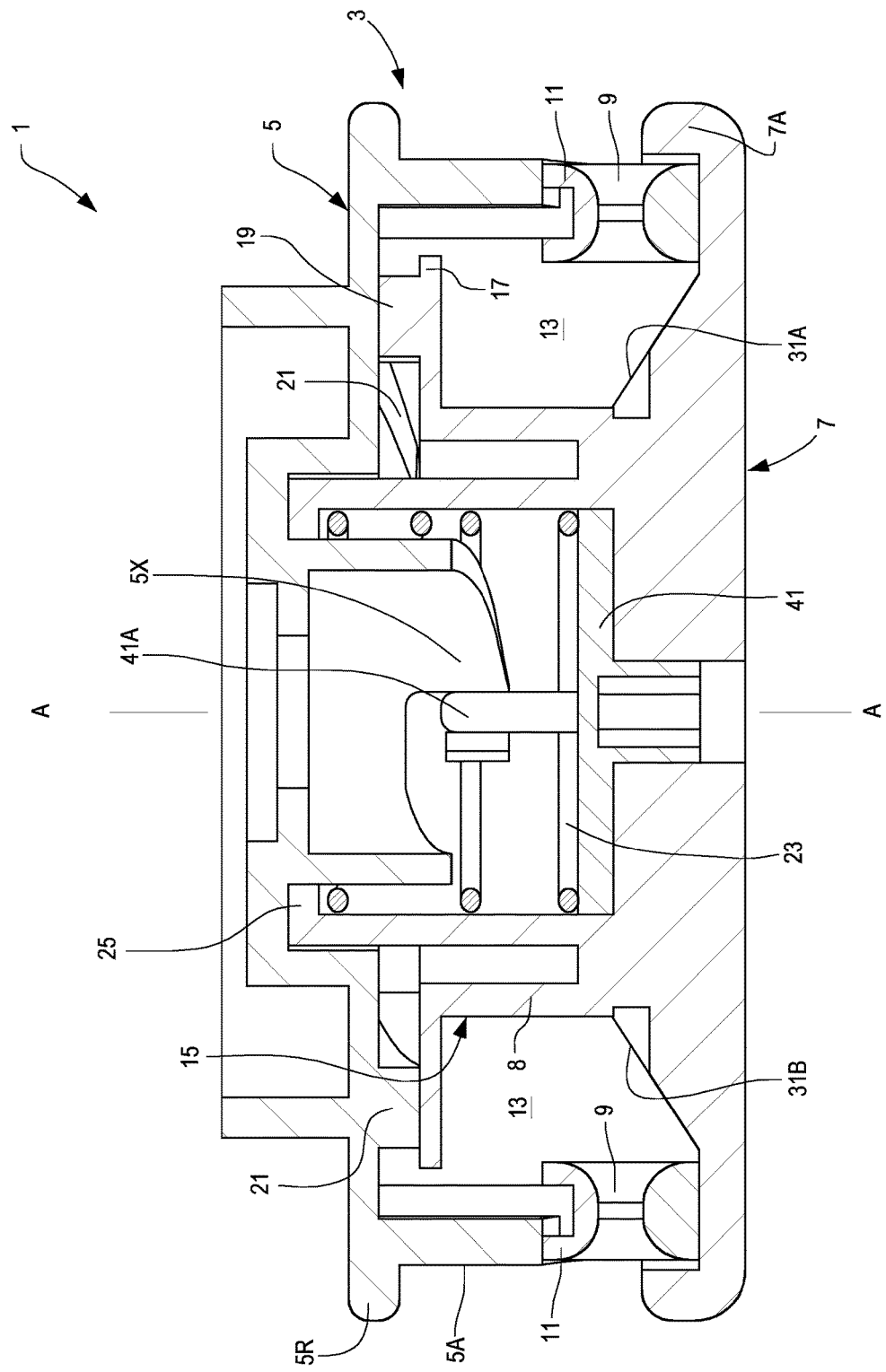
Figure 47:
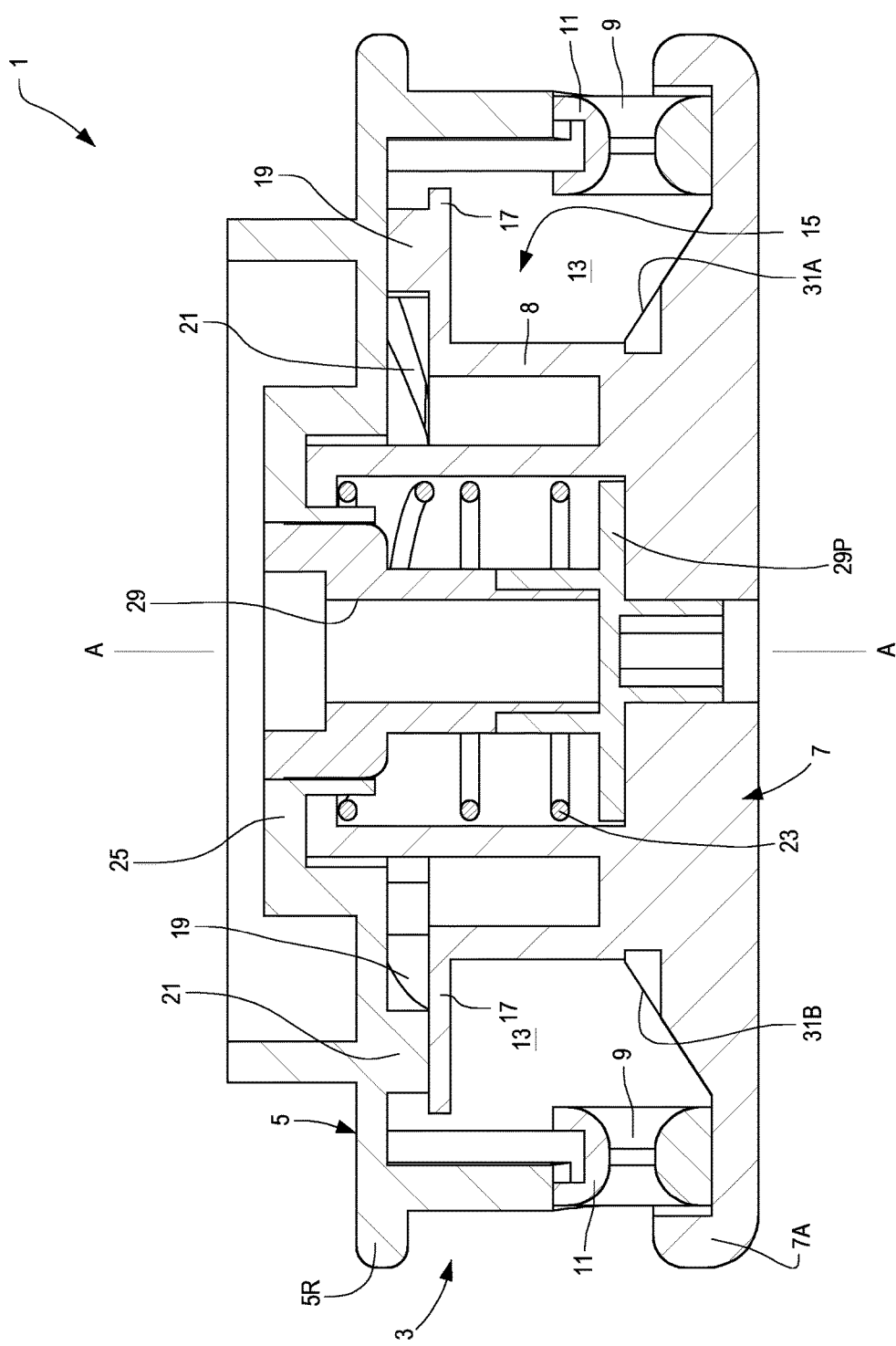
Figure 48:
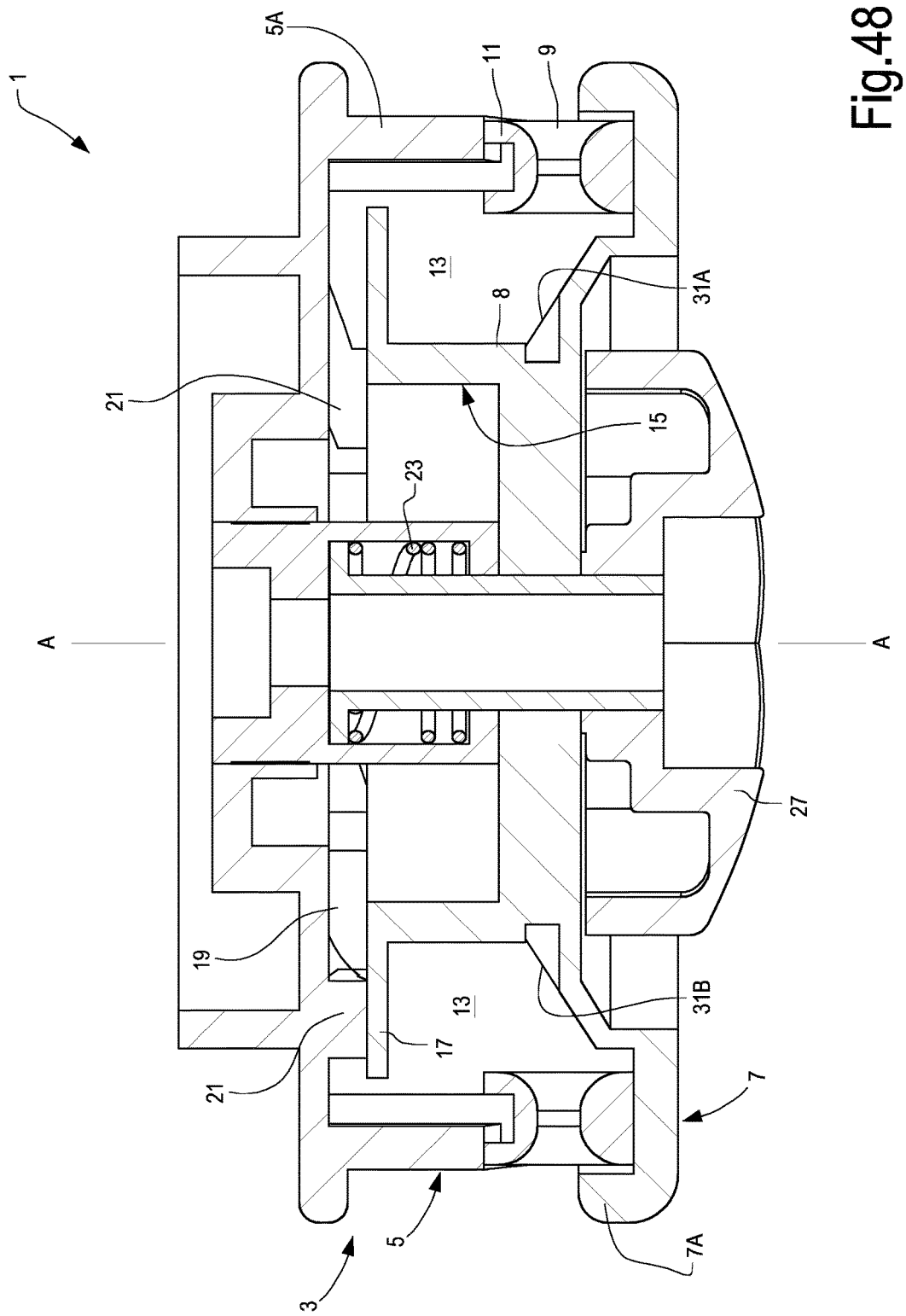
Figure 49:
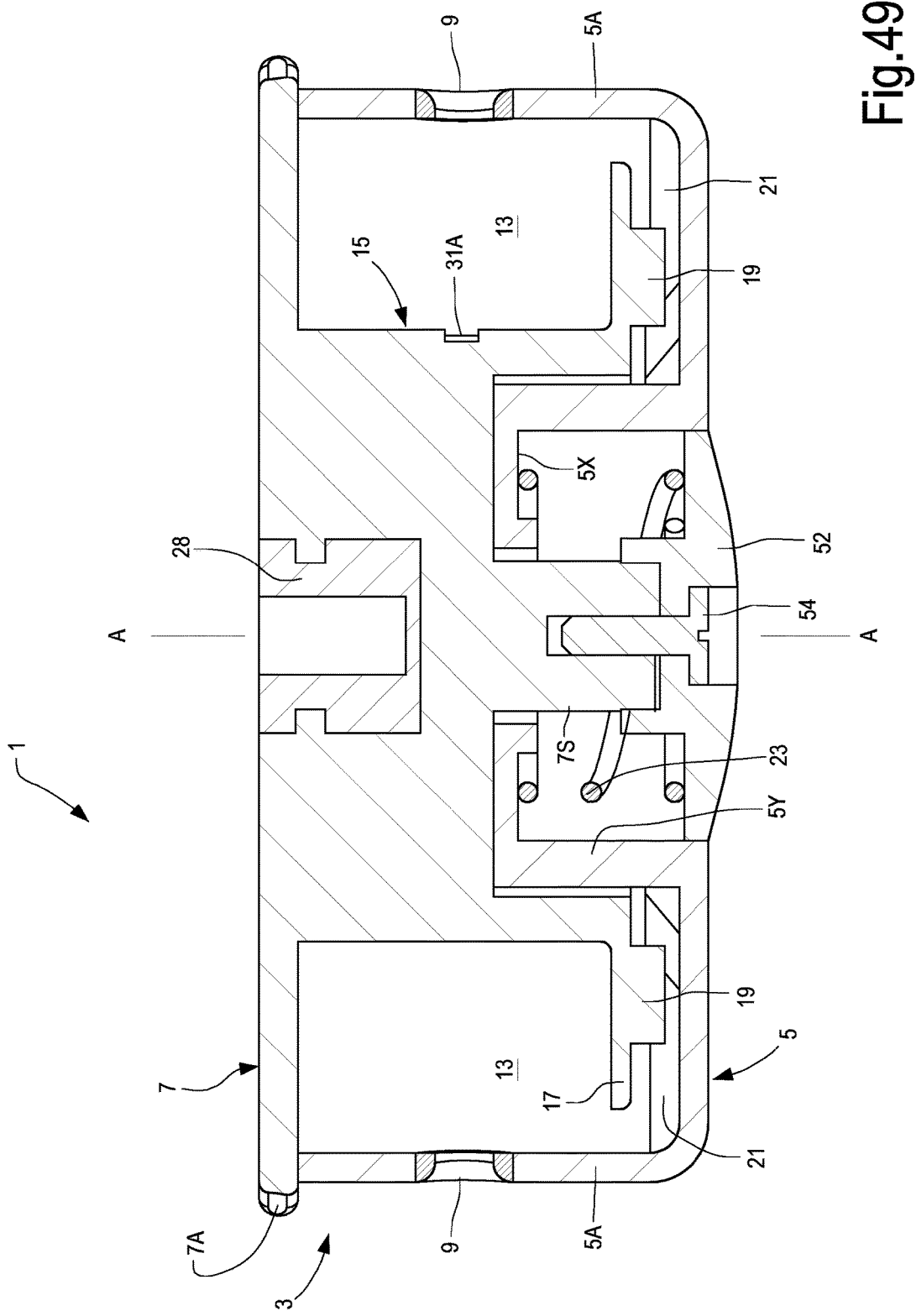
Figure 50:
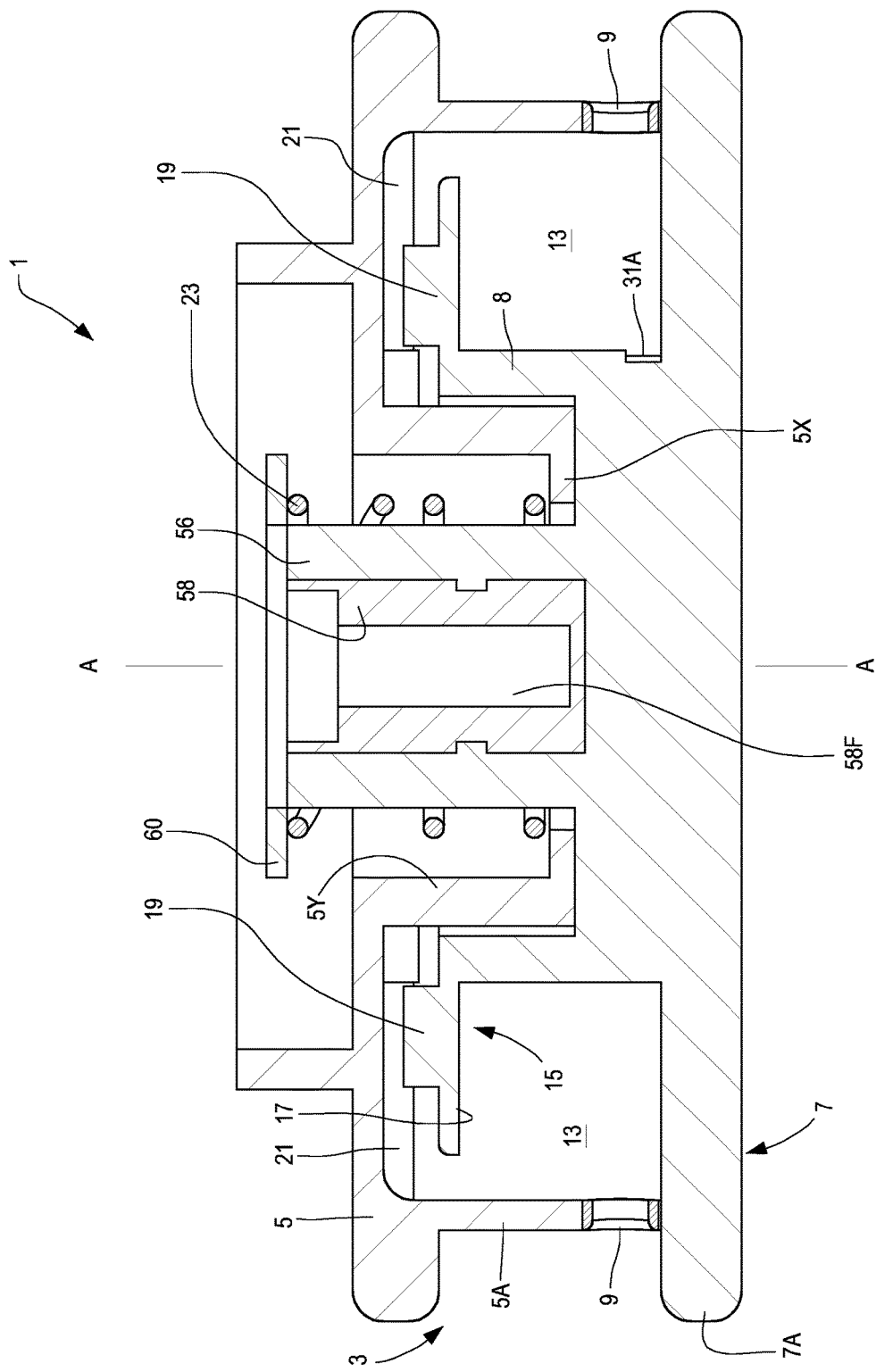
Figure 51:
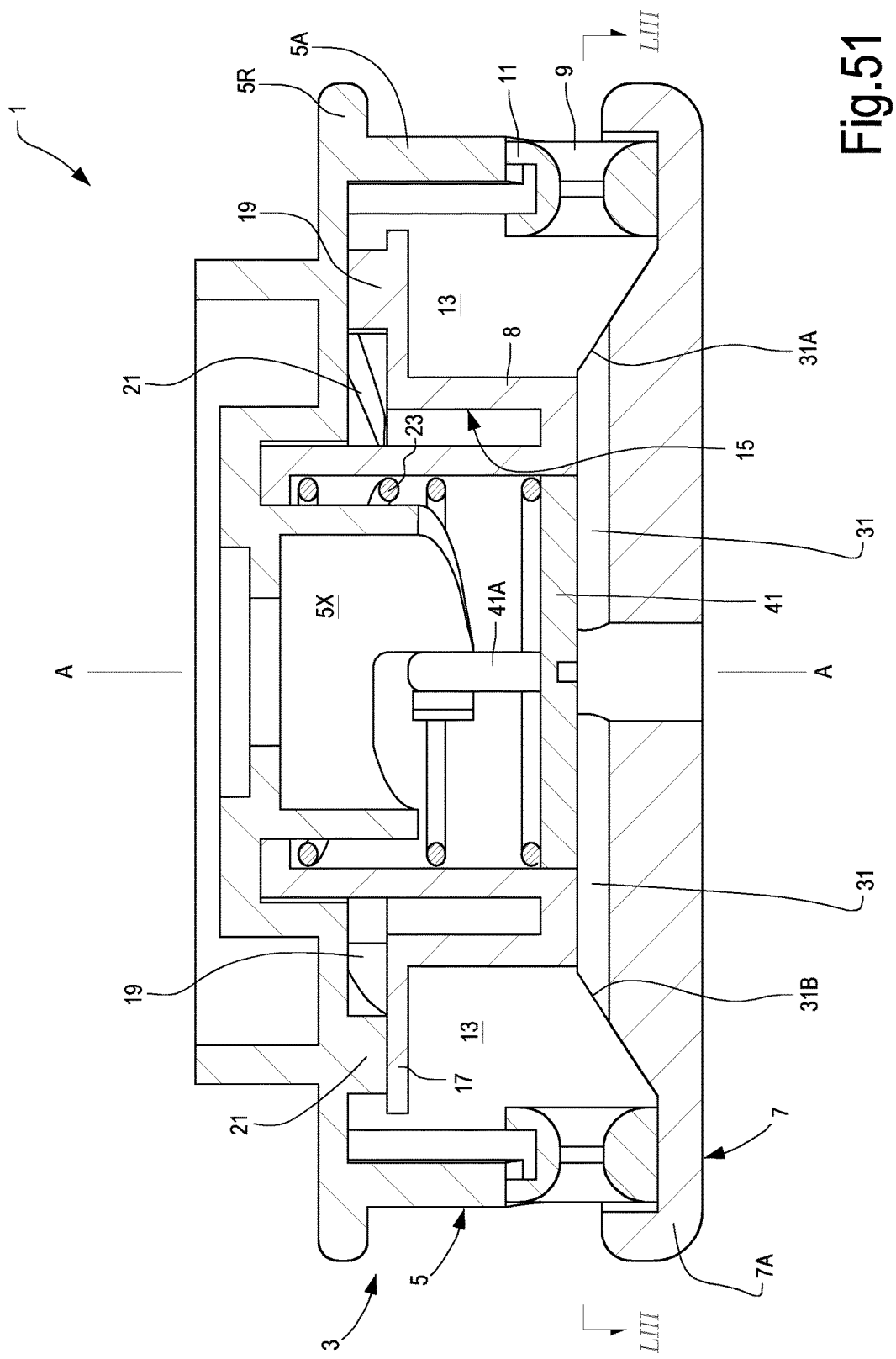
Figure 52:
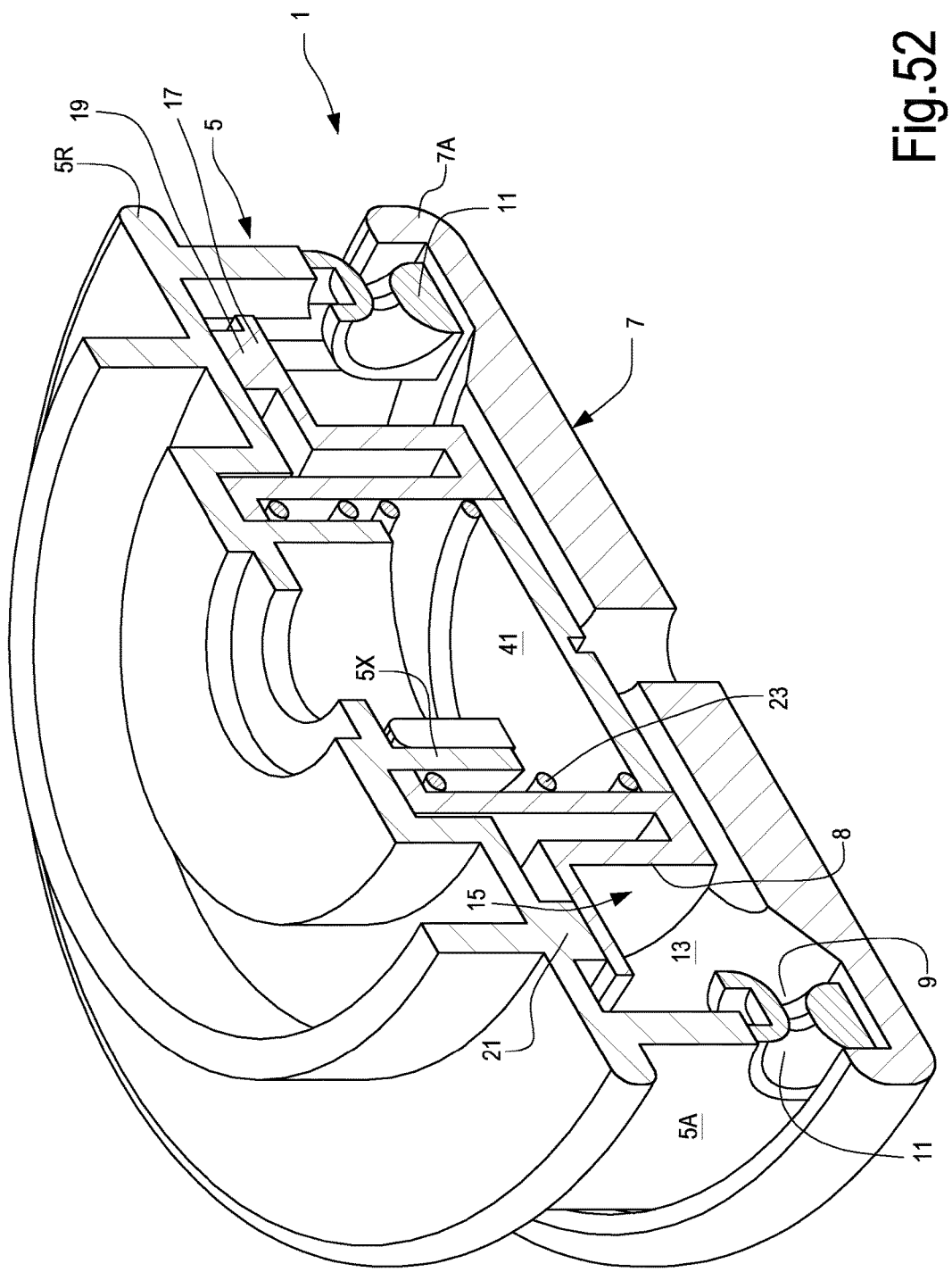
Figure 53:
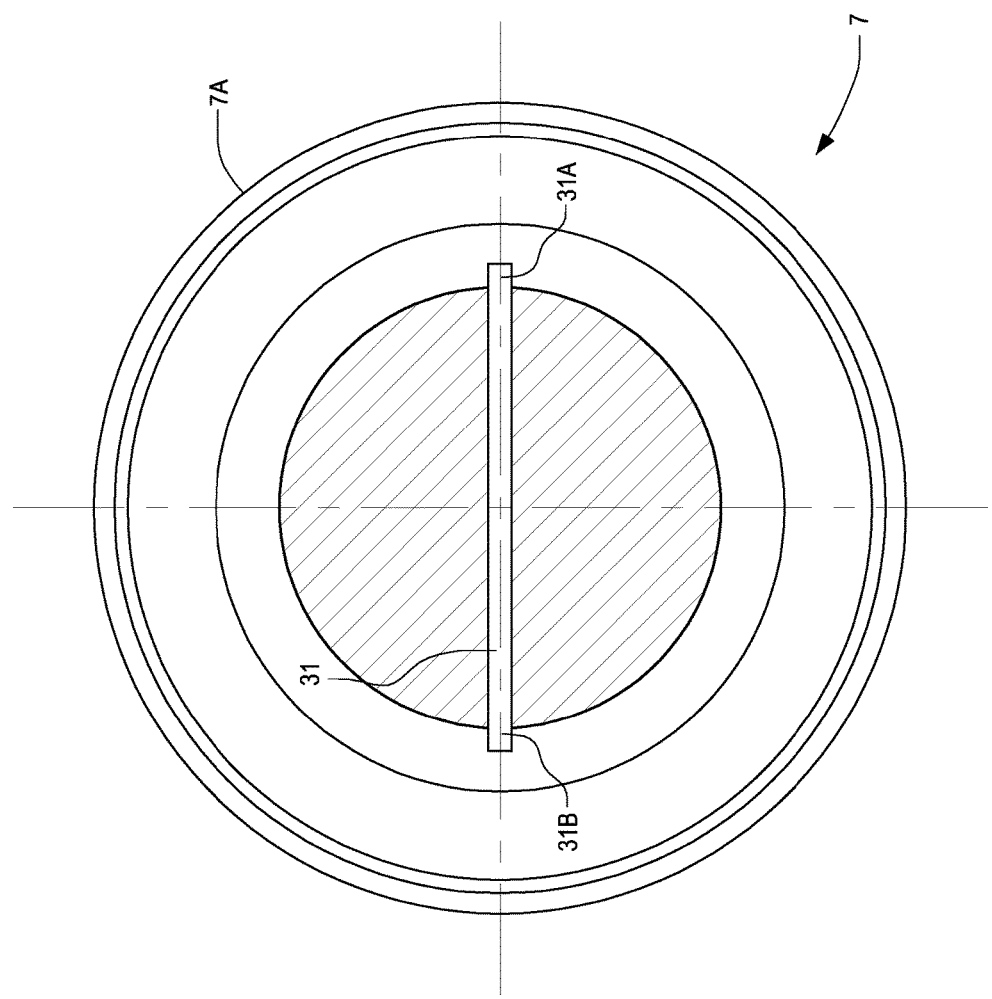

FIGS. from 22 to 26 show axial cross sections of variants of embodiment of the trimmer head of FIGS. 19 to 21;

FIG. 27 shows an axial cross section of a further embodiment of a trimmer head;

FIG. 28 is a cross-cut axonometric view of the trimmer head of FIG. 27;

FIG. 29 shows a cross section according to XXIX-XXIX of FIG. 27;

FIGS. from 30 to 34 show axial cross sections of variants of embodiment of the trimmer head of FIGS. 27 to 29;

FIG. 35 shows an axial cross section of a further embodiment of a trimmer head;

FIG. 36 is a cross-cut axonometric view of the head of FIG. 35;

FIG. 37 shows a cross section according to XXXVII-XXXVII of FIG. 35;

FIGS. 38 to 42 show axial cross sections of modified embodiment of the head of FIGS. 35 to 37;

FIG. 43 shows an axial cross section of a further embodiment of a trimmer head;

FIG. 44 is a cross-cut axonometric view of the head of FIG. 43;

FIG. 45 shows a cross section according to XLV-XLV of FIG. 43;

FIGS. 46 to 50 show axial cross sections of modified embodiment of the trimmer head of FIGS. 43 to 45;

FIG. 51 shows an axial cross section of a further embodiment of a trimmer head;

FIG. 52 is a cross-cut axonometric view of the trimmer head of FIG. 51;

FIG. 53 shows a cross-section according to LIII-LIII of FIG. 51; and

Figure 54:
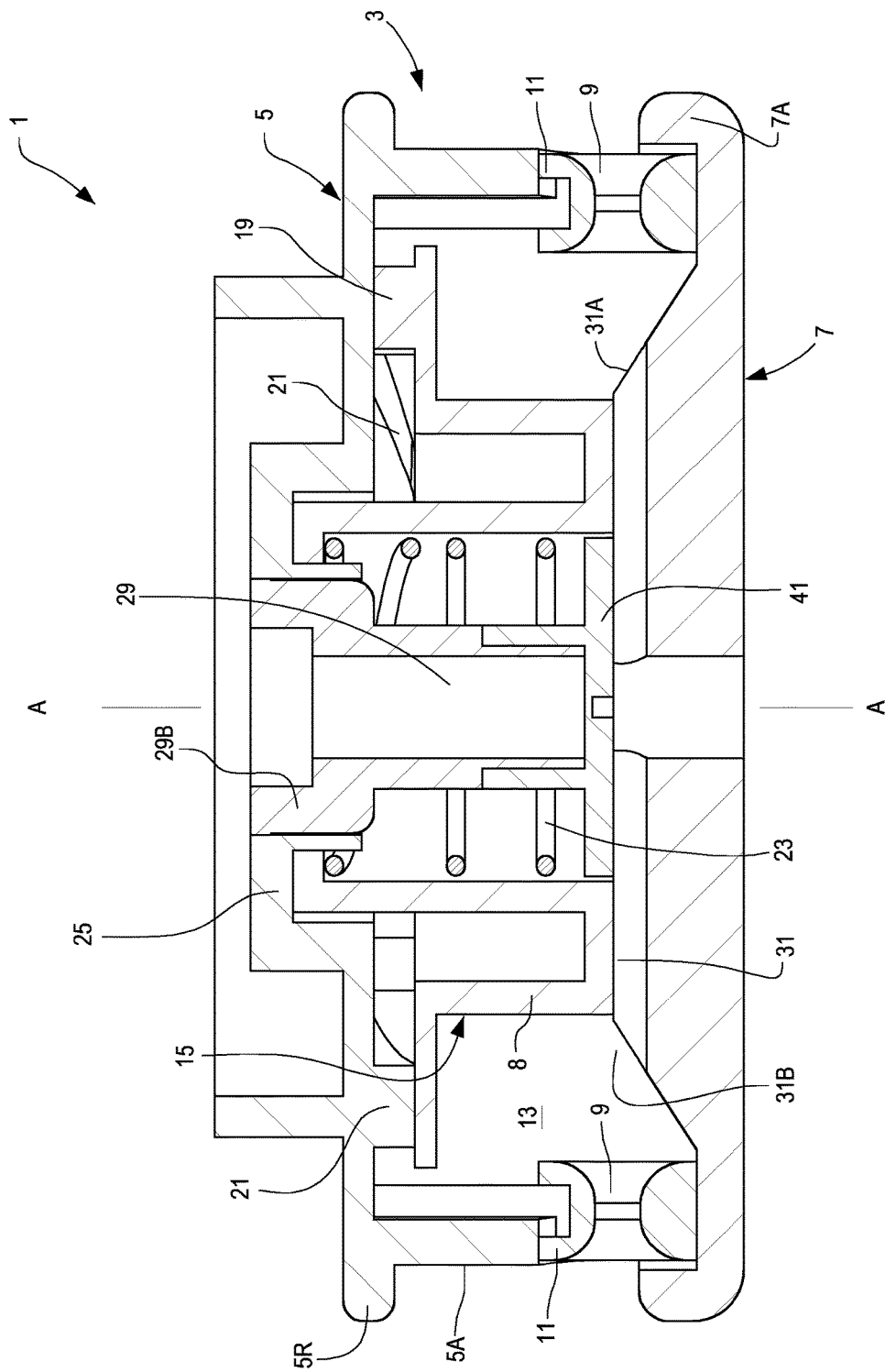
Figure 55:
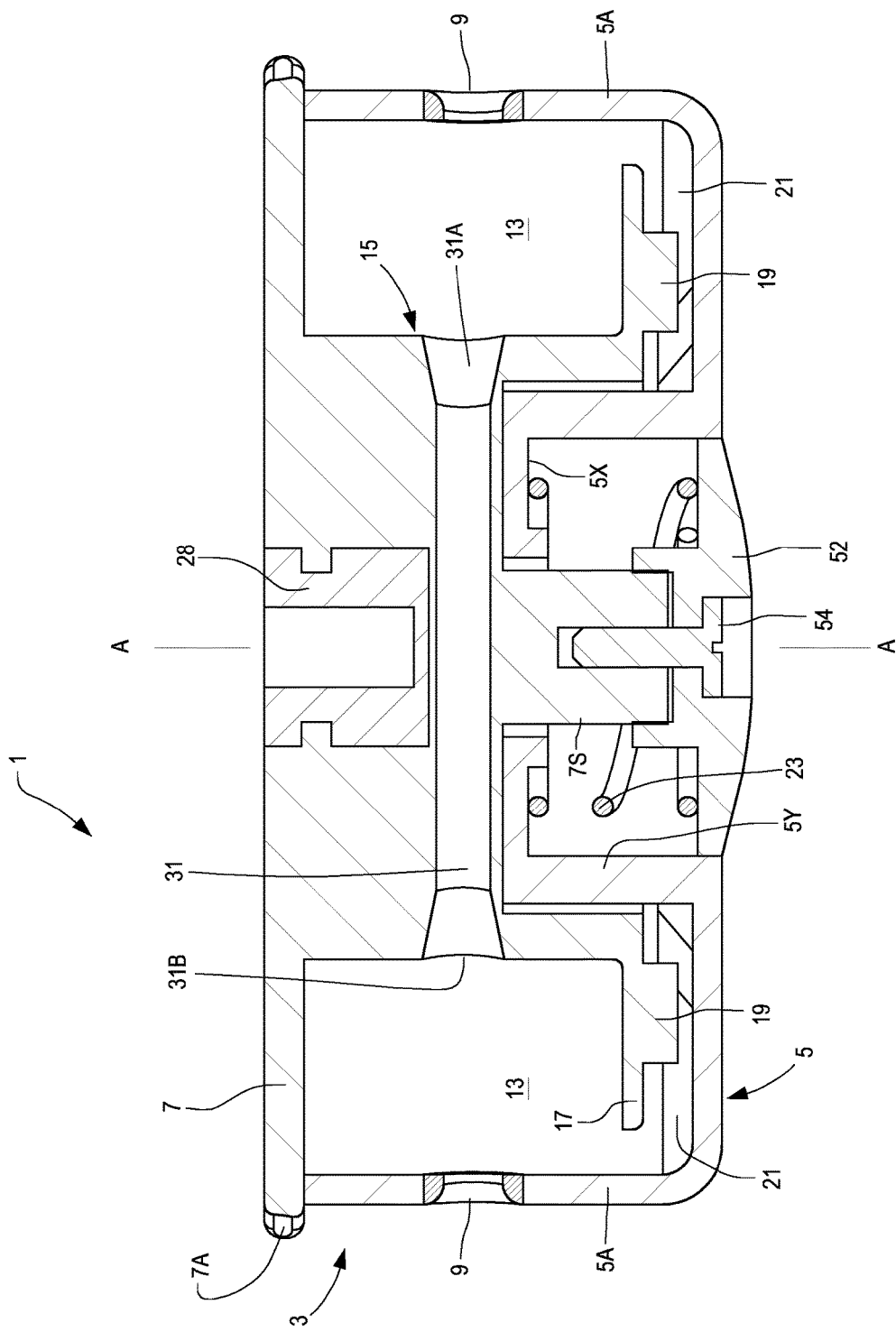
Figure 56:
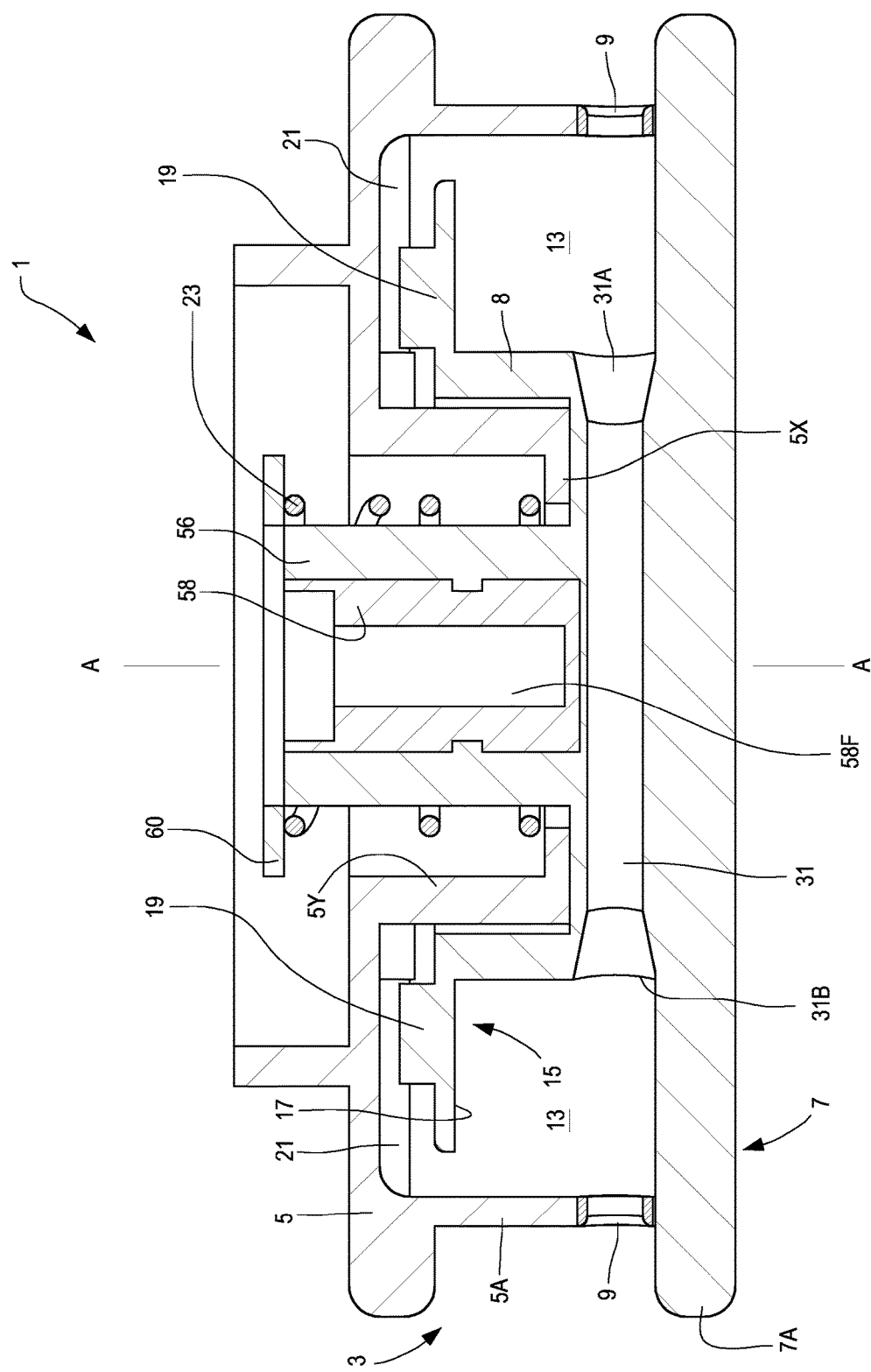

FIGS. 54 to 56 show modified embodiment of a trimmer head according to FIGS. 51 to 53.

DETAILED DESCRIPTION OF EMBODIMENTS

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

In the description below, the terms "upper", "above", "high", "lower", "below", "low", and the like refer to the head in working position, with the rotation axis approximately orthogonal to the ground.

FIGS. from 1 to 5 show a first embodiment of a line-type trimmer head according to the present invention.

The trimmer head is indicated as a whole with number 1, and may comprise a housing 3 that is composed of a first housing portion 5 and a second housing portion 7. The first housing portion 5 may have an approximately cylindrical side wall 5A. In the side wall 5A, exit holes 9 may be provided for a cutting line schematically indicated with letter F in FIG. 1, and omitted in the other figures for the sake of clarity of representation. In advantageous embodiments, the exit holes 9 are provided in bushings 11, which may be suitably mounted in the approximately cylindrical side wall 5A of the first housing portion 5.

In some embodiments, the housing 3 may be made of molded plastic. The bushings 11, where the exit holes 9 for the cutting line F are provided, may be made of metal, for instance brass or the like.

Figure 2:
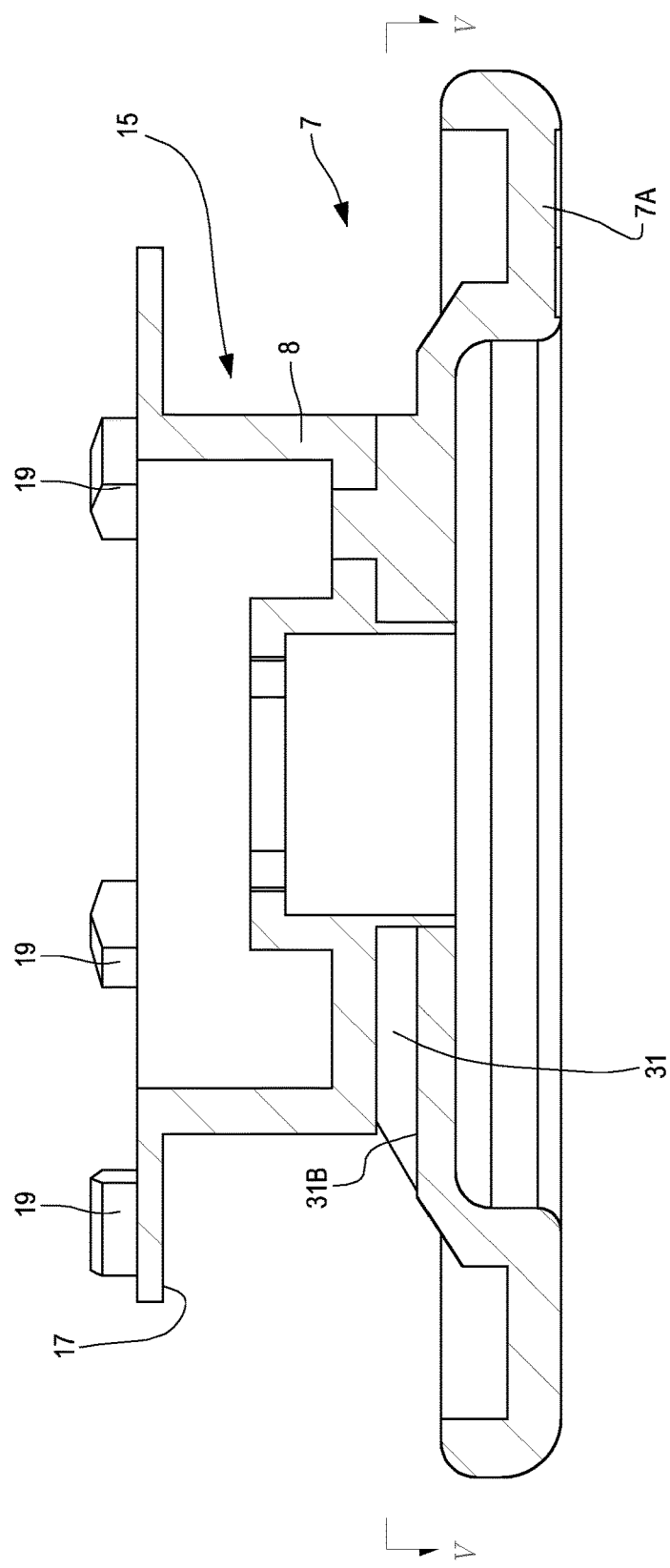
FIG. 2 shows an axial cross section of the lower portion, or second portion, of the housing of the head of FIG. 1.
Figure 3:
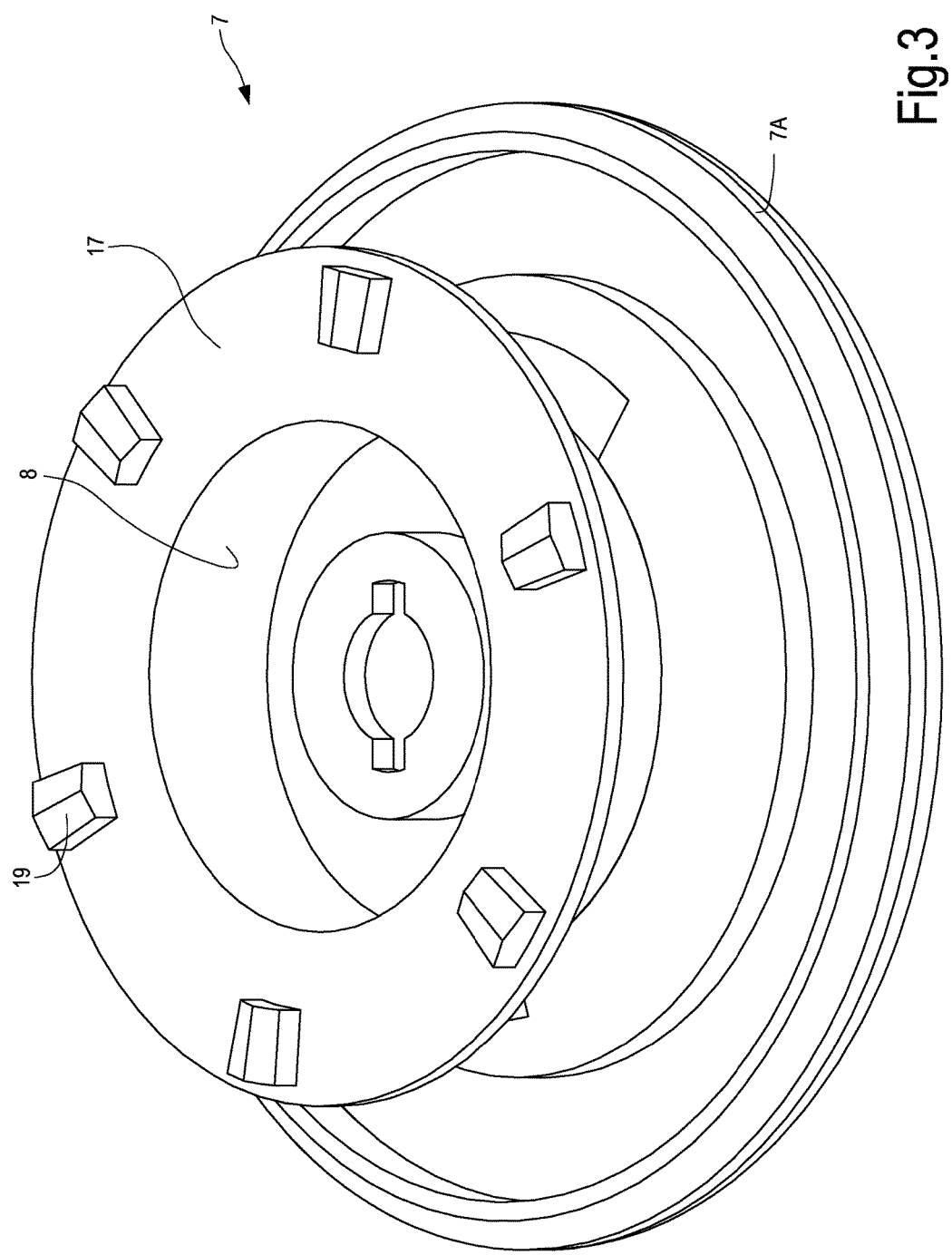
FIG. 3 is an axonometric view of the lower portion, or second portion, of the housing of the head of FIG. 1.

The second housing portion 7 may comprise a flange 7A forming a closing cover for an inner space 13 defined by the housing 3. A stock of cutting line F may be formed in the space 13, in the form of turns wound around a spool 15 constituted by the second housing portion 7. In advantageous embodiments, the flange 7A and the spool 15 may be made in a single piece, i.e. like a molded single block, preferably made of resin. The block constituted by the second housing portion 7 is shown separately in FIGS. 2 and 3, for the sake of clarity.

Figure 1:
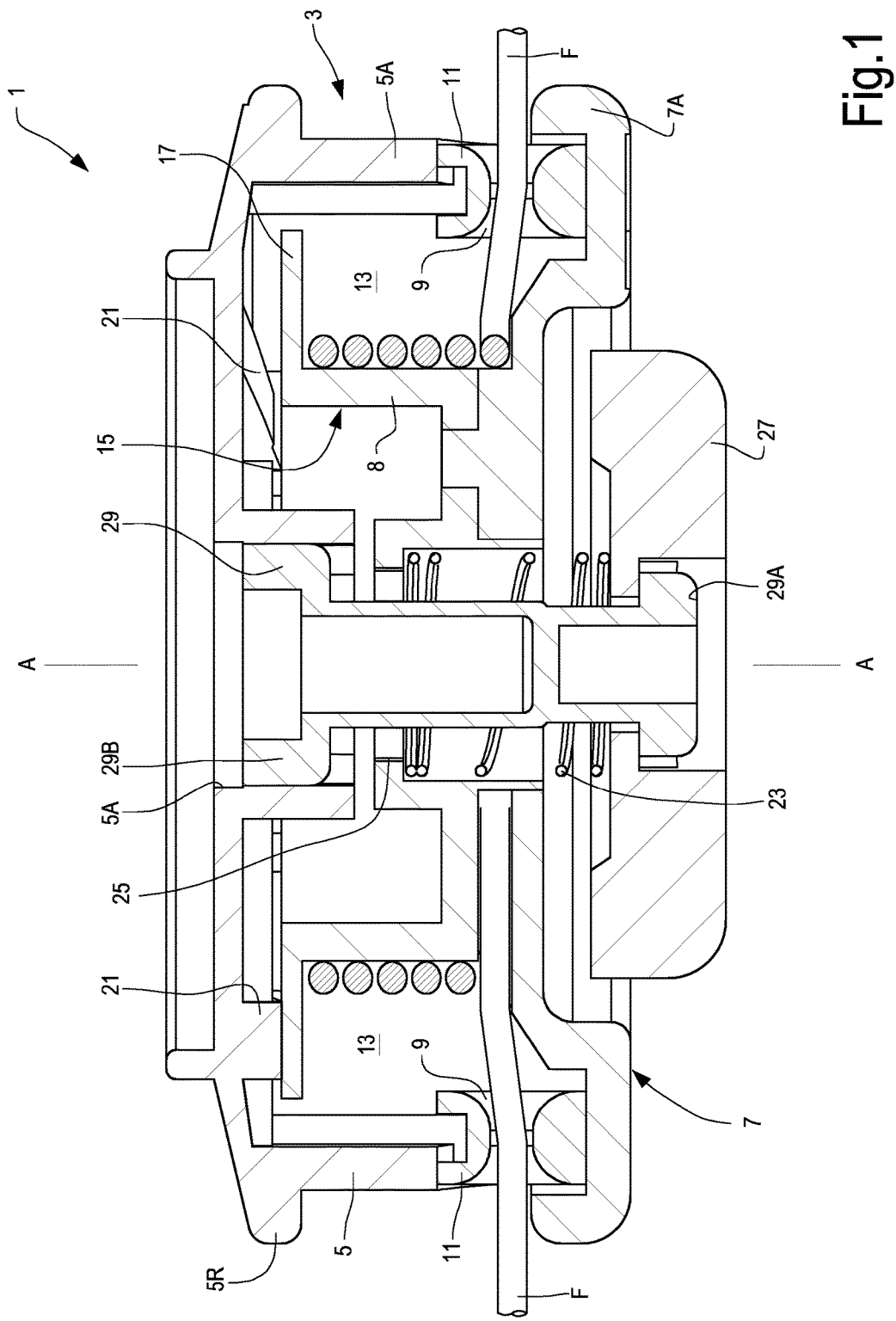
FIG. 1 is a cross section, according to a plane containing the rotation axis, of a first embodiment of a trimmer head.

The spool 15, formed by the second housing portion 7, may have an inner flange 17 arranged at a given distance D from the flange 7A, so that a space, where the turns of cutting line F can be wound, is formed between the outer flange 7A, constituting the closing for the housing 3, and the inner flange 17, as schematically shown in FIG. 1.

Figure 4:
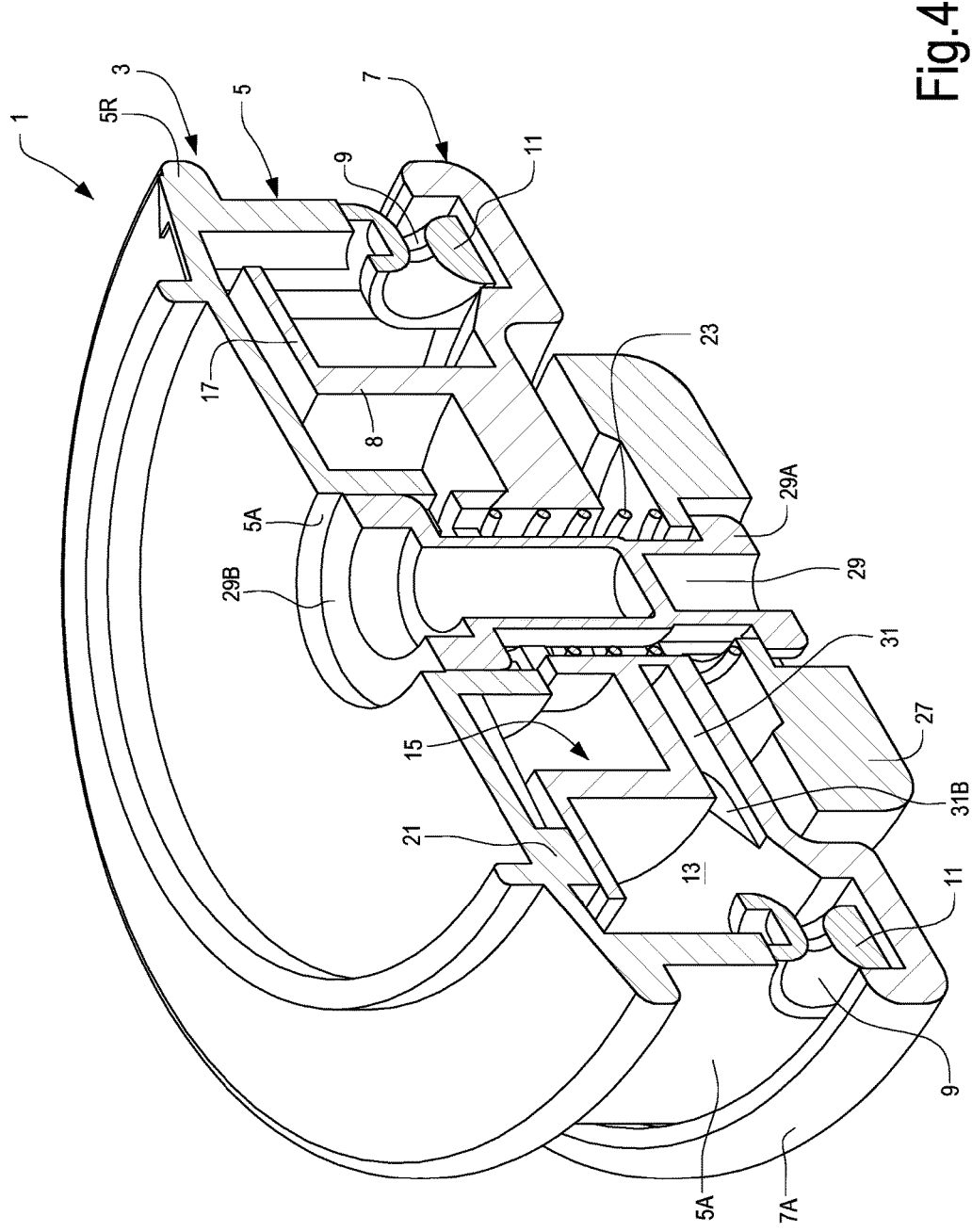
FIG. 4 is a cross-cut axonometric view of the head of FIGS. 1, 2 and 3.

An approximately cylindrical wall 8 may be provided between the inner flange 17 and the outer flange 7A of the second housing portion 7, the wall being substantially coaxial with the rotation axis A-A of the trimmer head 1 when the head is assembled (FIGS. 1 and 4).

Front teeth 19 may be provided on the side of the flange 17 facing towards the first housing portion 5, which co-act with corresponding front teeth 21 (FIGS. 1 and 4) formed on the side facing towards the inside of an upper wall of the first housing portion 5. In this way, two opposite front toothings 19 and 21 are formed, co-acting with each other to torsionally couple the first housing portion 5 to the second housing portion 7. In this way, when the trimmer head 1 rotates around its rotation axis A-A, by means of a torque applied to the head 1 as described below, the torsional coupling between the two housing portions 5 and 7 allows the portions to rotate one integral with the other.

In some embodiments, to keep the first housing portion 5 torsionally coupled to the second housing portion 7 by means of the front toothings 19, 21, a resilient member 23 may be provided, for example a compression spring, for instance a helical compression spring. The resilient member 21 may be arranged coaxial to the rotation axis A-A of the trimmer head 1. The resilient member 23 may react between a collar 25, for example formed in a single piece with the housing portion 7, and a knob 27 that can be axially fastened to the trimmer head 1 as described below. The resilient thrust of the resilient member 23 onto the collar 25 pushes the housing portion 7 against the housing portion 5, so that the front toothing 19 co-act with the front toothing 21.

The knob 27 is kept axially coupled to the trimmer head 1 by means of a shaft 29, which may be coaxial with the rotation axis A-A of the trimmer head 1. This coupling may be provided by means of a bayonet coupling, a screw coupling or a similar coupling, not shown in detail, provided at a head 29A of the shaft 29.

In advantageous embodiments, the shaft 29 may be stably coupled to the first portion 5 of the housing 3. For example, the shaft 29 may have a portion 29B of increased diameter that is snap-coupled, screwed, welded, or otherwise mounted, inside a seat 5A (see in particular FIG. 4) provided in the upper surface of the first housing portion 5. The shaft 29 may be internally threaded or have other systems for mechanical coupling to a drive shaft (not shown) of a bush cutter or other machine actuating the trimmer head 1.

Figure 5:
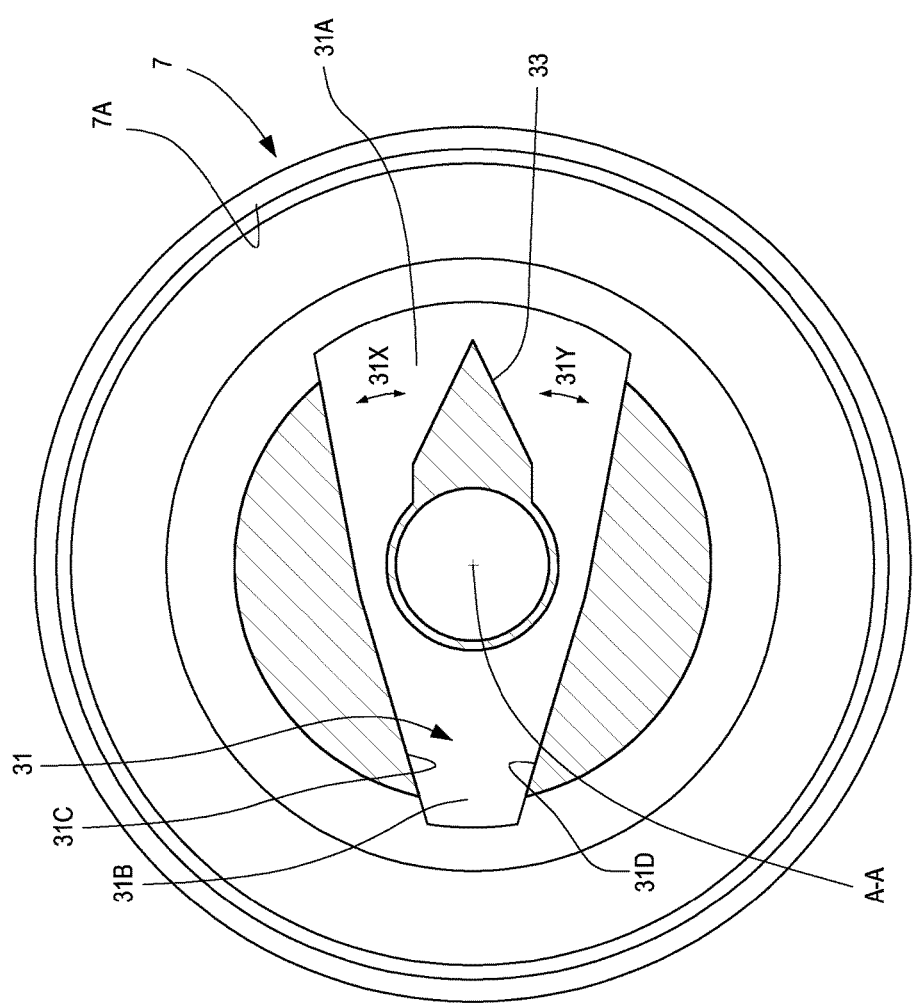
FIG. 5 shows a cross section according to V-V in FIG. 2.

As shown in detail in the cross section of FIG. 5, a transverse passage 31 is provided inside the second housing portion 7; the cutting line F is guided through this passage to place, or restore, a stock of cutting line inside the volume 13 of the trimmer head 1. This transverse passage 31 is partially shown also in FIGS. 1, 2, and 4.

The transverse passage 31 has two ends, shown at 31A and 31B respectively (FIG. 5). In the embodiment of FIGS. 1-5, the first end 31A of the transverse passage 31 is flared, i.e. it is wider, in tangential direction, than the end 31B, the two ends 31A, 31B being diametrically opposite with respect to the rotation axis A-A of the trimmer head 1.

In the illustrated embodiment, the first end 31A of the transverse passage 31 has, in a substantially intermediate position, an intermediate diaphragm 33, which divides the end 31A of the transverse passage 31 into two parts 31X and 31Y. These two parts of the transverse passage 31 converge towards the end 31B. Side walls 31C and 31D of the transverse passage 31 converge with respect to each other towards the end 31B of the transverse passage.

In the arrangement of FIGS. 1 to 4, the first housing portion 5 and the second housing portion 7 are angularly arranged so that the end 31B of the transverse passage 31 is opposite an exit hole 9. More in particular, with reference to FIG. 1, the end 31B of the transverse passage 31 is arranged opposite the exit hole 9 shown on the left in FIG. 1. The intermediate diaphragm 33, dividing the transverse passage 31 into two parts 31X, 31Y near the ends 31A, is arranged opposite the other exit hole 9 for the cutting line F.

When assembled together (FIGS. 1 and 4), the two portions 5, 7 of the housing 3 are torsionally and axially coupled together due to the effect of the compression spring 23 and the front toothings 19, 21. A stock of cutting line F is provided inside the volume 13. By rotating the trimmer head 1 around the rotation axis A-A, the ends of the cutting line F, projecting from the housing 3 through the exit holes 9 provided in the bushings 11, are tensioned due to the centrifugal force, thus forming cutting members to cut the vegetation. In use, the cutting line F wears and may break. When this occurs, it is necessary to replace a suitable length of cutting line F projecting from both the bushings 11. To this end, it is sufficient to take, with both the hands, the two housing portions 5, 7 and to move them axially away from each other against the force of the resilient member 23 to an extent sufficient to release the front toothings 19, 21. Then, it is possible to rotate the two portions 5, 7 with respect to one another, in order to unwind a suitable portion of cutting line F. When released, the two housing portions 5, 7 return into torsional coupling position due to the effect of the resilient member 23, and the trimmer head 1 may be driven again into fast rotation so that the portions of cutting line F unwound as described above are tensioned due to centrifugal force.

When the stock of cutting line F contained in the volume 13 inside the housing 3 finishes, it is possible to replace a suitable length of cutting line F without the need for the trimmer head to be opened, as described below.

The two portions 5, 7 of the housing 3 are axially distanced and torsionally released from one another through compression of the resilient member 23, and they are then rotated with respect to each other until the end 31B of the transverse passage 31 is aligned with one or the other of the two bushings 11 and the respective exit holes 9 for the cutting line F. A mark printed on the lower surface of the second housing portion 7 in correspondence of the end 31B of the transverse passage 31 may facilitate this positioning. Once this position has been achieved, the trimmer head 1 may be released, to allow the toothings 19, 21 to couple together again. A portion of cutting line F of suitable length may be inserted with a first end through the bushing 11, opposite with respect to the bushing aligned with the end 31B of the transverse passage 31. By inserting this free end of the cutting line F inside the housing 3 of the trimmer head 1, the end of the cutting line reaches the diaphragm 33 and is guided in one or the other of the two portions 31X, 31Y, into which the diaphragm divides the transverse passage 31. By further pushing the cutting line F inside the housing 3, the free end thereof is guided along the transverse passage 31 around the rotation axis A-A of the trimmer head 1, until the cutting line exits from the end 31B of the transverse passage 31, enters the opposite hole 9, and exits there through towards the outside of the housing 3.

Once the free end of the cutting line F has exited the bushing 11, opposite to the bushing through which the free end has been inserted in the housing 3, the operator can grip the free end and make the cutting line F slide through the trimmer head 1 until a suitable amount thereof, for instance some meters, projects. If the cutting line is unwound from a large package of cutting line, it can be cut at the side it has been inserted in the cutting head, so as to have the same length of line projecting from both the exit holes 9. If the overall length of the line is such that it can be entirely wound in the housing 3 of the head 1, it is sufficient that the operator draws the cutting line through the cutting head 1 until two substantially equal lengths thereof project from the two exit holes 9.

Once this operation has been done, the stock of cutting line may be wound inside the volume 13 defined in the housing 3, by rotating the two housing portions 5, 7 with respect to each other. The rotation is performed manually, by acting in a way similar to that described for unwinding the cutting line F and replacing the line length projecting from the trimmer head, namely: the operator holds the two portions 5,7 of the housing 3 and moves them slightly away from each other in axial direction against the thrust of the resilient member 23, until the front toothing 19 is released from the front toothing 21; then the operator rotates one housing portion with respect to the other. In this way, the cutting line F is wound around the spool 15 formed by the second housing portion 7 of the trimmer head 1. The line is wound until the length of the two portions of cutting line F projecting through the exit holes 9 is suitable to cut the vegetation.

In view of the above description it is clearly apparent that it is not necessary to open the housing 3 of the trimmer head 1 to replace the cutting line F in the spool 15 formed by the second housing portion 7. The replacement operation is therefore very easy.

To facilitate winding and unwinding of the cutting line F, the first housing portion 5 may be provided with an annular projection 5R opposite to the flange 7A of the second housing portion 7. The projection 5R and the edge of the flange 7A form gripping members for the operator, useful both in the unwinding step and in the winding, or replacement, step of the cutting line F according to what described above.

Figure 6:
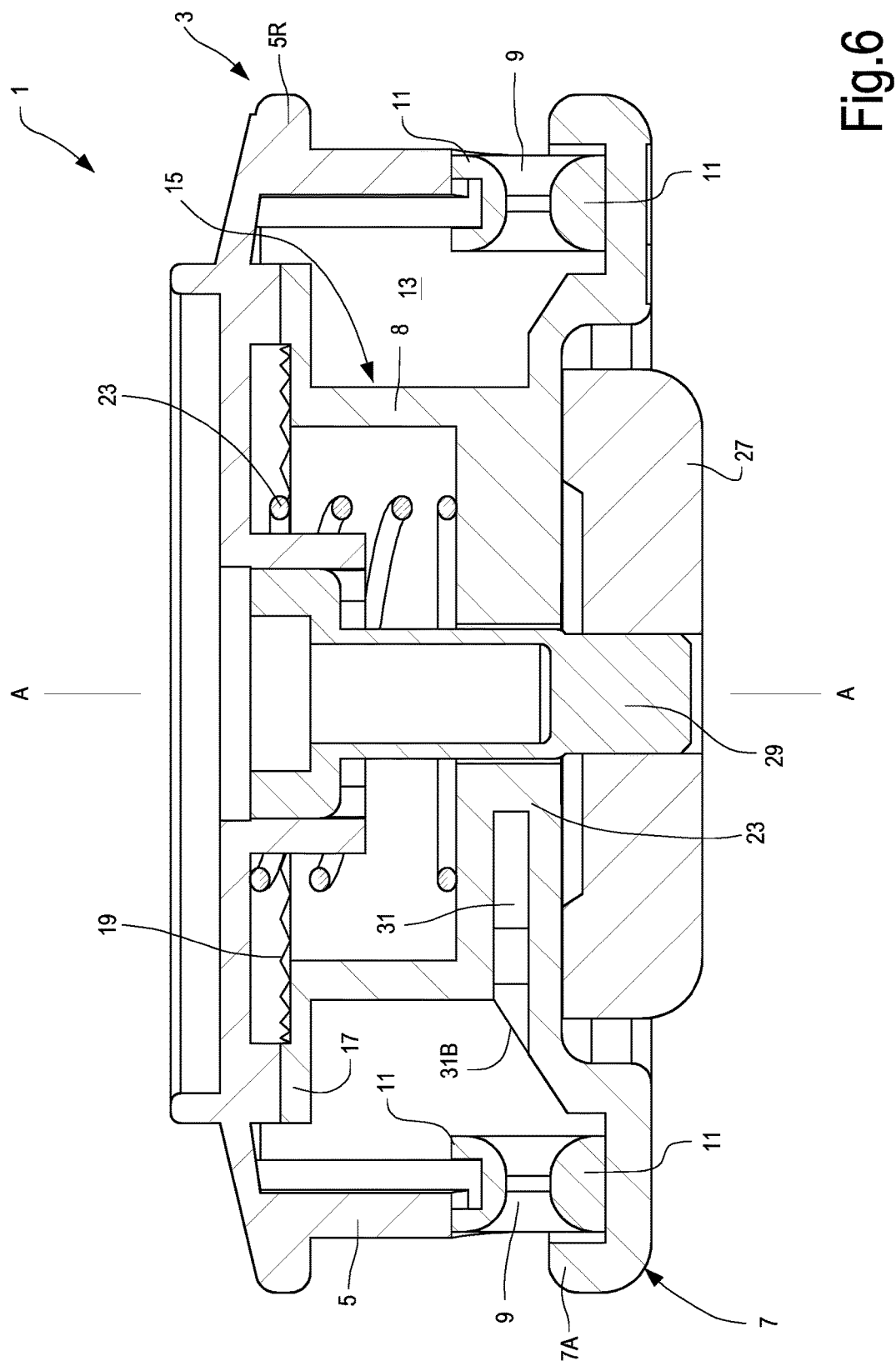
FIG. 6 shows an axial cross section of a second embodiment of a trimmer head.
Figure 7:
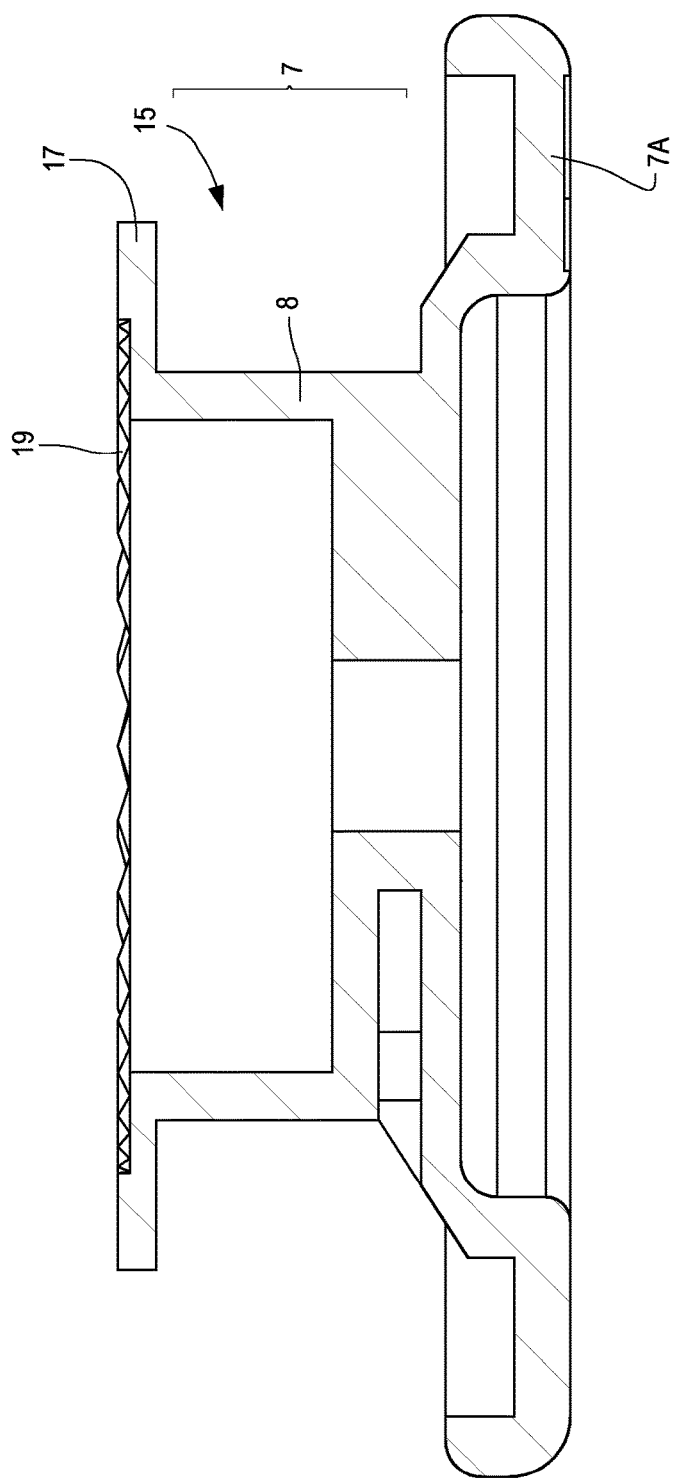
FIG. 7 shows an axial cross section of the lower portion, or second portion, of the housing of the head of FIG. 6.
Figure 8:
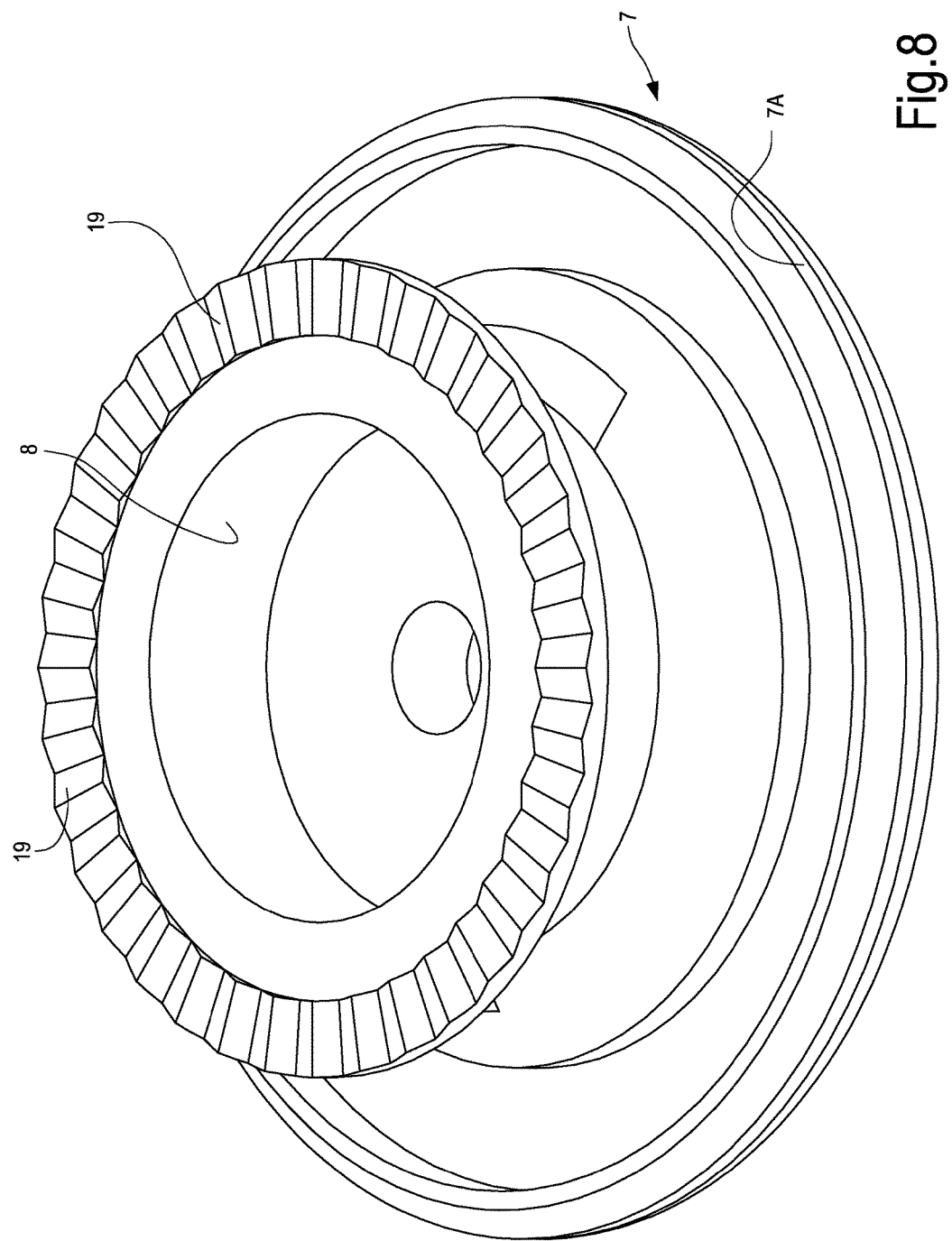
FIG. 8 is an axonometric view of the housing portion of FIG. 7.

FIGS. 6 to 8 show a modified embodiment of the trimmer head of FIGS. 1 to 5. The same numbers indicate parts identical or equivalent to those of the embodiment of FIGS. 1 to 5. These parts will not be described again.

The embodiment of FIGS. 6-8 differs from the embodiment of FIGS. 1-5 in that the front toothings have a slightly different shape, in particular the toothing 19 being shown in FIGS. 7 and 8, and in the different way the two portions 5 and 7 of the housing 3 of the trimmer head 1 couple together axially and torsionally.

In fact, in the embodiment of FIGS. 6 to 8, the two housing portions 5, 7 are coupled together by means of the knob 27 and the shaft 29, for instance by means of a bayonet coupling or a threaded coupling.

The coupling is such that the knob 27 pushes the second housing portion 7 against the first housing portion 5, engaging the front toothings 19 (FIG. 7) and 21 (not shown in the drawing). This torsional and axial coupling presses the resilient member 23 that, in this embodiment again, may be formed by a helical compression spring or the like.

In order to torsionally release the first housing portion 5 from the second housing portion 7, it is sufficient to loosen the knob 27 from the shaft 29. To this end, the reciprocal coupling between these members is advantageously a threaded coupling, allowing loosening the members 27, 29 without disassembling them from each other. By loosening the knob 27 from the shaft 29, the resilient member 23 pushes the housing portion 7, moving it away from the housing portion 5. The reciprocal axial movement between the first housing portion 5 and the second housing portion 7 causes the front toothings 19, 21 to disengage allowing the two housing portions 5, 7 to rotate one with respect to the other. This allows lengthening the cutting line or to wind a new stock of cutting line F around the spool 15 formed as a single piece with the second housing portion 7.

Figure 9:
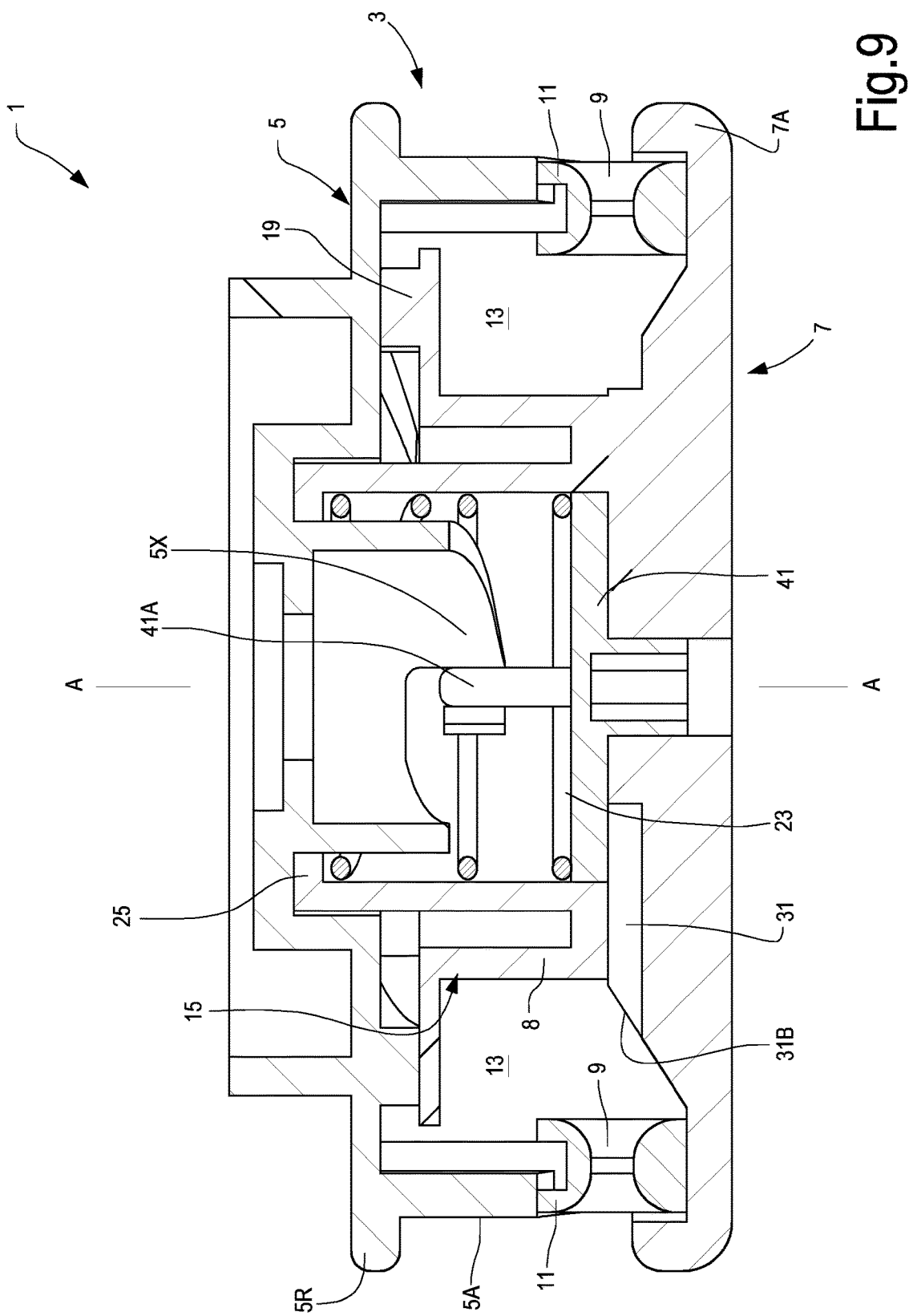
FIG. 9 shows an axial cross section of a further embodiment of a trimmer head.
Figure 10:
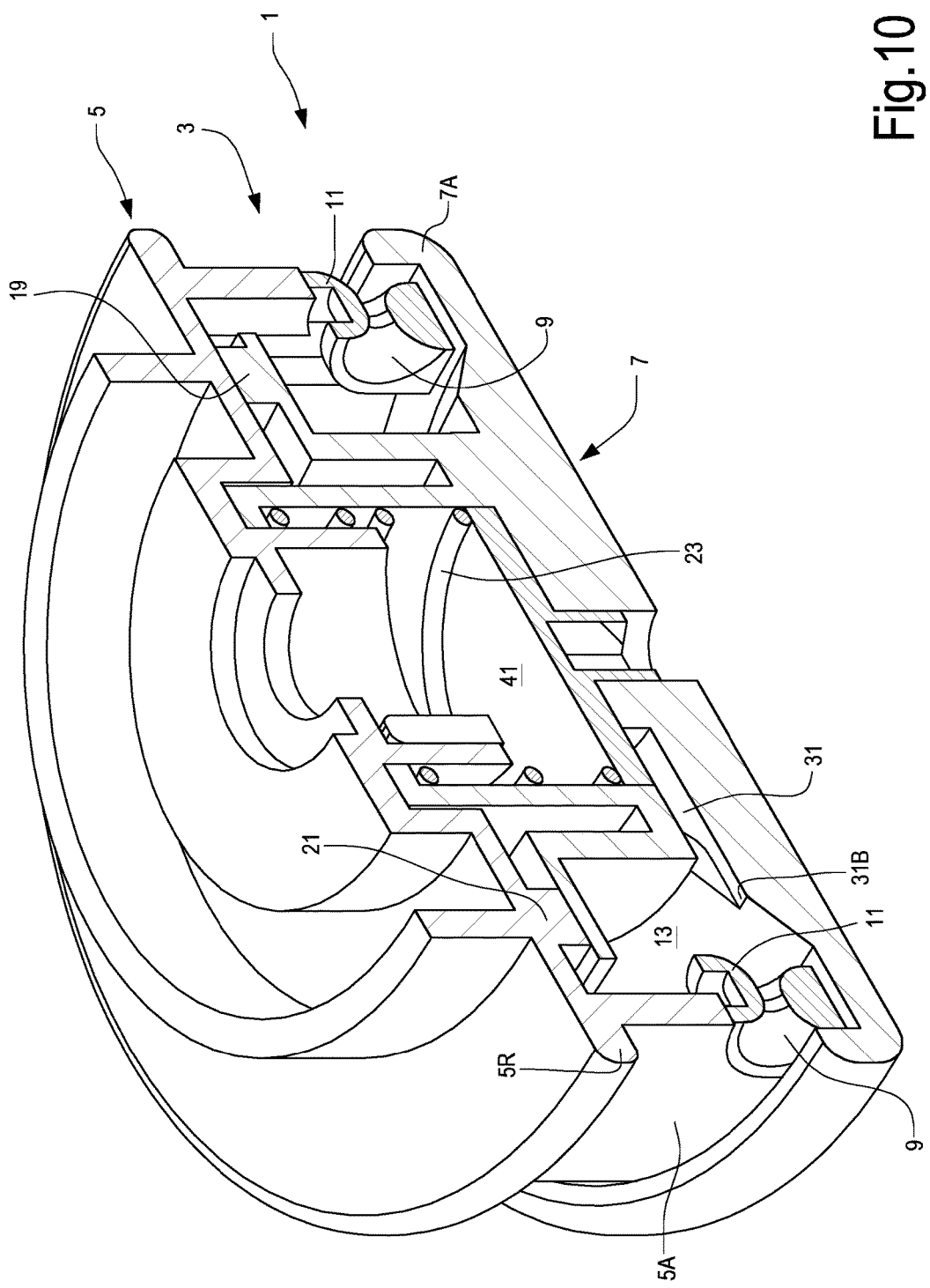
FIG. 10 is a cross-cut axonometric view of the head of FIG. 9.

FIGS. 9 and 10 show a modified embodiment of the trimmer head of FIGS. 1-5. Equal numbers designate equal or equivalent parts to those described above, that do not require further detailed explanations.

The embodiment of FIGS. 9 and 10 differs from the previous embodiments in the way the two housing portions 5 and 7 are axially and torsionally coupled together. In this embodiment, the resilient member 23 is arranged so that it is held between a projection 25, integral with the second housing portion 7, and a plate 41, mounted coaxially with the housing portion 7. The plate 41 has a hook 41A engaging a corresponding shaped slot 5X provided in a collar-shaped inner portion of the first housing portion 5.

To torsionally release the portions 5, 7 of the housing 3, it is sufficient to move them away from each other against the force of the resilient member 23, so as to release the front toothings 19, 21 one from the other.

To completely release the two housing portions 5, 7, it is sufficient to act from the bottom by acting on the plate 41 and pushing it, against the force of the spring 23, towards the inside of the housing 3, then rotating it around the rotation axis A-A of the trimmer head 1, so as to release the bayonet-coupling 41A from the slot 5X.

Figure 11:
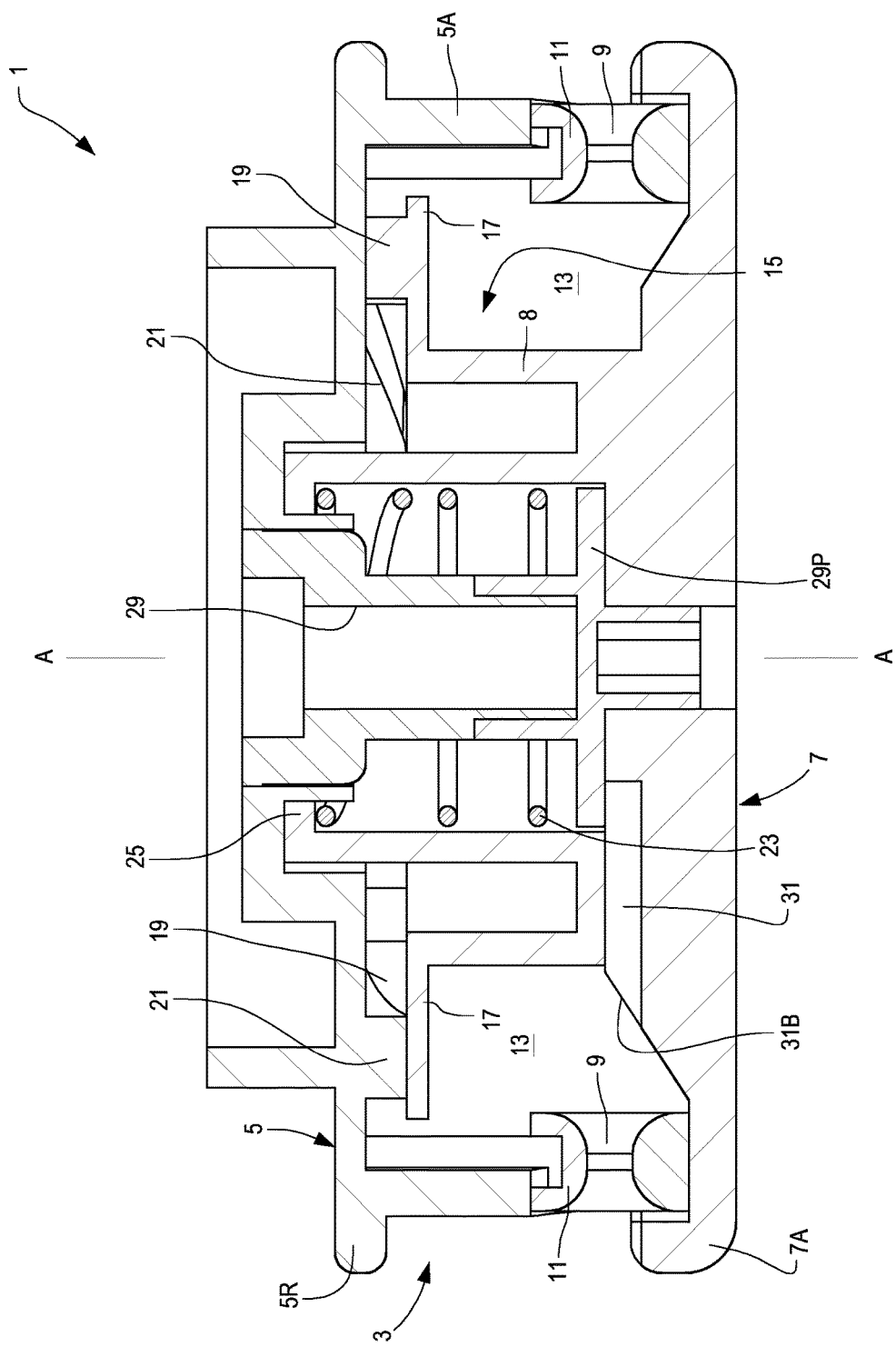
FIG. 11 shows an axial cross section of a further embodiment of a trimmer head.
Figure 12:
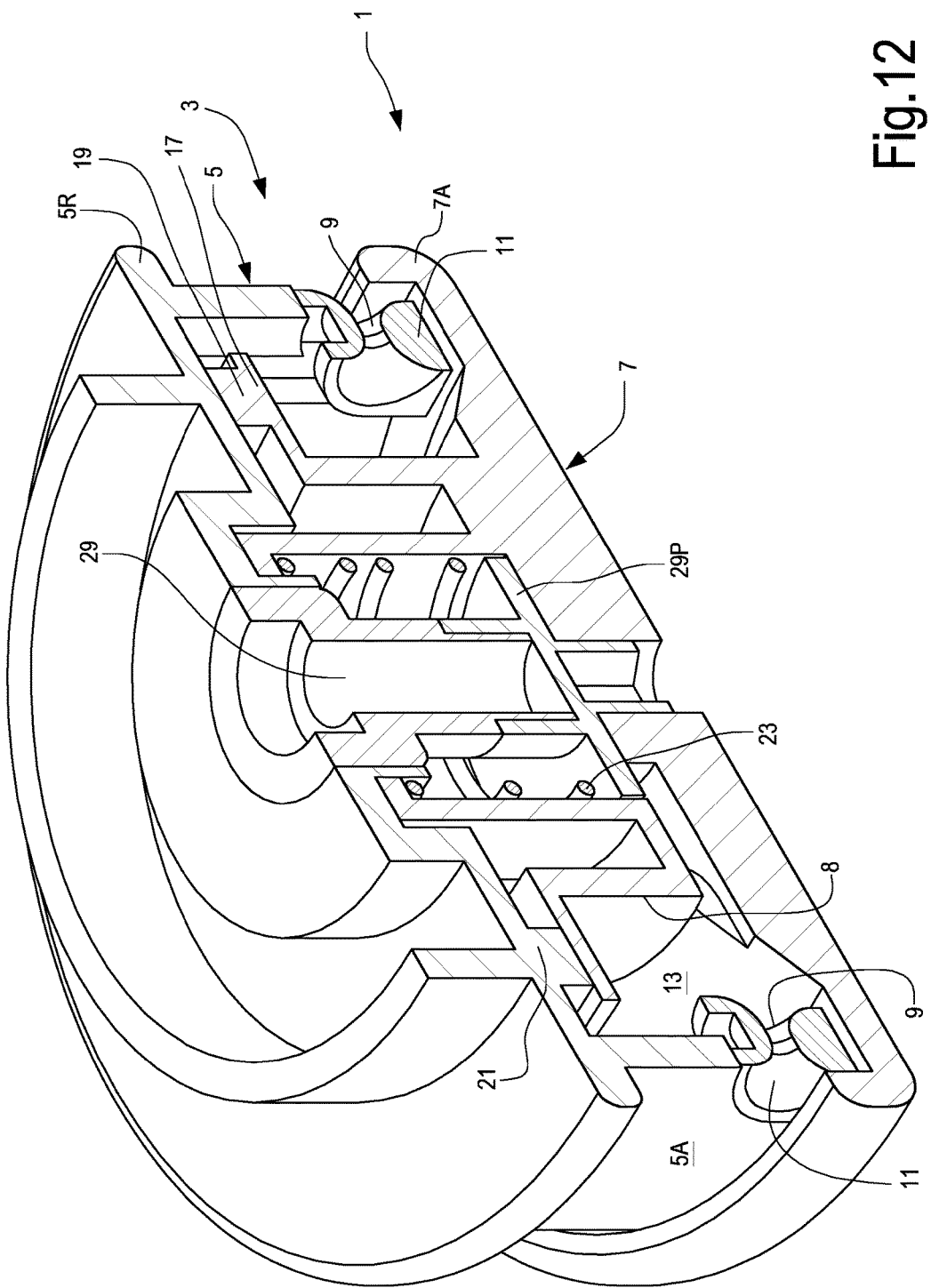
FIG. 12 is a cross-cut axonometric view of the trimmer head of FIG. 11.

FIGS. 11 and 12 illustrate a further embodiment of a trimmer head similar to the embodiment illustrated in the previous Figs. Equal numbers indicate equal or equivalent parts to those described above, that do not require further detailed explanations.

The embodiment of FIGS. 11 and 12 differs from the previous embodiments in the way the housing portion 5 and the housing portion 7 are coupled together. The resilient member 23 is arranged inside the trimmer head 1 so as to push the housing portion 7 against the housing portion 3, so that the front toothings 19, 21 connect to one another. The resilient member 23 reacts between an annular collar or projection 25, integral with the second housing portion 7, and a plate 29P, integral with the shaft 29 coaxial with the rotation axis A-A of the trimmer head 1.

To wind and unwind the cutting line F (not shown in these figures for the sake of clarity of representation) it is necessary to move the housing portions 5, 7 away from each other, against the force of the resilient member 23, bringing them at a distance sufficient to release the front toothing 19 from the front toothing 21.

Figure 13:
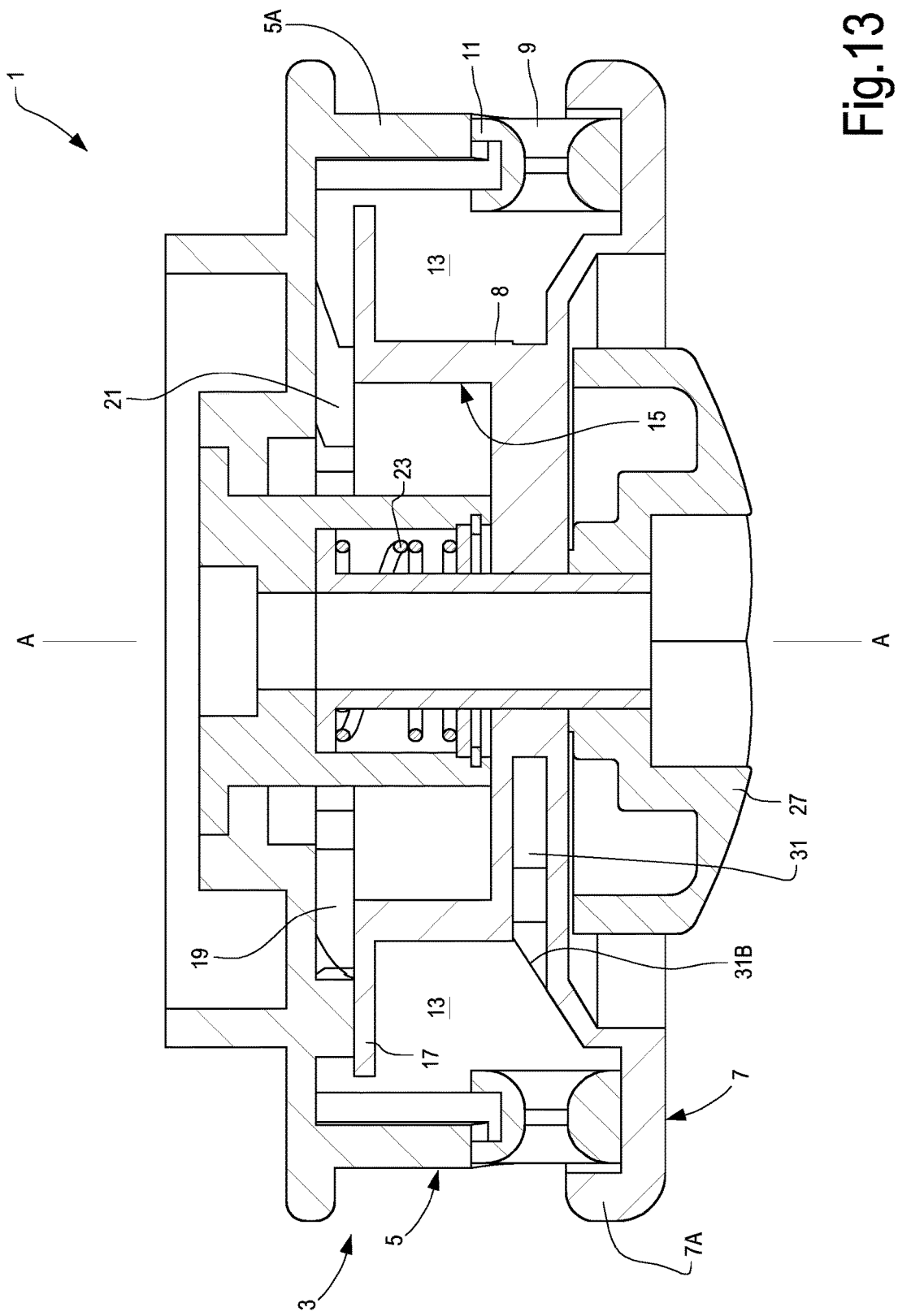
FIG. 13 shows an axial cross section of a further embodiment of a trimmer head.
Figure 14:
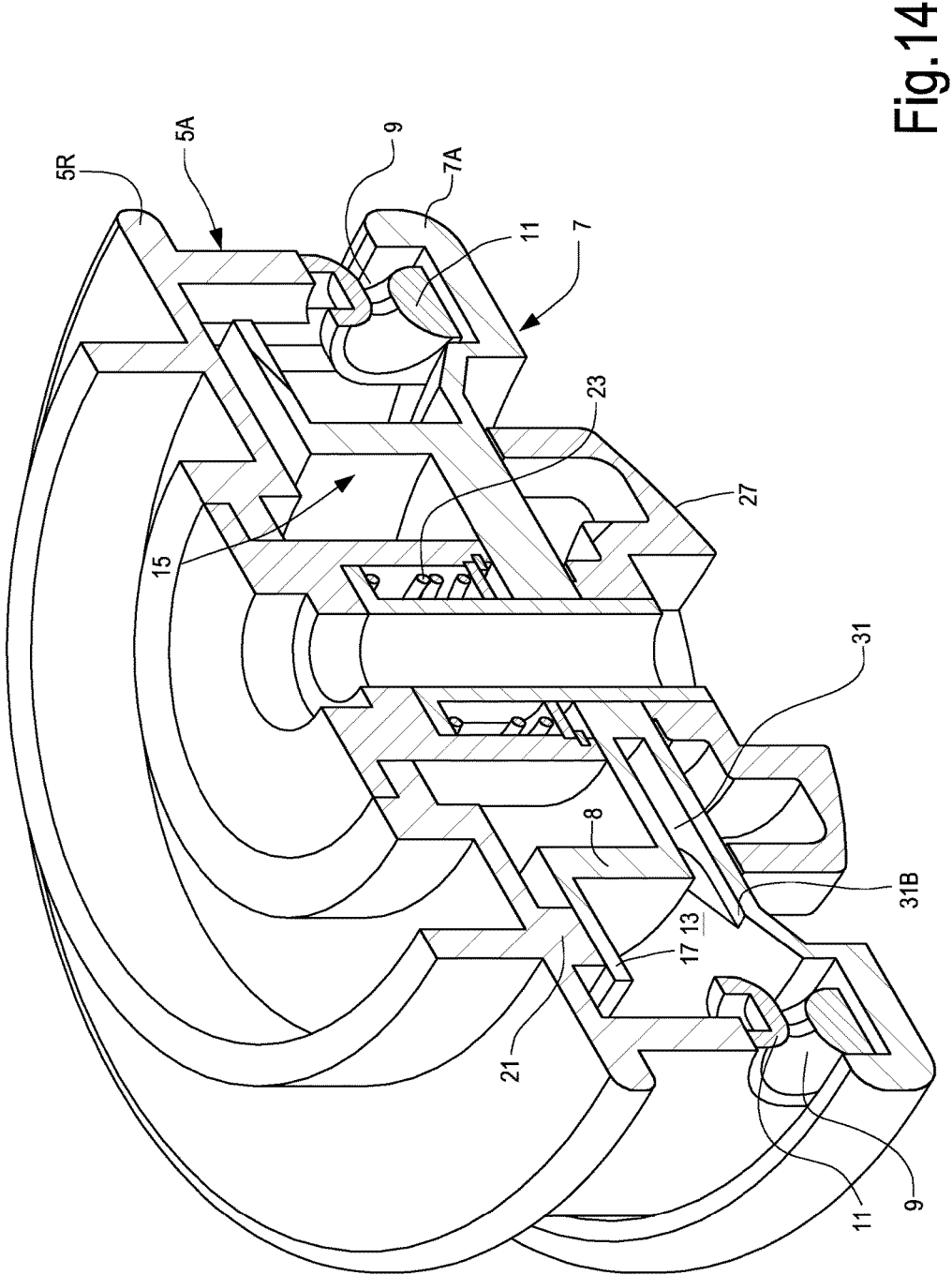
FIG. 14 is a cross-cut axonometric view of the head of FIG. 13.

FIGS. 13 and 14 show a further modified embodiment of a trimmer head 1. The same numbers indicate parts identical or equivalent to those of the previous embodiments. These parts will not be described again.

The housing portion 7 and the housing portion 5 are biased against each other, to engage the front toothings 19, 21 by means of a resilient member 23. The housing portions 5, 7 are moved away from each other against the resilient force of the resilient member 23 so as to torsionally release said portions from one another and to allow rotation to wind or unwind the cutting line F (not shown in FIGS. 13 and 14) in or from the volume 13 inside the housing 3. To restore a new stock of line F, the cutting line is introduced through the transverse passage 31 provided, in this embodiment again, as illustrated in FIG. 5.

Figure 15:
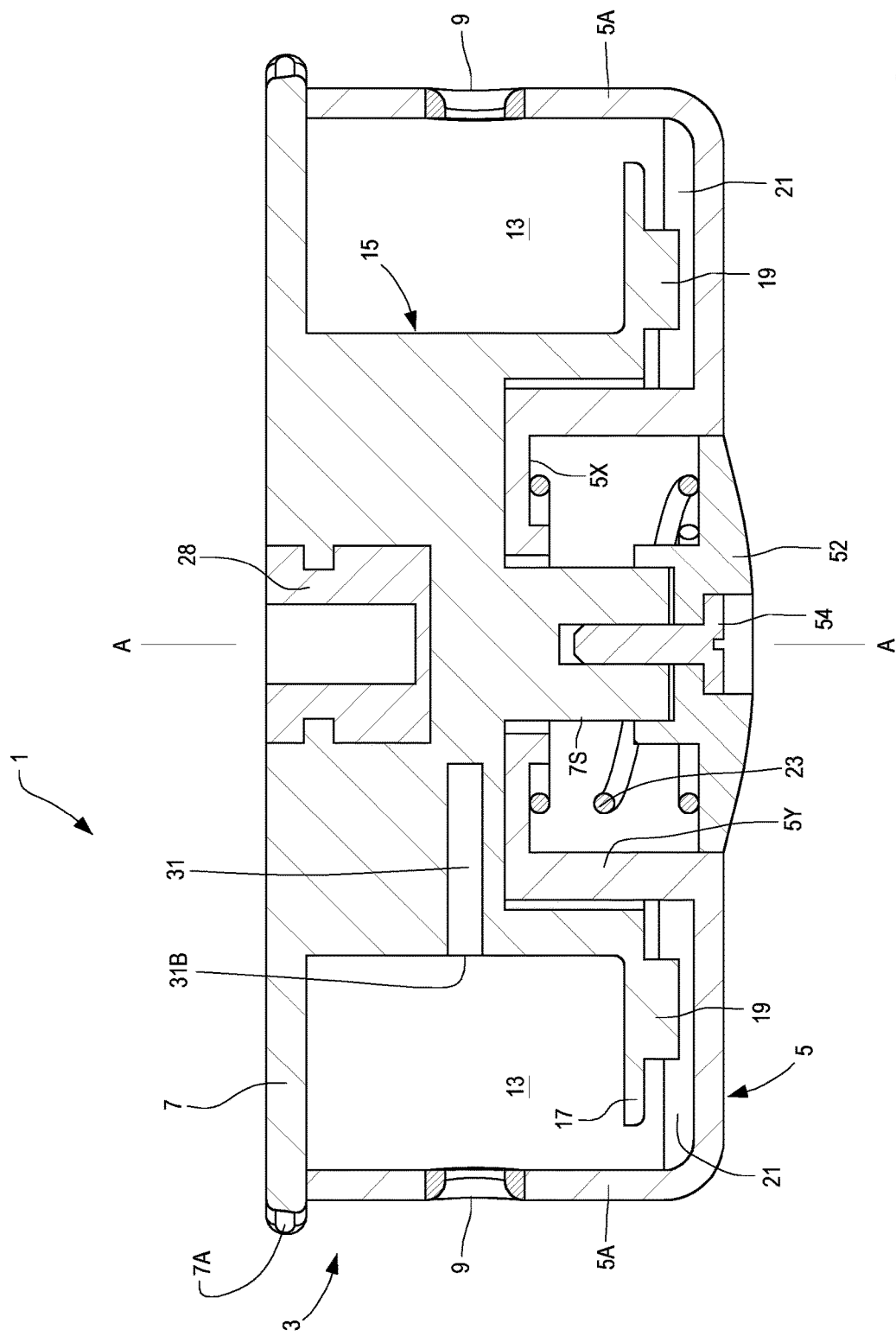
FIG. 15 is an axial cross section of a further embodiment of a trimmer head.
Figure 16:
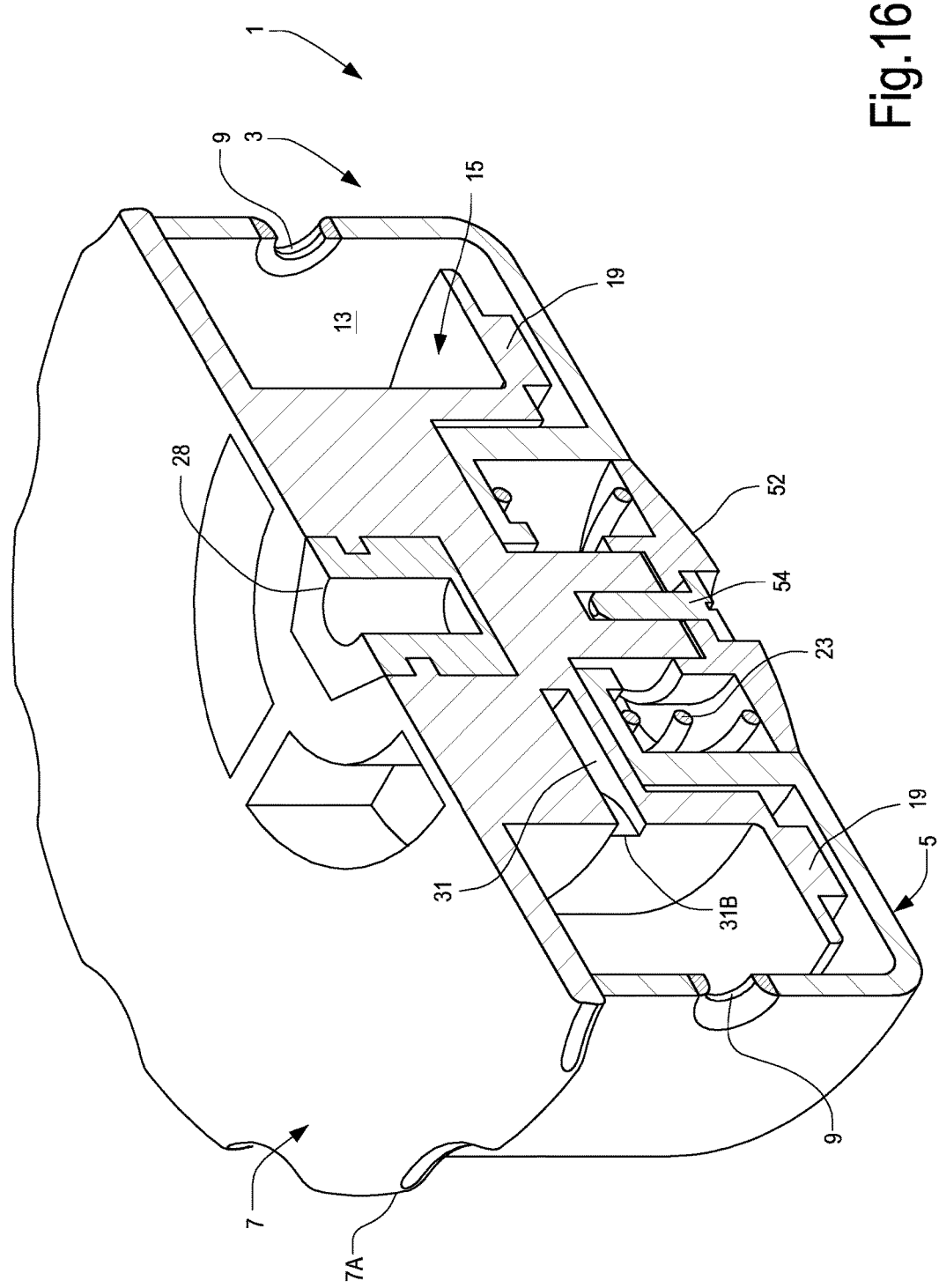
FIG. 16 is a cross-cut axonometric view of the head of FIG. 15.

FIGS. 15 and 16 show a further modified embodiment of a trimmer head 1 deriving from the embodiments illustrated with reference to FIGS. 1-14. The same numbers indicate the same or equivalent parts to those of the previous embodiments, which will be not described in detail.

In the embodiment of FIGS. 15 and 16, the mutual position of the first housing portion 5 and of the second housing portion 7 is reversed, i.e. (in use) the first housing portion 5 faces downwards below the second housing portion 7. The trimmer head 1 is connected to the drive shaft of the bush cutter, or other actuating machine, by means of an insert 28, that may be for instance internally threaded or may have (in embodiments not shown) a male threaded shank projecting from the trimmer head 1.

The transverse passage 31 for the cutting line is provided as illustrated in the above described cross section of FIG. 5, and the second tapered end 31B thereof may be arranged opposite one of two the holes 9 through which the cutting line exits from the housing 3.

In this embodiment again, the torsional coupling between the first housing portion 5 and the second housing portion 7 is provided by means of front toothing 19 integral with the second housing portion 7 co-acting with front toothing 21 integral with the first housing portion 5. The two housing portions 5, 7 may be distanced from one another by means of axial traction against the resilient force of an resilient member 23, for example a helical compression spring, held at a collar 5X projecting radially towards the inside with respect to a substantially cylindrical wall 5Y integrally formed with the first housing portion 5. The wall 5Y and the collar 5X form a space to house the resilient member 23. The resilient member reacts against the collar 5X and against a plate 52, which is constrained, for instance by means of a screw 54, to an axial projection 7S integrally formed with the second housing portion 7 and provided with a threaded hole where the screw 54 is screwed.

With this arrangement, the resilient member 23 stresses the two housing portions 5, 7 against each other so as to bring the front toothings 19, 21 in mutual engagement, torsionally coupling the two housing portions 5, 7 together. The compression of the resilient member 23, due to the effect of the opposite traction exerted on the two housing portions 5, 7, causes the disengagement of the front toothings 21, 19 and makes therefore possible to rotate the two housing portions 5, 7 with respect to each other to wind or unwind the cutting line. The cutting line can be inserted transversally through the trimmer head 1, inserting it in one of the exit holes 9 and guiding it along the transverse passage 31 until it exits from the opposite exit hole 9, as already described with reference to the previous embodiments.

Figure 17:
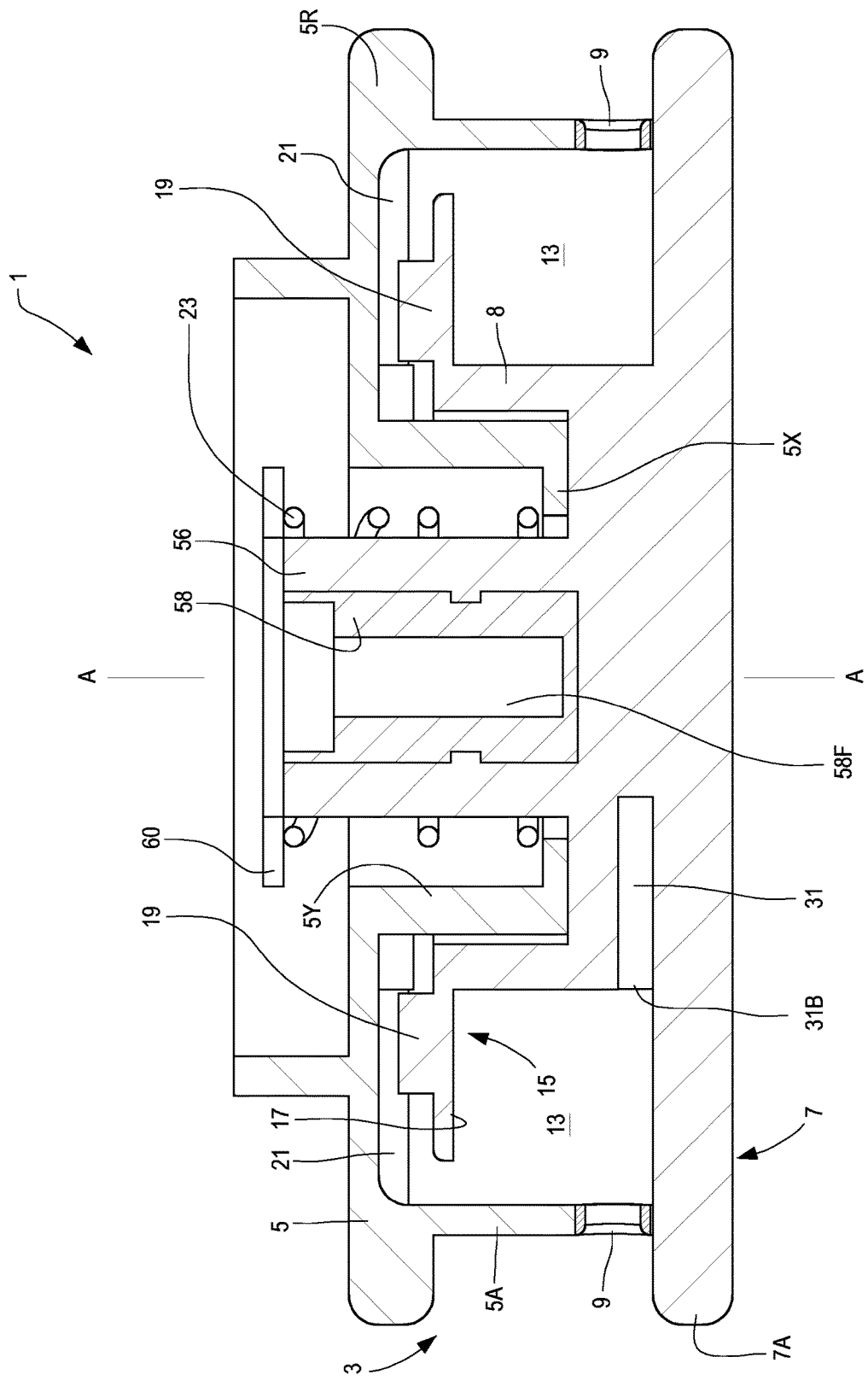
FIG. 17 shows an axial cross section of a further embodiment of a trimmer head.
Figure 18:
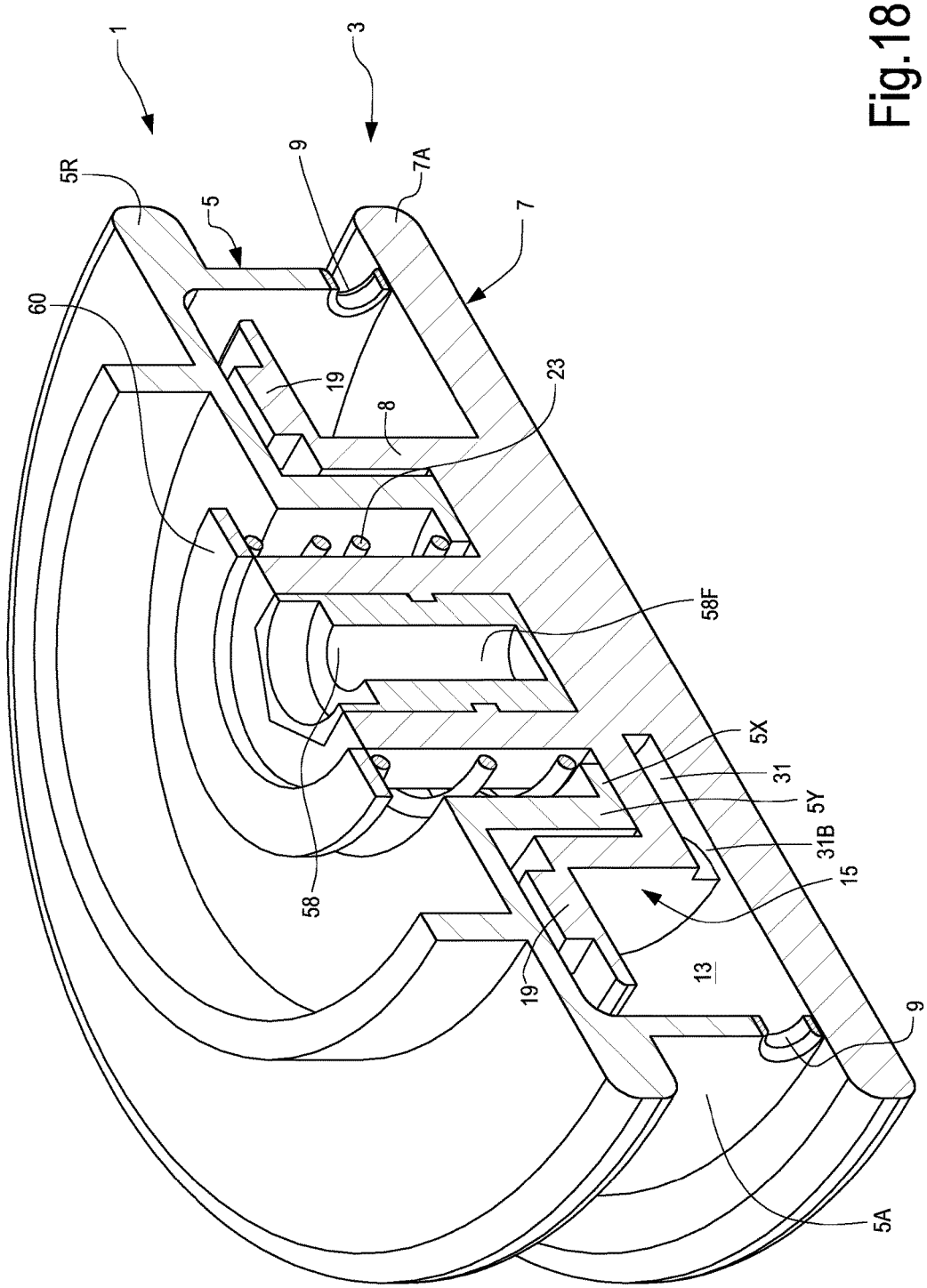
FIG. 18 is a cross-cut axonometric view of the head of FIG. 17.

FIGS. 17 and 18 show a further modified embodiment of the trimmer head. The same reference numbers indicate the same or equivalent parts to those described with reference to FIGS. 1 to 16 and they will be not described again. The trimmer head is indicated again as a whole with number 1, and comprises a housing 3 that is formed by a first housing portion 5 and a second housing portion 7. The first housing portion 5 has a substantially cylindrical wall 5A, where holes 9 are provided for passing the cutting line therethrough (not shown in these figures). The second housing portion 7 comprises a side or perimeter flange 7A, adjacent to which the transverse passage 31 is provided, the passage having ends 31A and 31B and being configured substantially as described above with reference to FIG. 5.

The second housing portion 7 forms a spool 15 made as a single piece with the said housing portion 7. The spool 15 may have an inner flange 17; a first front toothing 19 may be provided on the flange side facing upwards (in FIGS. 17 and 18), co-acting with a second front toothing 21 formed on the surface of the first housing portion 5 facing inwardly. The second housing portion 7 may comprise a shank 56 approximately coaxial with the rotation axis A-A of the trimmer head 1. Inside the shank 56 a shaft 58 may be fastened, for instance made of metal, forming the interface for the connection to the drive shaft of a brush cutter or other similar actuating machine of the trimmer head 1. In the embodiment of FIGS. 17 and 18, the shaft 58 has a female thread provided in an inner hole 58F. Conversely, in other embodiments the shaft 58 may have a projecting male threaded element that can be screwed in a female coupling provided on the drive shaft of the bush cutter, or other machine.

In some embodiments, a plate 60 may be fastened to, or formed at, the distal end of the shank 56. A resilient member 23, for instance a helical compression spring, may be provided between the plate 60 and an inner radial collar 5X integral with the first housing portion 5. The inner collar 5X may project from a substantially cylindrical wall 5Y, which is integral with the first housing portion 5 and is advantageously made in a single piece therewith. The approximately cylindrical wall 5Y and the collar 5X delimit the housing space for the resilient member 23. The resilient member stresses the two housing portions 5, 7 against each other. It is possible to release the front toothings 19, 21 from each other by pulling in axially opposite directions, against the force of the resilient member 23, the two housing portions 5, 7, thus torsionally uncoupling them from one another and allowing their reciprocal rotation around the rotation axis A-A of the trimmer head 1. In this way, similarly to what has been described with reference to the embodiments illustrated above, it is possible to reciprocally rotate the two housing portions 5, 7 in order to wind or unwind the cutting line F around the spool 15 formed in a single piece with the second housing portion 7, for the purposes already described above.

In this embodiment again, the transverse passage 31 is provided adjacent to the closing wall or lower flange 7A; the passage has the ends 31A, 31B configured as in FIG. 5 so that it is possible to guide the cutting line from one to the other of the diametrically opposite exit holes 9, through the trimmer head 1.

FIGS. 19 to 21 show a different embodiment of a trimmer head. The same reference numbers indicate equal or equivalent parts to that described with reference to the previous embodiments.

In the cross sections of FIGS. 19 to 21, the trimmer head, indicated again with number 1, has a shape substantially corresponding to that of FIGS. 1-4. However, the head of FIGS. 19-21 differs from the head of FIGS. 1-5 in the different shape of the transverse passage, along which the cutting line F is guided through the cutting head from one to the other of the exit holes 9 when it shall be replaced, for instance when worn. The shape of the transverse passage is illustrated in particular in FIG. 21.

Actually, in the embodiment of FIGS. 19-21 a first transverse passage 31 and a second transverse passage 131 are provided, wherein the first passage has opposite ends 31A, 31B, and the second passage extends from a first end 131A to a second end 131B. The two transverse passages 31, 131 are symmetrical with respect to the rotation axis A-A of the trimmer head 1, as it is clearly shown in FIG. 21. The end 31A of the transverse passage 31 is flared and delimited by side walls converging towards the inside of the trimmer head. Walls 31C, 31D are provided close to the opposite end 31B to guide the cutting line, these walls converging towards the end 31B, whose transverse dimension is substantially smaller than the transverse dimension of the end 31A. The same symmetrically occurs for the shape of the transverse passage 131.

Essentially, the first flared end 31A of the first transverse passage 31 is adjacent and near the opposite second tapered end 131B of the second transverse passage 131. In diametrically opposite position, the end 31B of smaller dimension is adjacent to the first flared end 131A of the second transverse passage 131.

This arrangement allows to use the trimmer head 1 of FIGS. 19-21 in the same way, for instance, as the trimmer head of FIGS. 1-5, but in a more flexible way. In fact, in all the embodiments of FIGS. 1-18, once the transverse passage 31 has been aligned with the exit holes 9 of the two portions 7, 5 of the housing 3, it is necessary to insert the cutting line F always starting from the exit hole 9 aligned with the flared end 31A of the single transverse passage 31. Conversely, in the embodiments of FIGS. 19-21 the cutting line F may be inserted indifferently in one or the other of the two passage holes 9. In the first case, the cutting line F is guided through the flared end 31A and, from here, towards the tapered end 31B of the transverse passage 31. In the other case, the cutting line F is guided firstly in the flared end 131A and, along the transverse passage 131, up to the tapered end 131B.

Figure 24:
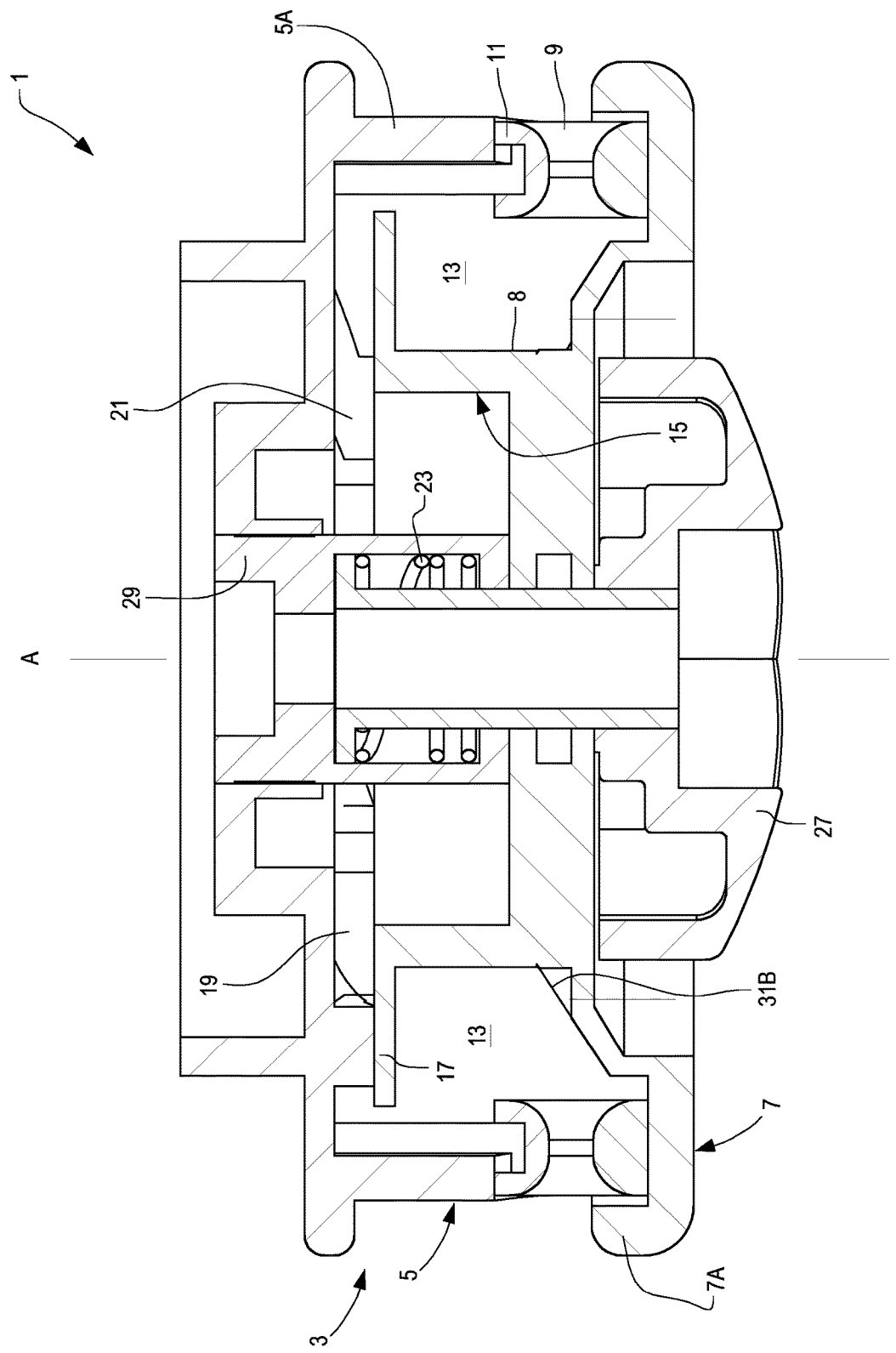
Figure 25:
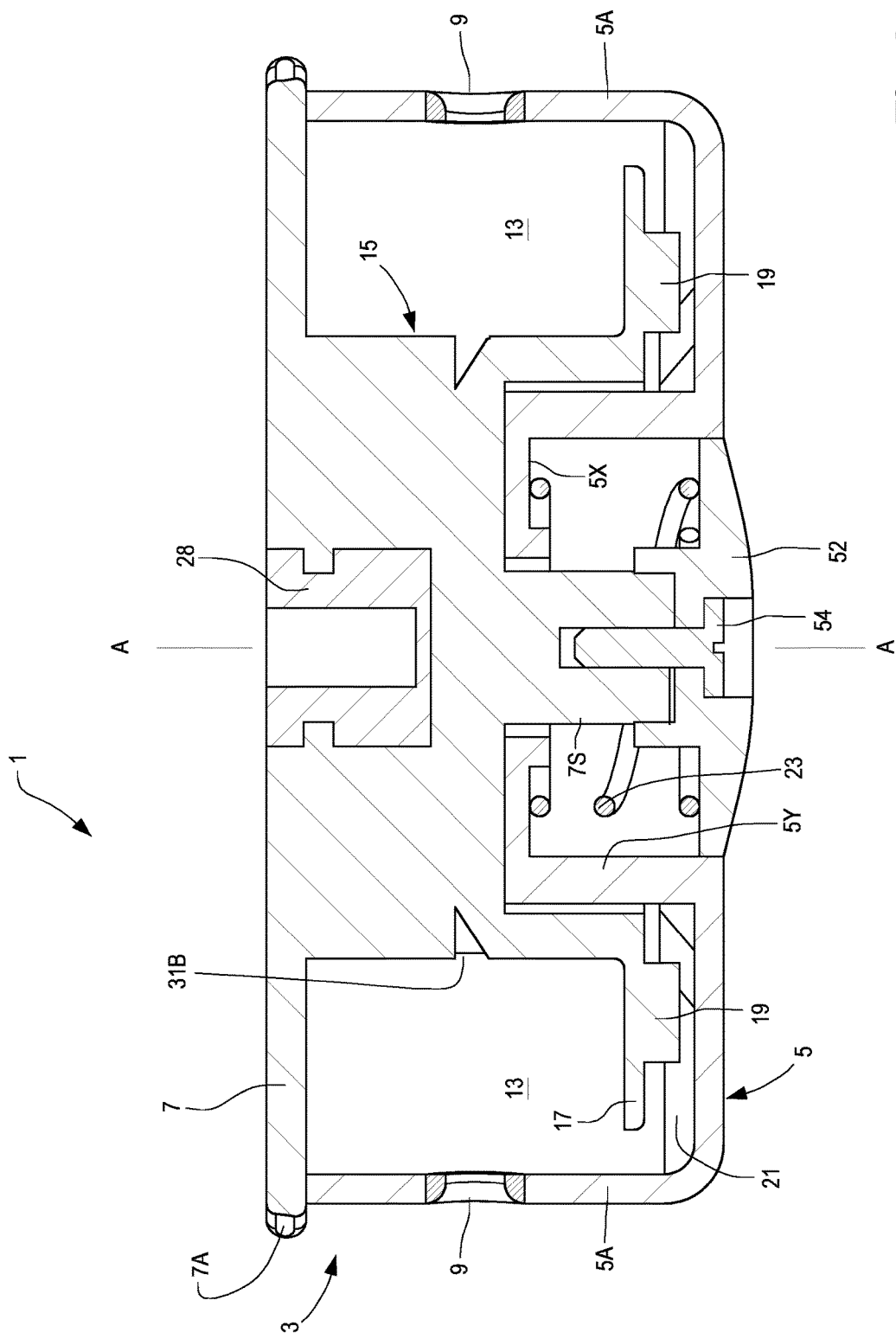
Figure 26:
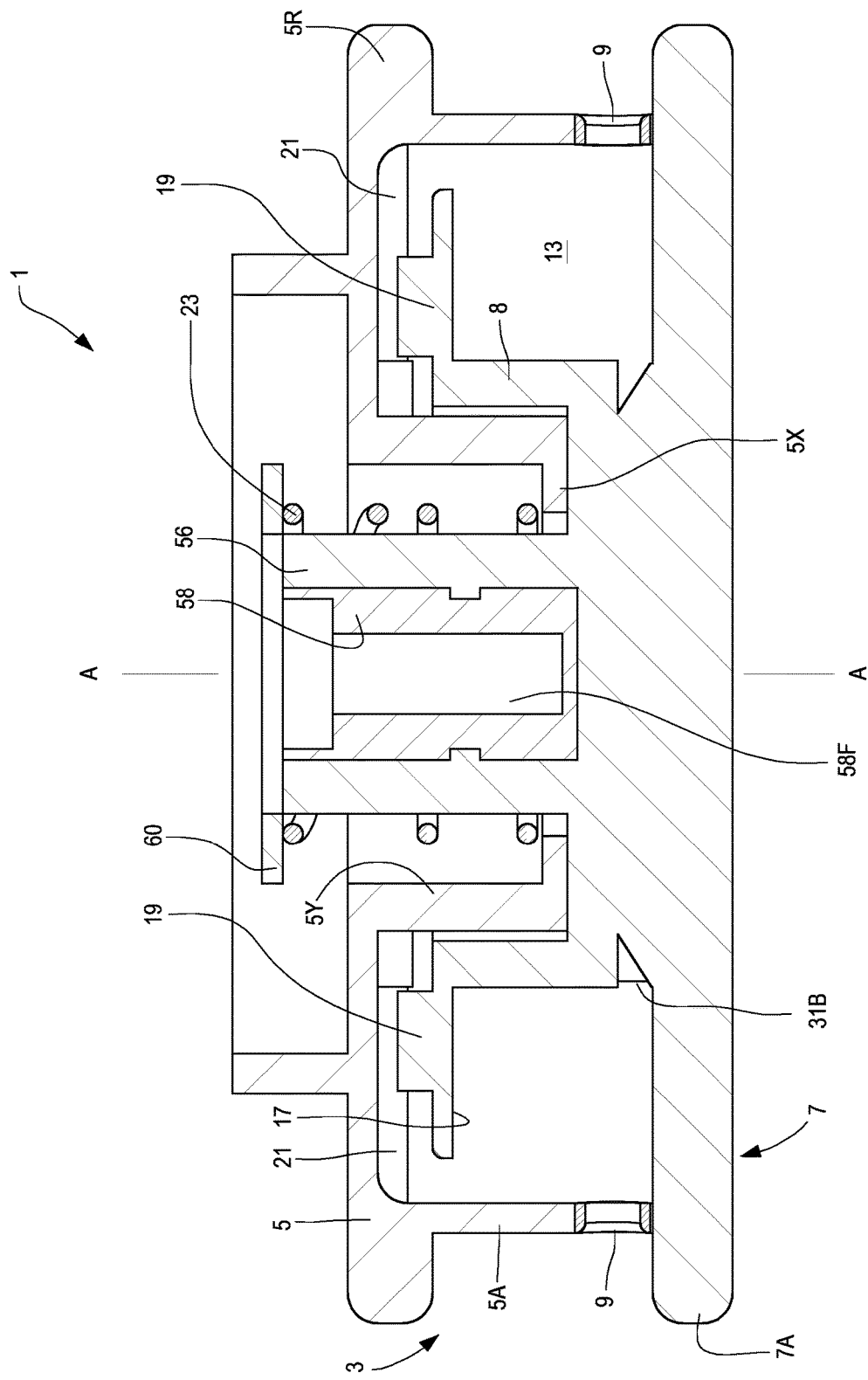

The modified embodiments of subsequent FIGS. 22-26 have the same conformation of the double transverse passage 31, 131 with axial symmetry. As shown in FIGS. 22-26, each of which shows an axial cross section of the respective modified embodiment, these embodiments correspond to the embodiments described above as variants of the embodiment of FIGS. 1-5 (except for the shape of the transverse passage 131, 31 for the cutting line F). More in particular, FIG. 22 corresponds to the configuration of FIGS. 9 and 10. The conformation of FIG. 23 corresponds to the embodiment of FIGS. 11 and 12. FIG. 24 corresponds to the embodiment of FIGS. 13 and 14. FIG. 25 corresponds to the embodiment of FIGS. 15 and 16. FIG. 26 corresponds to the embodiment of FIGS. 17 and 18. Equal numbers indicate equal or corresponding parts in the Figs.

FIGS. 27-29 show a further embodiment of a trimmer head. The same numbers indicate parts identical or equivalent to those of the previous embodiments. The embodiment of FIGS. 27-29 substantially corresponds to the embodiment of FIGS. 1-5, but differs therefrom in the shape of the transverse passage 31 for guiding the cutting line through the trimmer head 1.

The shape of the transverse passage 31 is clearly illustrated in the cross section of FIG. 29 according to the line XXIX-XXIX of FIG. 27. The form of the transverse passage 31 in this embodiment substantially corresponds to the embodiment of the transverse passage 31 of FIG. 21. However, in this case, contrarily to what has been shown in the embodiment of FIG. 21, the second transverse passage 131 is not provided.

The use of the head of FIGS. 27-29 is substantially the same as described above for the remaining embodiments and more in particular the embodiment of FIGS. 1-5.

FIGS. 30 to 34 show modified embodiments of the trimmer head of FIGS. 27-29, all having a transverse passage 31 configured as in FIG. 29. The remaining parts of the trimmer head in the embodiments of FIGS. 30-34 correspond to the modified embodiments of FIGS. 22-26. The same numbers indicate parts identical or equivalent to those of the previous embodiments.

FIGS. 35-37 illustrate a further embodiment of a trimmer head according to the subject matter of the present invention. Equal numbers indicate the same or equivalent parts to those of the previous embodiments. In the cross sections of FIGS. 35 and 36, the trimmer head 1 is substantially equal to the trimmer head of FIGS. 1 to 5, except for the shape of the transverse passage 31. This transverse passage 31 is configured as better illustrated in FIG. 37, where the main differences are shown with respect to the embodiment of FIGS. 1-5.

In the arrangement of FIGS. 35 and 36, the transverse passage 31 is aligned with the exit holes 9 of the two bushings 11 fastened to the substantially cylindrical side wall 5A of the first portion 5 of the housing 3.

The shape of the transverse passage 31 is better illustrated in FIG. 37. In this embodiment again, the transverse passage 31 extends from a first end 31A to a second end 31B, wherein these ends are substantially diametrically opposite with respect to the rotation axis A-A of the trimmer head 1. However, in the central area the transverse passage 31 is divided into two curved portions that are symmetrical with respect to a symmetry plane S-S. The two curved portions are indicated with 31S and 31T. The ends 31A and 31B are not flared. Inside the transverse passage 31, opposite the ends 31A and 31B, two guide deflectors 32 are provided, symmetrical with respect to the symmetry plane S-S. The cutting line, inserted through one or the other of the two exit holes 9, enters into one or the other of the two ends 31A, 31B when the two housing portions 5, 7 of the cutting head 1 are directed with the axis of the transverse passage 31 aligned with the common axis of the two bushings 11 and therefore of the two exit holes 9. The head of the cutting line F is deflected by the deflector 32 towards one or the other of the two curved portions 31S, 31T so as to turn around the rotation axis A-A without interfering therewith and with the members arranged in central position in the trimmer head 1, for instance the shaft 29 and/or the spring or resilient member 23.

All the modified embodiments of FIGS. 38-42 have a transverse passage 31 shaped as in FIG. 37, but they have a different morphology of the remaining parts of the trimmer head 1, and, in particular, each variant of FIGS. 38-42 corresponds to the variants of FIGS. 9-18 respectively. The same numbers indicate the same or equivalent parts to those in the previous exemplary embodiment. In the variants of FIGS. 38-42, the curved portions 31S are highlighted, formed by the transverse passage 31.

The modified embodiment of FIGS. 43-45 is substantially equal to the modified of embodiment of FIGS. 35-37, but in this case, as shown in particular in FIG. 45, the transverse passage 31 has a single curved portion turning around the rotation axis A-A of the trimmer head 1. In FIGS. 43 to 45, the same numbers indicate the same or equivalent parts as in FIGS. 1 to 5.

FIGS. 46-50 show variants of the embodiment of FIGS. 43-45, which have the same shape of the transverse passage 31 as illustrated in FIG. 45. The remaining parts of the trimmer head of FIGS. 46-50 correspond to the shapes and modified embodiment of FIGS. 9-18.

FIGS. 51 to 53 show an embodiment similar to that of FIGS. 11 and 12. However, in the embodiment of FIGS. 51-53, as shown in particular in FIG. 53, the transverse passage 31 has a rectilinear extension and intersects the rotation axis A-A of the trimmer head 1.

This is possible thanks to the fact that, in this modified embodiment, the trimmer head 1 has no axial elements that interfere with the linear and straight extension of the transverse passage 31.

FIGS. 54, 55 and 56 show modified embodiment of the trimmer head of FIGS. 51, 52 and 53, wherein the linear extension of the transverse passage 31 is the same, intersecting the rotation axis A-A of the trimmer head 1. The morphology of the trimmer head in the configurations of FIGS. 54, 55 and 56 corresponds, as far as the remaining parts are concerned, to the shape of the trimmer heads illustrated in FIGS. 9, 10; 15, 16; and 17, 18 respectively. The same numbers indicate the same or equivalent parts in the various embodiments.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

The invention claimed is:

1. A line-type trimmer head, configured to rotate around a rotation axis, the line-type trimmer head comprising:
a housing comprising at least a first housing portion and a second housing portion, which are adapted to be torsionally and axially coupled to each other and which form a volume for a stock of cutting line, wherein the first housing portion and the second housing portion are adapted to be torsionally released from each other so as to rotate with respect to each other, the first housing portion comprising at least two exit holes for the cutting line, the second housing portion forming a winding spool for winding the stock of cutting line, the spool being integrally connected with the second housing portion and the spool rotating with the second housing portion, the second housing portion comprising at least one passage, the at least one passage being transverse with respect to the rotation axis of the trimmer head, the at least one passage comprising a first end and a second end configured and arranged so as to be placed at the two exit holes for the cutting line, so that the cutting line can be inserted through one of the two exit holes and extracted from the other exit hole, passing along the at least one passage, the first housing portion having a side wall where the two exit holes for the cutting line are provided, the second housing portion comprising a closing flange cooperating with the side wall of the first housing portion.

2. A trimmer head according to claim 1, wherein the spool and the closing flange are made in a single piece.

3. A trimmer head according to claim 1, wherein the second housing portion comprises a wall, and the cutting line is wound around the wall, the at least one passage intersecting the wall.

4. A trimmer head according to claim 3, wherein the second housing portion has an inner flange extending from the wall.

5. A trimmer head according to claim 1, wherein the at least one passage extends around the rotation axis of the trimmer head without intersecting the rotation axis.

6. A trimmer head according to claim 5, further comprising:
a shaft extending coaxially with the rotation axis of the trimmer head, through at least part of the first housing portion and at least part of the second housing portion, the at least one passage extending around the shaft.

7. A trimmer head according to claim 1, wherein at least one of the first end and the second end of the at least one passage has a flared shape, so as to facilitate entrance of an end of the cutting line in the at least one passage.

8. A trimmer head according to claim 7, wherein the at least one passage has walls converging towards one of the first end and the second end, to facilitate guiding of the cutting line towards the exit hole arranged in front of the one of the first end and the second end.

9. A trimmer head according to claim 7, wherein the at least one of the first end and the second end has an intermediate diaphragm dividing the at least one passage into two parts that extend on opposite sides of the rotation axis and the two parts meet together to converge towards the other of the first end and the second end.

10. A trimmer head according to claim 1, further comprising:
a second passage transverse with respect to the rotation axis of the trimmer head.

11. A trimmer head according to claim 10, wherein the at least one passage and the second passage are symmetrical with respect to the rotation axis of the trimmer head.

12. A trimmer head according to claim 1, wherein the at least one passage is doubled between the first end and the second end, and the at least one passage forms two paths extending on opposite sides of the rotation axis of the trimmer head.

13. A trimmer head according to claim 12, wherein the two paths are symmetrical with respect to a plane containing the rotation axis of the trimmer head.

14. A trimmer head according to claim 1, wherein the first housing portion and the second housing portion are adapted to be torsionally coupled together by means of a front toothing, wherein the first housing portion and the second housing portion are adapted to be axially distanced from each other so as to disengage the front toothing and allow rotation of the first housing portion and the second housing portion with respect to each other.

15. A trimmer head according to claim 1, wherein the first housing portion and the second housing portion are adapted to be distanced from each other in a direction parallel to the rotation axis, so as to torsionally release the first housing portion and the second housing portion from each other.

16. A trimmer head according to claim 1, further comprising:
a resilient member cooperating with the first housing portion and the second housing portion.

17. A trimmer head according to claim 16, wherein the resilient member is configured and arranged so as to force the first housing portion and the second housing portion against each other, in a position of reciprocal torsional coupling of the first housing portion and of the second housing portion, which can be distanced from each other against a force of the resilient member, so as to torsionally release the first housing portion and the second housing portion from to each other.

18. A trimmer head according to claim 16, wherein the resilient member is configured and arranged so as to force the first housing portion and the second housing portion to move away from each other towards a position of reciprocal torsional release.

19. A trimmer head according to claim 1, further comprising:
a member for axially constraining the first housing portion and the second housing portion to each other.

20. A trimmer head according to claim 1, further comprising:
a torsional constraining member for torsionally constraining the first housing portion and the second housing portion to each other.

21. A trimmer head according to claim 20, wherein the torsional constraining member is configured to torsionally release the first housing portion from the second housing portion by moving the first housing portion away from the second housing portion in a direction parallel to the rotation axis.

* * * * *